US007487050B2

(12) United States Patent
Rosakis et al.

(10) Patent No.: US 7,487,050 B2
(45) Date of Patent: Feb. 3, 2009

(54) TECHNIQUES AND DEVICES FOR CHARACTERIZING SPATIALLY NON-UNIFORM CURVATURES AND STRESSES IN THIN-FILM STRUCTURES ON SUBSTRATES WITH NON-LOCAL EFFECTS

(75) Inventors: Ares J. Rosakis, Altadena, CA (US); Yonggang Huang, Champaign, IL (US)

(73) Assignee: California Institute of Technology, Pasadena, CA (US)

( * ) Notice: Subject to any disclaimer, the term of this patent is extended or adjusted under 35 U.S.C. 154(b) by 56 days.

(21) Appl. No.: 11/432,663

(22) Filed: May 10, 2006

(65) Prior Publication Data

US 2006/0276977 A1 Dec. 7, 2006

Related U.S. Application Data

(63) Continuation-in-part of application No. 11/080,087, filed on Mar. 14, 2005, now Pat. No. 7,363,173.

(60) Provisional application No. 60/679,328, filed on May 10, 2005, provisional application No. 60/723,302, filed on Oct. 4, 2005, provisional application No. 60/576,168, filed on Jun. 1, 2004, provisional application No. 60/614,937, filed on Sep. 30, 2004.

(51) Int. Cl.
*G01L 1/00* (2006.01)
(52) U.S. Cl. ................ 702/42; 438/936; 257/254
(58) Field of Classification Search .......... 702/42; 257/254; 73/788; 438/938
See application file for complete search history.

(56) References Cited

U.S. PATENT DOCUMENTS 5,710,631 A 1/1998 Bou-Ghannam et al.

| | | | |
|---|---|---|---|
| 6,031,611 A | 2/2000 | Rosakis et al. | |
| 6,268,883 B1 | 7/2001 | Zehnder et al. | |
| 6,469,788 B2 | 10/2002 | Boyd et al. | |
| 6,513,389 B2 | 2/2003 | Suresh et al. | |
| 6,600,565 B1 | 7/2003 | Suresh et al. | |
| 6,781,702 B2 | 8/2004 | Giannakopoulos et al. | |
| 6,924,497 B2 | 8/2005 | Suresh et al. | |
| 2003/0106378 A1* | 6/2003 | Giannakopoulos et al. | .... 73/788 |
| 2003/0190131 A1 | 10/2003 | Barth | |

(Continued)

FOREIGN PATENT DOCUMENTS

JP 05-335217 12/1993

OTHER PUBLICATIONS

Finot, M., et al., "Large deformation and geometric instability of substrates with thin-film deposits", *J. Appl. Phys.*, 81(8):3457-3464, Apr. 1997.

(Continued)

*Primary Examiner*—Bryan Bui
*Assistant Examiner*—Jonathan Teixeira
(74) *Attorney, Agent, or Firm*—Fish & Richardson P.C.

(57) ABSTRACT

Techniques and devices are described to use spatially-varying curvature information of a layered structure to determine stresses at each location with non-local contributions from other locations of the structure. For example, a local contribution to stresses at a selected location on a layered structure formed on a substrate is determined from curvature changes at the selected location and a non-local contribution to the stresses at the selected location is also determined from curvature changes at all locations across the layered structure. Next, the local contribution and the non-local contribution are combined to determine the total stresses at the selected location. Techniques and devices for determining a misfit strain between a film and a substrate on which the film is deposited are also described.

13 Claims, 14 Drawing Sheets

U.S. PATENT DOCUMENTS

| | | |
|---|---|---|
| 2004/0075825 A1 | 4/2004 | Suresh et al. |
| 2004/0257587 A1 | 12/2004 | Rosakis et al. |
| 2005/0007601 A1 | 1/2005 | Rosakis et al. |
| 2005/0030551 A1 | 2/2005 | Rosakis et al. |
| 2005/0278126 A1* | 12/2005 | Rosakis et al. ............... 702/42 |

OTHER PUBLICATIONS

Finot, M., et al., "Small and large deformation of thick and thin-film multi-layers: Effect of layer geometry, plasticity and compositional gradients", *J. Mech Phys. Solids*, 44(5):683-721, May 1996.

Freund, L.B., "Substrate curvature due to thin film mismatch strain in the nonlinear deformation range", *J. Mech. Phys. Solids*, 48(6-7):1159-1174, Jun. 2000.

Huang, Y. et al., "Non-uniform, axisymmetric misfit strain: in thin films bonded on plate substrates/substrate systems: the relation between non-uniform film stresses and system curvatures", *Acta Mechanica Sinica*, 21(4):362-370, Aug. 2005.

Huang, Y., et al., "Extension of Stoney's formula to non-uniform temperature distributions in thin film/substrate systems. The case of radial symmetry", *J. Mech. Phys. Solids*, 53(11):2483-2500, Nov. 2005.

Lee, H., et al., "Full-field optical measurement of curvatures in ultra-thin-film-substrate systems in the range of geometrically nonlinear deformations", *J. Appl. Phys.*, 89(11):6116-6129, Jun. 2001.

Masters, C.B., et al., "Geometrically nonlinear stress-deflection relations for thin film/substrate systems", *Int. J. Eng. Sci*, 31(6):915-925, Jun. 1993.

Park, T.-S., et al., "Effects of line and passivation geometry on curvature evolution during processing and thermal cycling in copper interconnect lines", *Acta Materialia*, 48(12):3169-3175, Jul. 2000.

Park, T.-S., et al., "Measurement of full-field curvature and geometrical instability of thin film-substrate systems through CGS interferometry", *J. Mech. Phys. Solids*, 51(11-12):2191-2211, Nov.-Dec. 2003.

Rosakis, A.J., et al., "Full field measurements of curvature using coherent gradient sensing: application to thin film characterization", *Thin Solid Films*, 325(1-2):42-54, Jul. 1998.

Salamon, N.J., et al., "Bifurcation in isotropic thin film/substrate plates", *Int. J. Solids & Structures*, 32(3/4):473-481, Feb. 1995.

Shen, Y.L., et al., "Stresses, curvatures, and shape changes arising from patterned lines on silicon wafers", *J. Appl. Phys.*, 80(3):1388-1398, Aug. 1996.

Stoney, G.G., "The tension of metallic films deposited by electrolysis", *Proceedings of the Royal Society of London*, 82(553):172-175, May 1909.

Wikström, A., et al., "Analysis of average thermal stresses in passivated metal interconnects", *J. Appl. Phys.*, 86(11):6088-6095, Dec. 1999.

Wikström, A., et al., "Thermoelastic analysis of periodic thin lines deposited on a substrate", *J. Mech. Phys. Solids*, 47(5):1113-1130, Apr. 1999.

* cited by examiner

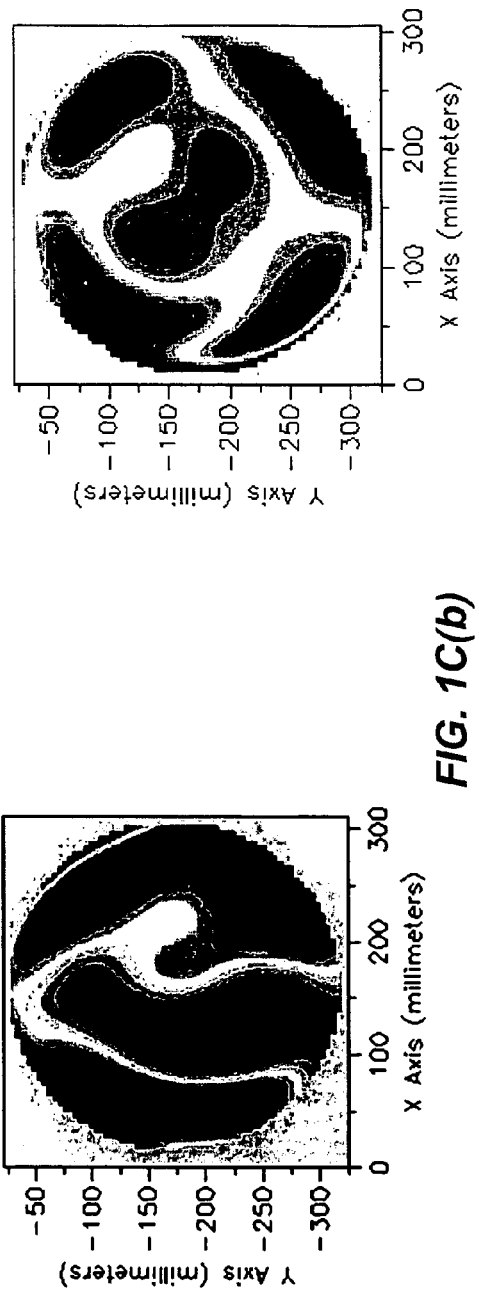
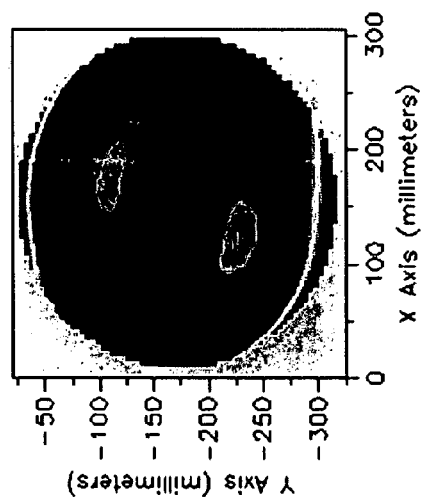
FIG. 1C(a)
FIG. 1C(b)
FIG. 1C(c)

TECHNIQUES AND DEVICES FOR CHARACTERIZING SPATIALLY NON-UNIFORM CURVATURES AND STRESSES IN THIN-FILM STRUCTURES ON SUBSTRATES WITH NON-LOCAL EFFECTS

This application claims the benefits of the following two U.S. Provisional Applications:

1. No. 60/679,328 entitled "Non-uniform, Axisymmetric Misfit Strain in Thin Films Bonded on Plate Substrates/Substrate Systems: The Relation between Non-Uniform Film Stresses and System Curvatures" and filed on May 10, 2005; and 2. No. 60/723,302 entitled "Spatially Non-uniform, Isotropic Misfit Strain in Thin Films Bonded on Plate Substrates: The Relation between Non-Uniform Film Stresses and System Curvatures" and filed on Oct. 4, 2005.

This application is also a continuation in part application of and claims the benefit of U.S. patent application Ser. No. 11/080,087 entitled "TECHNIQUES FOR ANALYZING NON-UNIFORM CURVATURES AND STRESSES IN THIN-FILM STRUCTURES ON SUBSTRATES WITH NON-LOCAL EFFECTS" and filed on Mar. 14, 2005, now U.S. Pat. No. 7,363,173, published as US 2005-0278126 A1 and PCT/US2005/009406. The U.S. patent application Ser. No. 11/080,087 further claims the benefits of the U.S. Provisional Applications No. 60/576,168 entitled "Techniques for measuring non-uniform stress and temperature in thin film structures" and filed on Jun. 1, 2004; and No. 60/614,937 entitled "The general case of arbitrary curvature and stress variation of film/substrate systems" and filed on Sep. 30, 2004.

The entire disclosures of all of the above-referenced patent applications and publications are incorporated herein by reference as part of the specification of this application.

BACKGROUND

This application relates to characterization of structures fabricated on plate substrates including but not limited to integrated structures featuring one or more thin-film layers or graded layers.

Substrates formed of suitable solid-state materials may be used as platforms to support various structures, such as layered or graded panels, and multilevel, thin film microstructures deposited on the substrates. Integrated electronic circuits, integrated optical devices and opto-electronic circuits, micro-electro-mechanical systems (MEMS) deposited on wafers, three-dimensional electronic circuits, system-on-chip structures, lithographic reticles, and flat panel display systems (e.g., LCD and plasma displays) are examples of such structures integrated on various types of plate substrates. Substrates may be made of semiconductor materials (e.g., silicon wafers), silicon on insulator wafers (SOIs), amorphous or glass materials, polymeric or organic materials, and others. Different thin material layers or different structures may be formed on the same substrate in these structures and are in contact with one another to form various interfaces with adjacent structures and with the substrate. Some devices may use complex multilayer or continuously graded geometries. In addition, some devices may form various three dimensional structures.

The above and other structures on substrates may be made from a multiplicity of fabrication and processing steps and thus may experience stresses caused by these steps, such as deposition or thermal stresses. Examples of known phenomena and processes that build up stresses in thin films include but are not limited to, lattice mismatch, chemical reactions, doping by, e.g., diffusion or implantation, rapid deposition by evaporation or sputtering, and material removal (e.g. CMP or etch). As another example, a metallization process in fabricating integrated circuits may produce multiple layers on a semiconductor substrate (e.g., silicon), often at elevated temperatures. The multiple layers may include a mixture of metal and dielectric films which usually exhibit different mechanical, physical and thermal properties from those of the underlying substrate or wafer. Hence, such multiple layers can lead to high stresses in the film layers in the interconnection structures. These stresses can cause undesired stress-induced voiding in the metal interconnects and are directly related to electromigration. In addition, the stresses may cause cracking of some films and even delamination between various film layers, between interconnects and the encapsulating dielectrics, and between the films and the substrate. It is known that metal voiding, electromigration, cracking and delamination are among the leading causes for loss of subsequent process yield and failures in integrated circuits. Therefore, these and other stresses may adversely affect the structural integrity and operations of the structures or devices, and the lifetimes of such structures or devices. Hence, the identification of the origins of the stress build-up, the accurate measurement and analysis of stresses, and the acquisition of information on the spatial distribution of such stresses are important in designing and processing the structures or devices and to improving the reliability and manufacturing yield of various layered structures.

Stresses in layered thin-film structures deposited on plate substrates may be calculated from the substrate curvature or "bow" based on a correlation between changes in the curvature and stress changes at the same location. Early attempts to provide such correlation are well known. Various formulations have been developed for measurements of stresses in thin films and most of these formulations are essentially based on extensions of Stoney's approximate plate analysis published in Proceedings of the Royal Society, London, Series A, vol. 82, pp. 172(1909). Stoney used a plate system with a stress bearing, relatively thin film deposited on a relatively thick substrate and derived a simple relation between the curvature of the plate system and the film stress at the same location based on a linear elasticity for small deformations and deflections. Stoney's formula also assumed film stresses and curvatures to be equi-biaxial (i.e., the same in all directions) and spatially constant (i.e., do not change with position) across the plate's surface.

Despite the explicit assumption of spatial uniformity in stress and curvature, the Stoney formula has often, arbitrarily, been applied to plate systems where this assumption was violated. As an example, the Stoney formula was applied in a "pointwise" manner in plate systems where the stress and curvature are known to vary with position. Such a localized application of the Stoney formula was used to extract a "local" value of stress from a "local" value of curvature. Based on this "liberal" interpretation of Stoney's formula, if the curvature component at any one location of a substrate can be measured, then the film stress at that same location can also be inferred.

SUMMARY

This application describes techniques and associated devices which include non-local effects on stresses in one location contributed by other locations on the same substrate in analysis of non-uniform stress states in layered or graded film structures on substrates. The present techniques and devices were developed in part based on the recognition that the uniformity assumption in Stoney's formula with respect to the stresses and curvatures oversimplifies the conditions in many actual layered or graded structures and devices and, therefore, compromises the accuracy of the Stoney's formula when applied to such structures. For example, according to one implementation described herein, a local contribution to stresses at a selected location on a layered thin film structure formed on a substrate is determined from curvature changes at the same selected location and in addition from a non-local contribution determined from curvature changes at all other locations across the layered structure. Next, the local contribution and the non-local contribution are combined to determine the total stresses at the selected location.

In one exemplary method described here, an elastic plate theory analysis is applied to a layered film structure formed on a substrate to include effects that the curvatures and stresses of the layered film structure are not spatially uniform and to compute a stress at one location from curvature information at said one location and curvature information at other locations. Additionally, a spatial curvature change distribution across the layered film structure may be obtained and a stress at a selected location from curvature information at said selected location and curvature information at other locations may be computed according to the spatial curvature change distribution.

In another exemplary method described here, a local contribution to stresses at a selected location on a layered film structure formed on a substrate from curvature changes at said selected location and a non-local contribution to the stresses at said selected location from curvature changes at all locations across the layered structure are determined. The local contribution and the non-local contribution are combined to determine the total stresses at said selected location. A spatial curvature change distribution across the layered structure may be obtained and used to compute the local contribution and the non-local contribution.

An example of devices described here include a module to optically interact with a layered structure and to obtain a full-field curvature map of a surface on the layered structure; and a processor in communication with the module to receive the full-field curvature map. The processor includes means for determining a local contribution to stresses at a selected location on the layered structure from curvature changes at said selected location and a non-local contribution to the stresses at said selected location from curvature changes at all locations across the layered structure, and means for combining the local contribution and the non-local contribution to determine the total stresses at said selected location.

Techniques and devices for determining a misfit strain between a film and a substrate on which the film is deposited are also described.

These and other implementations, and associated advantages are now described in greater detail in the following figures, the detailed description, and the claims.

BRIEF DESCRIPTION OF THE DRAWINGS

FIG. 1C show CGS full field measurements of curvatures of the x-direction, y-direction and mixed curvature distributions of a large, industrial wafer composed of a low-k dielectric film deposited on a Si substrate.

DETAILED DESCRIPTION

Figure 1:
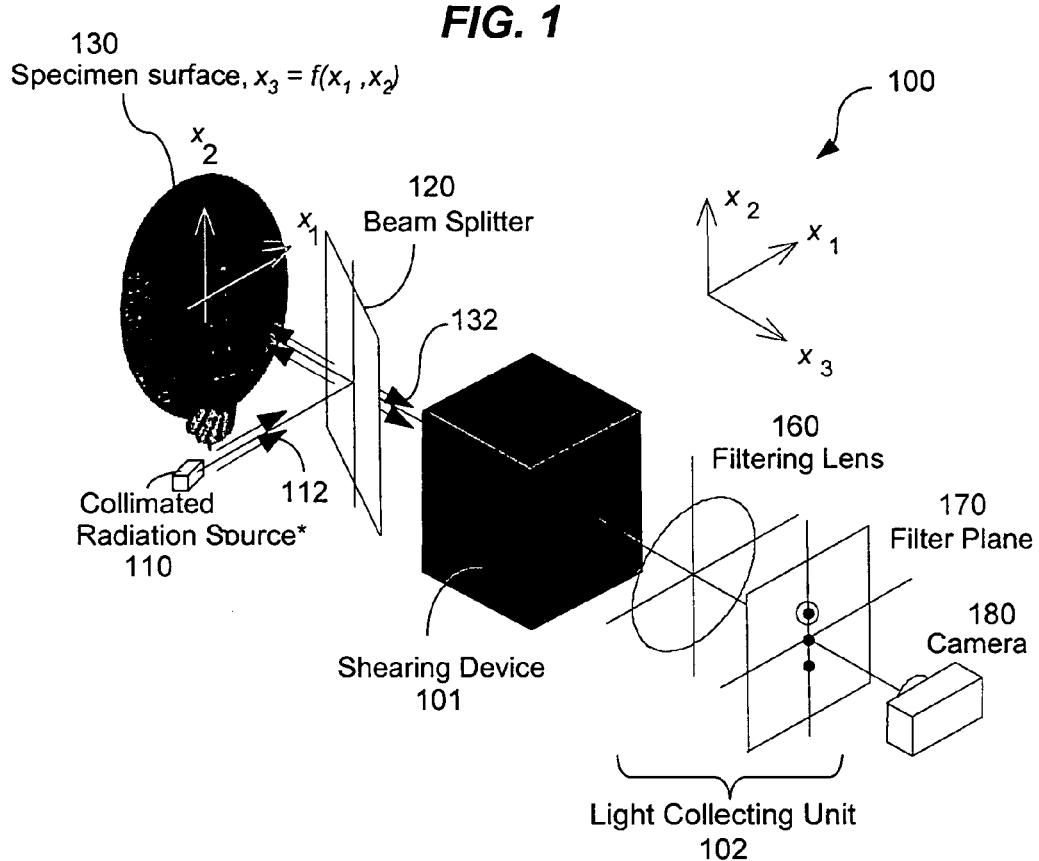
FIG. 1 shows a system with a shearing device for measuring a surface according to one implementation.

Stoney's formula was derived for an isotropic "thin" solid film of uniform thickness deposited on a much "thicker" plate substrate based on a number of assumptions. Stoney's assumptions include the following: (1) deformations and deflections in the plate system are small; (2) the relation between stresses and strains is linear as in Hook's law; (3) the film stress states are in-plane isotropic or equi-biaxial (two equal stress components in any two, mutually orthogonal in-plane directions) while the out of plane direct stress and all shear stresses vanish; (4) the system's curvature change components are equi-biaxial (two equal direct curvatures) while the twist curvature vanishes; and (5) all surviving stress and curvature components are spatially constant over the plate system's surface, a situation which is often violated in practice.

The assumption of equi-biaxial and spatially constant curvature is equivalent to assuming that the plate system would deform spherically under the action of the film stress. If this assumption were to be true, a rigorous application of Stoney's formula would indeed furnish a single film stress value. This value represents the common magnitude of each of the two direct stresses in any two, mutually orthogonal directions. This is the uniform stress for the entire film and it is derived from measurement of a single uniform curvature value which fully characterizes the system provided the deformation is indeed spherical.

Despite the explicitly stated assumptions of spatial stress and curvature uniformity, the Stoney formula is often, arbitrarily, applied to cases of practical interest where these assumptions are violated. This is typically done by applying Stoney's formula pointwise and thus extracting a local value of stress from a local measurement of the curvature of the system. This approach of inferring film stress clearly violates the uniformity assumptions of the analysis and, as such, its accuracy as an approximation is expected to deteriorate as the levels of curvature non-uniformity become more severe. To the best knowledge of the inventors, no analytical formulation capable of dealing with non-uniform stress and deformation states has been in existence.

Following the initial formulation by Stoney, a number of extensions have been derived by various researchers who have relaxed some of the other assumptions (other than the assumption of uniformity) made by his analysis.

Such extensions of the initial formulation include relaxation of the assumption of equi-biaxiality as well as the assumption of small deformations/deflections. A biaxial form of Stoney, appropriate for anisotropic film stresses, including different stress values at two different directions and non-zero, in-plane shear stresses, was derived by relaxing the assumption of curvature equi-biaxiality. Related analyses treating discontinuous films in the form of bare periodic lines or composite films with periodic line structures (e.g. encapsulated lines) have also been derived. See, U.S. Pat. No. 6,600,565 entitled "REAL-TIME EVALUATION OF STRESS FIELDS AND PROPERTIES IN LINE FEATURES FORMED ON SUBSTRATES" and issued to U.S. Pat. No. 6,513,389 "TECHNIQUE FOR DETERMINING CURVATURES OF EMBEDDED LINE FEATURES ON SUBSTRATES" to Suresh and Park. These latter analyses have also removed the assumption of equi-biaxiality and have allowed the existence of three independent curvature and stress components in the form of two, non-equal, direct and one shear or twist component. However, the uniformity assumption of these quantities over the entire plate system was retained.

In addition to the above, single, multiple and graded films and substrates have been treated in a "large" deformation analysis. See, U.S. Pat. No. 6,781,702 entitled "DETERMINING LARGE DEFORMATIONS AND STRESSES OF LAYERED AND GRADED STRUCTURES TO INCLUDE EFFECTS OF BODY FORCES" and issued to Giannakopoulos et al. The analysis technique described in this patent removes the restriction of an equi-biaxial curvature state and the assumption of "small" deformations or deflections. This analysis allows for the prediction of kinematically non-linear behavior and bifurcations in curvature states. These bifurcations are transformations from an initially equi-biaxial to a subsequently biaxial curvature state that may be induced by an increase in film stress beyond a critical level. This critical level is intimately related to the systems aspect ratio, i.e., the ratio of in-plane to thickness dimensions and elastic stiffness. This analysis also retains the assumption of spatial curvature and stress uniformity across the system. However, it allows for deformations to evolve from an initially spherical shape to an energetically favored state which features three different, still spatially constant, curvature components (e.g. ellipsoidal, cylinder or saddle shape).

None of the above-discussed extensions of Stoney's methodology have relaxed the most restrictive of Stoney's original assumption of uniformity which does not allow film stress and curvature components to vary across the plate surface.

This crucial assumption is often violated in practice since film stresses and the associated system curvatures are non-uniformly distributed over the plate area. This is often true due to non-uniformities in thermal processing (e.g. non-uniform temperature distributions during heating or cooling) and due to other non-uniformities resulting during the film deposition processes.

The present techniques remove this very restrictive assumption and allow for accurate inference of spatially varying film stress components from full field measurement of non-uniform curvature components performed across the entire plate system. Unlike Stoney and the above-described extensions, the present analysis shows that the dependence of stress on curvature is non-local. Hence, the stress at a point on the film may depend on both the local value of curvature (at the same point) and on the value of curvatures of all other points on the plate system (non-local dependence). The more pronounced the curvature non-uniformities are, the more important non-local effects become in accurately determining film stresses.

This demonstrates that other techniques based on Stoney's analysis and various extensions which do not allow for non-uniformities cannot handle the non-locality of the stress/curvature dependence. This will result in substantial prediction errors if such analyses are applied locally in cases where spatial variations of system curvatures are observed.

The techniques and devices described here use spatially-varying curvature information, gathered in a full field and real time manner, to determine stresses at each location from both local and non-local contributions from other locations. The specific form of both local and non-local contributions to be described later is not ad hoc. It has been rigorously derived by means of an elastic plate theory formulation which includes among other things strict enforcement of the appropriate stress equilibrium conditions at both the thin film and the substrate and of the appropriate continuity (tractions and displacements) condition of the film substrate interface as well as enforcement of plate boundary conditions at the edge of the plate for both the film and the substrate supporting the film. Notably, the existence of important non-local contributions, predicted by this analysis, necessitates the use of a full field technique for the measurement of all curvature components over the entire surface of the plate system. This is because the stress state at a point depends on curvature contributions from the entire system.

Figure 1A:
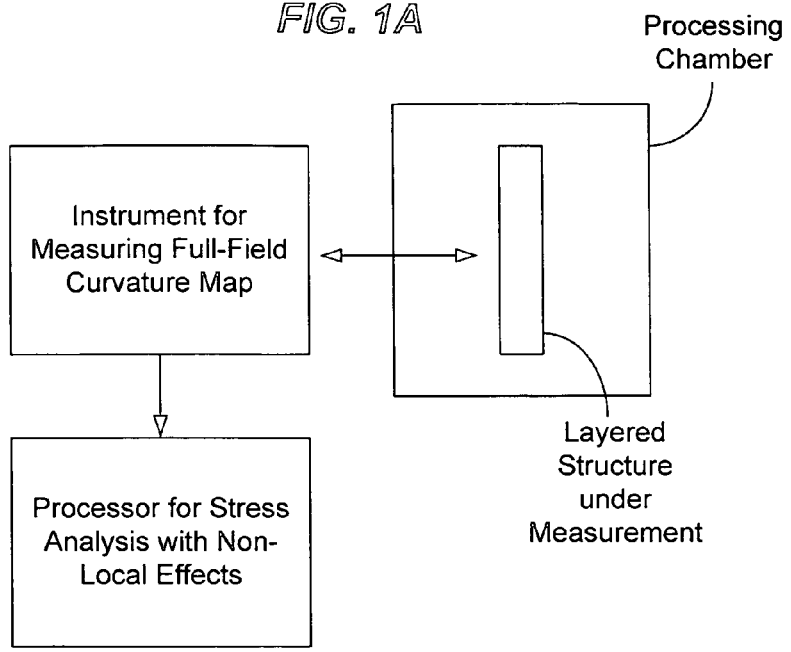
FIG. 1A shows an example of a device for measuring full-field curvature maps of a sample and processing the map to analyze the stresses on the sample through a non-local analysis.

FIG. 1A shows an example of a device for measuring stresses in a layered plate structure with the above non-local contribution. The layered structure includes one or more thin films formed on a thick substrate and may be held in a sample holder. An instrument or module for measuring all three of the full-field curvature component maps of one surface of the layered plate structure is implemented to probe the layered plate structure to perform the curvature measurement. As an example, the instrument may optically interact with the layered structure to measure the surface via one or more optical beams. As described in this application, the instrument may include an optical interferometer such as a shearing interferometer. The device in FIG. 1A further includes a processor that receives and processes the three full-field curvature component maps with two direct curvatures and the twist curvature and produces the stresses on the layered structure under measurement with both local and non-local contributions. The processor is programmed with suitable processing software instructions or routines that are described in this application. The device in FIG. 1A may be used for in-situ and real-time monitoring of a substrate or wafer under fabrication. As illustrated, the wafer may be located in a processing chamber while being measured by, e.g., an optical probe beam. Details of various exemplary implementations of the device in FIG. 1A are described below.

The following sections first describe techniques for analyzing and using relations between film stresses and system curvatures in layered plate structures that have radially symmetric distribution of film stresses or wafer temperature. Next, the techniques for analyzing relations between film stresses and system curvatures in layered plate structures with arbitrary spatial variations of film stresses, curvatures, and wafer temperature are presented. In addition, relations between film stresses and temperature as well as curvature and the temperature are described.

Radially symmetric or axisymmetric variations are often present in various layered structures. This is in part due to the inherent non-uniformities and imperfections in the fabrication processes used for making such structures. For example, typical semiconductor wafers and layered structures formed on such wafers frequently exhibit radially symmetric variations in curvatures and stresses. Such variations may be caused by radial temperature variations associated with the thermal treatment of circular wafers both during the cooling or heating phases of a thermal processing step. Such variations may also be caused by non-uniformities in the film deposition process which may result in the establishment of radial stress gradients across the film surface.

Let $K_{11}$, $K_{22}$, $K_{12}$ be the three independent Cartesian components of curvature (two direct and one twist) in a coordinate system $x_1$, $x_2$. This coordinate system is used as a reference and defines the plane of a circular plate structure in an undeformed state prior to the development of the curvature. The principal maximum and minimum curvatures in terms of $K_1$ and $K_2$ are given by:

$$K_{1,2} = \frac{K_{11} + K_{22}}{2} \pm \left\{ \left( \frac{K_{11} - K_{22}}{2} \right)^2 + K_{12}^2 \right\}^{1/2} \quad (1)$$

It can be shown that for radially symmetric or axisymmetric deformations the principal directions of curvature are radial and circumferential lines and that the principal curvature fields are equal to $K_{rr}(r)$ and $K_{\theta\theta}(r)$, respectively. These principal curvatures are functions of radial distance, r, from the wafer center. The polar twist curvature tensor component $K_{r\theta}(r)$ vanishes at every radial location on the circular plate.

The two curvature invariants of interest here are:

$$I = \frac{K_1 + K_2}{2} = \frac{K_{rr} + K_{\theta\theta}}{2} \ldots \quad (2)$$

and $$J = \frac{K_{rr} - K_{\theta\theta}}{2}$$

where $$K_{rr}(r) = \frac{\partial^2 f}{\partial r^2}, \quad K_{\theta\theta}(r) = \frac{1}{r} \frac{\partial f}{\partial r}$$

and f(r) is the equation describing the radial topography of the plate structure under consideration. For the most general case of radial symmetry, the two curvature components and the two invariants are functions of the radial position on the wafer. It should be noted that for idealized system shapes of the spherical type such as the ones assumed in the derivation of the Stoney's formula, the following relations exist:

$$K_{11} = K_{22} = K_{rr} = K_{\theta\theta} = K, \text{ and } K_{12} = K_{21} = 0, K_{r\theta} = 0 \quad (3)$$

For these special cases, a single curvature number, K, which is also constant across the wafer, is sufficient to define the entire shape. Accordingly, the invariants I and J defined reduce to:

$$I = K, J = O \quad (4)$$

This is a very restrictive and special case of radial symmetry which is seldom observed in practical structures used in devices.

In many practical situations, various industrial processing steps, such as wafer anneal, wafer cooling by, e.g., either in a rapid thermal processing (RTP) or batch furnaces, involve radial temperature fields (albeit time varying) because of chamber and wafer geometry which often imposes such a radially symmetric condition. The resulting thermal stresses associated with mismatches of the coefficients of thermal expansion (CTE) between film and wafer substrate are also radially symmetric. The same is often true within film deposition chambers where film deposition by radially varying gas flow may impose radial stress (intrinsic) symmetry. In these and other situations, the presence of radially symmetric stress fields, either thermally induced or intrinsic, can lead to wafer curvatures that are also radially symmetric.

Consider a circular composite plate structure which includes a thermally and mechanically isotropic thin film with a uniform thickness formed on an isotropic substrate with a uniform but much larger thickness. The following notations are used for convenience. Notations of $h_f$ and $h_s$ represent film and substrate thickness, respectively. The notations of $\alpha_f$, $\alpha_s$, $E_f$, $E_s$, $\nu_f$, $\nu_s$ are used to represent the coefficient of thermal expansion (CTE), Young's modulus, Poisson's Ratio of film and substrate, respectively, where the subscript "s" denotes the substrate and the subscript "f" denotes the thin film on the substrate. The composite plate structure is subject to a non-uniform but radially symmetric increase in temperature T(r) measured over a uniform reference state. The temperature field and the resulting curvature and stress fields may vary with the radial position, r, and with time: T=T(r, t). The dependence of these quantities on the time (t) is implied in the following description but not explicitly shown. It is assumed that the substrate is circular with a radius of R. Computations for rectangular and other geometries can be readily derived based on the techniques described herein. Other related notations are as listed below:

$\bar{E}_{f,s} = E_{f,s}/(1-\nu_{f,s})$ are the film and the substrate biaxial moduli, respectively; $\hat{E}_{f,s} = E_{f,s}/(1-\nu_{f,s}^2)$ are the film and the substrate plane strain moduli, respectively.

T(r) is the radial temperature increase profile and may vary with time;

$$\bar{T}(r) = \frac{2}{r^2} \int_o^r \eta T(\eta) d\eta$$

is the averaged temperature over a disc area which is centered at the wafer center and has a radius r<R.

$$\bar{T}(R) = \frac{2}{R^2} \int_o^R \eta T(\eta) d\eta$$

is the instantaneous averaged temperature over the entire wafer. $T(r) - \bar{T}(r)$ is the deviation of the local temperature from the averaged temperature over the disk from the center to a radius of r; and $T(r) - \bar{T}(R)$ is the deviation of the instantaneous local temperature from the wafer averaged temperature.

The radially varying temperature increase T(r) imposed on the composite plate structure establishes thermal mismatch stresses on the film. These thermal mismatch stresses in turn deform the composite plate structure and establish a radially symmetric deformation with two distinct, radially symmetric principal curvatures $K_{rr}(r)$ and $K_{\theta\theta}(r)$.

Based on linear thermoelasticity and the plate theory for thin film structures, the following relations between $K_{rr}(r)$, $K_{\theta\theta}(r)$ and $T(r)$ can be derived:

$$K_{\theta\theta}(r) = \frac{6\hat{E}_f h_f}{\hat{E}_s h_s^2} \left\{ [(1+v_s)\alpha_s - (1+v_f)\alpha_f] \frac{1}{r^2} \int_0^r \eta T(\eta) d\eta + \left[ \frac{1-v_s}{1+v_s}(1+v_f)(\alpha_s - \alpha_f) - \alpha_s(v_s - v_f) \right] \frac{1}{R^2} \int_0^R \eta T(\eta) d\eta \right\} \quad (5)$$

$$K_{rr}(r) = \frac{6\hat{E}_f h_f}{\hat{E}_s h_s^2} \left\{ [(1+v_s)\alpha_s - (1+v_f)\alpha_f] T(r) - [(1+v_s)\alpha_s - (1+v_f)\alpha_f] \frac{1}{r^2} \int_0^r \eta T(\eta) d\eta + \left[ \frac{1-v_s}{1+v_s}(1+v_f)(\alpha_s - \alpha_f) - \alpha_s(v_s - v_f) \right] \frac{1}{R^2} \int_0^R \eta T(\eta) d\eta \right\} \quad (6)$$

It should be noted that, unlike the Stoney-like formulations, the above expressions involve integrals over r and are non-local in nature. Hence, at a radical location r, the curvatures $K_{rr}(r)$ and $K_{\theta\theta}(r)$ are dependent not only on the local value of the temperature $T(r)$ but also on the integrals of $T(r)$ which are evaluated from zero to r or from zero to R. These radial integrals represent the contributions to curvature at a fixed location resulting from the temperature increases at neighboring locations (non-locality). Also, it is noted that these expressions cannot be directly inverted to obtain temperature from the curvature components. Similar expressions can be derived for the Cartesian components $K_{11}(r,\theta)$, $K_{22}(r,\theta)$ and $K_{12}(r,\theta)$ which are functions of $\theta$.

Based on the above, the wafer temperature and curvature invariants can now be written as follows:

$$I = \frac{K_{rr} + K_{\theta\theta}}{2} \quad (7)$$

$$= \frac{6\hat{E}_f h_f}{\hat{E}_s h_s^2} \cdot \left\{ (\alpha_s - \alpha_f) T(r) + \left[ \alpha_s \left[ \frac{(1+v_s)^2}{2(1+v_f)} - 1 \right] + \frac{\alpha_f}{2}(1-v_s) \right] (T(r) - \overline{T}(R)) \right\}$$

The above invariant I has the following properties:

The first term is Stoney-like with a temperature increase replaced by the local value of $T(r)$ at any radial distance (local contribution).

The second term is proportional to $[T(r)-\overline{T}(R)]$ which is the deviation of the local temperature from the averaged temperature over the entire wafer (non-local contribution).

When $T(r)=T_c$=constant, only the first term exists and Stoney's approximate expressions are derived as a special case. In addition, under $T(r)=T_c$, Equations (5) and (6) give the following relation:

$$K_{rr} = K_{\theta\theta} = \left[ \frac{6\hat{E}_f h_f}{\hat{E}_s h_s^2} \right] (\alpha_s - \alpha_f) T_c$$

which is the equi-biaxial Stoney result.

The invariant I is the local mean curvature at a point r.

Taking radial averages over both sides of Eq. (7), the average temperature $\overline{T}(R)$ over the entire wafer surface can be expressed as a function of the wafer averaged means curvature $\overline{I}(R)$:

$$\overline{T}(R) = \frac{\overline{E}_s h_s^2}{6\overline{E}_f h_f (\alpha_s - \alpha_f)} \cdot \overline{I}(R), \quad (8)$$

where $$\overline{I}(R) = \frac{1}{R^2} \int_0^R \eta I(\eta) d\eta$$

It should be noted that measurement of the wafer averaged mean curvature $\overline{I}(R)$ provides the average temperature $\overline{T}(R)$.

Substitution of Eq. (8) into Eq. (7) provides a relation between the local value of the temperature $T(r)$ and the local value of the mean curvature $I(r)$ as follows:

$$T(r) = \frac{\overline{E}_s h_s^2}{6\overline{E}_f h_f} \frac{1+v_f}{1+v_s} \left\{ \frac{2}{\alpha_s(1+v_s) - \alpha_f(1+v_f)} \left[ \frac{K_{rr}(r) + K_{\theta\theta}(r)}{2} - \overline{I}(R) \right] + \frac{1+v_s}{1+v_f} \frac{1}{\alpha_s - \alpha_f} \overline{I}(R) \right\} \quad (9)$$

The above relation in Eq. (9) enables the full field inference of the temperature profile, $T(r)$, provided that the mean curvature $I(r)=(K_{rr}+K_{\theta\theta})/2$ can be measured and that the film and substrate properties $\alpha_s$, $\alpha_f$, $E_s$, $E_f$ and $v_s$, $v_f$ are known. The availability of full field methods for measuring $I(r)$ is preferable but is not required for enabling this methodology. For time varying and, radially symmetric temperature profiles $T(r,t)$, the methodology remains identical. The existence of a curvature measurement method that can be implemented in real-time is needed.

Equations (5) and (6) can now be used to evaluate the second curvature invariant J as follows:

$$J = \frac{K_{rr} + K_{\theta\theta}}{2} \quad (10)$$

$$= \frac{3\hat{E}_f h_f}{\hat{E}_s h_s^2} [(1+v_s)\alpha_s - (1+v_f)\alpha_f] \{T(r) - \overline{T}(r)\}$$

It is noted that, when $T(r)=T_c$=Constant, J vanishes, and that the above equation is non-local, with integrals over r, and thus is not Stoney-like. When the temperature is uniform, the expression for J yields $K_{rr}=K_{\theta\theta}$.

The solution of the radially symmetric thermoelastic film/substrate plate structure also furnishes relations between the direct, in-plane, film stress components and $T(r)$:

$$\frac{\sigma_{rr} + \sigma_{\theta\theta}}{2} = \frac{E_f}{1-v_f} \left\{ (\alpha_s - \alpha_f) T(r) - \frac{(1-v_s)}{2} \alpha_s (T(r) - \overline{T}(R)) \right\}, \quad (11)$$

$$\frac{\sigma_{rr} - \sigma_{\theta\theta}}{2} = \frac{1}{2} \frac{E_f}{(1+v_f)} (1+v_s) \alpha_s \{T(r) - \overline{T}(r)\} \quad (12)$$

The following properties of equations (11) and (12) are noted here.

Both equations (11) and (12) feature a non-local part.

The first term on the right hand side of equation (11) is a local, Stoney-like, term and involves the local dependence of stress on $T(r)$. The second term is non-local and depends on the deviation of $T(r)$ from its average value $\overline{T}(R)$. This term vanishes when $T(r)=T_c$=constant.

Equation (12) is entirely non-local. For a spatially uniform temperature increase distribution $T(r)=T_c=\text{const}$, Eq. (12) predicts an equi-biaxial and spatially uniform state $\sigma_{rr}=\sigma_{\theta\theta}$, consistent with Stoney's restrictive assumptions.

In general, Eqs. (11) and (12) for the sum and the difference of the film stresses can be used to solve for the individual components $\sigma_{rr}$ and $\sigma_{\theta\theta}$. In the general case of radial non-uniformity, these stresses will not be equal to each other at each point and their ration will vary radially from point to point.

In addition to the direct, in-plane film stress components, the radially symmetric plate analysis also furnishes expressions for the shear stress acting at the interface between the film and the substrate, along the radial direction. This component is denoted by $\tau_r$ and following conventional notations are given by $\tau_r=\sigma_{3r}=\sigma_{r3}$ where the subscript, 3, denotes the $x_3$ direction perpendicular to the film/substrate interface. For the radially symmetric case the shear stress acting on this interface along the circumferential direction vanishes because of the radial symmetry ($\tau_\theta=\sigma_{3\theta}=\sigma_{\theta 3}=0$). The interfacial shear stress along the radial direction is given by:

$$\tau_r = \sigma_{3r} = \sigma_{r3} = \frac{E_f h_f}{1-v_f^2}\{(1+v_s)\alpha_s - (1+v_f)\alpha_f\}\frac{dT}{dr} \quad (13)$$

It should be noted that the right hand side of equation (13) is proportional to the radial derivative of the temperature. As a result, the interfacial shear stress is shown to arise because of special non-uniformities. When $T(r)=T_c=\text{constant}$, the shear stress $\tau_r$ vanishes and the analysis reduces, as a special case, to the restrictive case treated by Stoney in which no shear stresses appear. In addition, since interfacial shear stresses are known to cause delamination between thin films and substrates, the relation in Eq. (13) is of particular practical importance in the failure analysis of such systems.

In the previous sections, the relations between system curvatures and temperature as well as film stresses and temperature have been established. Elimination of temperature from such relations can provide relations between the film stress and the system curvature components.

Eqs. (5), (6), (8), (11) and (12) may be used to eliminate the temperature terms to provide the following stress-curvature invariant relations:

$$\frac{\sigma_{rr}+\sigma_{\theta\theta}}{2} = \frac{E_s h_s^2}{6(1-v_s)h_f}\left\{\frac{K_{rr}+K_{\theta\theta}}{2} + \left[\frac{1-v_s}{1+v_s} - \frac{\alpha_s(1-v_f)}{\alpha_s(1+v_s)-\alpha_f(1+v_f)}\right]\times\left[\frac{K_{rr}+K_{\theta\theta}}{2}-\bar{I}(R)\right]\right\} \quad (14)$$

$$\frac{\sigma_{rr}-\sigma_{\theta\theta}}{2} = \frac{E_s h_s^2}{6(1-v_s)h_f}\frac{\alpha_s(1-v_f)}{(1+v_s)\alpha_s-(1+v_f)\alpha_f}\frac{(K_{rr}-K_{\theta\theta})}{2} \quad (15)$$

Based on the above, individual stress components can be evaluated by adding and subtracting equations (14) and (15) and are given in terms of $I(r)$, $J(r)$ and $\bar{I}(R)$.

Equation (14) includes two terms. The first term is local and Stoney-like, and depends on the local value of the curvature invariant $$I(r) = \frac{K_{rr}(r)+K_{\theta\theta}(r)}{2}$$

which can be estimated when the sum of $(K_{rr}+K_{\theta\theta})$ can be measured at each location. The second term depends on the local difference between the local value of $I(r)$ and its wafer averaged value $$\bar{I}(R) \equiv \frac{2}{R^2}\int_0^R \left[\frac{K_{rr}(\eta)+K_{\theta\theta}(\eta)}{2}\right]\eta\, d\eta$$

Both $I(r)$ and $\bar{I}(R)$ can directly be measured provided that a full field measurement technique, such as an optical full-field measurement, is available.

Equation (15) relates to $(\sigma_{rr}-\sigma_{\theta\theta})/2$ to $$J(r) = \frac{K_{rr}(r)-K_{\theta\theta}(r)}{2}.$$

Unlike the relation in Eq. (14), the relation in Eq. (15) is purely local and is non-trivial and has a non-zero right hand side only for radially varying stresses. For spherical deformations in Stoney's model, Eq. (15) predicts equi-biaxial stress states ($\sigma_{rr}=\sigma_{\theta\theta}$). For axially symmetric cases, $\sigma_{rr}$ and $\sigma_{\theta\theta}$ are principal stresses and their difference divided by two is equal to the maximum in-plane shear stress. Equating this maximum shear stress to a yield stress $\tau_y$ is equivalent to implementing the Hüber-Von Mises yield criterion. Eq. (14) can now be used to establish a critical level of $J(r)$ for which plastic yield would commence in the film (i.e., $\tau_{max}=(\sigma_{rr}-\sigma_{\theta\theta})/2=\sigma_y$ (yield stress)). If such a level is exceeded, the locations on the film for which plasticity becomes a problem can be identified.

To successfully implement equations (14) and (15), both $K_{rr}$ and $K_{\theta\theta}$ should be measured in full field and, for time-varying curvatures, in real time. For radial symmetry these curvatures are principal curvatures and can be calculated from Eq. (1) following the measurement of $K_{11}$, $K_{22}$, and $K_{12}$.

Equation (2) provides the invariants $I(r)$ and $J(r)$ that are needed in the equation. In addition to $I(r)$ and $J(r)$ the wafer averaged mean curvature $$\bar{I}(R) \equiv \frac{2}{R^2}\int_0^R I(\eta)\eta\, d\eta$$

needs to be computed from the full field curvature data such as curvature data optically obtained with one of the optical techniques described in this application.

The above section has examined the class of radially symmetric distributions of film membrane force $f_r(r)$ and $f_\theta(r)$ associated with arbitrary radial variations of film stress, $\sigma_{rr}(r)$ and $\sigma_{\theta\theta}(r)$, resulting from a non-uniform wafer temperature increase, $T(r)$, or from other forms of non-uniform mismatch strain associated with imperfect deposition processes. The radial temperature variation has been used as a specific example to illustrate the techniques and to evaluate $K_{rr}(r)$ and $K_{\theta\theta}(r)$ in terms of $T(r)$, $\bar{T}(r)$ and $\bar{T}(R)$ in Equations (5) and (6). These relations are found to be non local and non-Stoney like.

The system curvature invariant $(K_{11}+K_{22})/2=(K_{rr}+K_{\theta\theta})/2$ (the mean curvature) can be expressed as the sum of two terms (eq. (7)). The first term is identical to the Stoney prediction with the constant temperature increase replaced by the local value of temperature at any radial distance. The second term, which can be viewed as a correction to or a deviation from the Stoney prediction, is proportional to the deviation of the local temperature from the average temperature (averaged over the entire wafer). The first term is local while the second one is non-local.

Since the film stresses can also be expressed as two terms (one local and one non local) proportional to the local temperature and the local deviation from the average of the mean respectively (Eq. (11) and (12)), the elimination of the temperature can provide a relation between a film stress invariant (radially varying mean stress) and a system curvature invariant (radially varying mean curvature) as well as its averaged value over the wafer area. This is given in Eq. (14).

A similar relation between another curvature invariant (maximum twist) and another film stress invariant (max shear stress) can also be obtained. The relation in Eq. (15) is purely local unlike the one involving mean stress and curvature.

The individual stress components $\sigma_{rr}$, $\sigma_{\theta\theta}$ can now be expressed in terms of the curvature invariants and the wafer area averaged mean curvature. These formulas are the non-local generalizations of the Stoney's formula appropriate for non-uniform radially symmetric deformations and can be used to analyze the entire class of radial variations of random shape and provide the means of using full field measurements to calculate spatially varying biaxial stresses pointwise through various types of metrology capable of providing full field, real time measurement of curvature components and their invariants, such as optical metrology (e.g. any type of shearing or non-shearing interferometry such as CGS or Twyman-Green interferometers).

Evaluation of the maximum twist allows for the measurement of the maximum, in-plane shear stress and the establishment of the radial regions on the wafer where a thin film may reach plastic flow. This is done by requiring that the maximum shear stress be equal to the film yield stress as required by the Hüber-Von Mises plastic flow criterion.

Inverse implementation of the H.R. formula and the "yield criterion" may allow for the calculation of critical levels of temperature variations from the mean, or of critical levels of twist necessary to produce plastic yielding of the film. Since plastic flow is generally undesirable this will provide a means of setting anneal temperature variation thresholds (e.g. in either RTP or batch furnaces) to avoid yielding.

The curvature/temperature versions of these formulas can be used to measure the radial profile of a heated or cooled wafer (in either an in-situ or ex-situ environment) in real time through appropriate interferometric measurement of curvature invariants in Eqs. (8) and (9).

Elimination of the temperature from equations (13) and (9) provides a relation between the interfacial shear stress $\tau_r = \sigma_{3r} = \sigma_{r3}$ (acting along the radial direction) and the radial gradient of the first curvature invariant as follows:

$$\tau_r = \sigma_{3r} = \frac{E_s h_s^2}{6(1-v_s^2)} \frac{d}{dr}(K_{rr}+K_{\theta\theta}) \quad (16)$$

The above equation is completely non-local in nature.

Since interfacial shear stresses are responsible for promoting system failures through delamination of the thin film from the substrate, Eq. (16) has particular significance. It shows that such stresses are proportional to the radial gradient of $K_{rr}+K_{\theta\theta}$ and not to it's magnitude as might have been expected of a local, Stoney-like formulation. The implementation value of Eq. (16) is that it provides an easy way of inferring these special interfacial shear stresses once the full field curvature information is available. As a result, the methodology also provides a way to evaluate the risk of and to mitigate such important forms of failure. It should be noted that for the special case of constant curvatures, this shear stress, $\tau_r$, vanishes as is the case for all Stoney-like formulations described in the introduction.

The above curvature-invariant/stress-invariant relations in radially symmetric layered structures can be generalized to non radially symmetric deformations. The techniques for analyzing layered plate structures beyond the class of geometries with a radial symmetry are described below and are applicable to arbitrary variations of stresses and curvatures across the system (e.g. wafer or other film substrate system, or other layered plate structure).

The problem under consideration is still a thermally and mechanically isotropic thin film (or thin film structure) which is deposited on a much thicker circular substrate. In this very general case the film can sustain arbitrary spatial variations of stresses which can vary with both radial and angular positions. This non-uniform stress state has been established either by a non-uniform temperature distribution acting over the entire plate system or by other reasons relating to the deposition process or other processing steps. The situation with a non-uniform temperature over the entire plate system is considered here as an example.

Additional notations are introduced here for use in the following sections for describing the techniques for analyzing the general case. More specifically, $T(r,\theta,t)$ represents an arbitrary temperature increase profile (measured over a uniform ambient), which may be a function of the radial and angular positions (r, θ), and may also be a function of time. The film-substrate system is still assumed to be a circular disk with a radius of R. The spatially averaged temperature over the entire disk substrate with an area of A and a radius R is:

$$\bar{T}(R,t) = \frac{1}{\pi R^2} \int\int_A T(r,\theta,t)dA$$

$$= \frac{1}{\pi R^2} \int_0^R \int_0^{2\pi} T(\eta,\theta,t)\eta\,d\eta\,d\theta$$

which is reduced to the definition of $\bar{T}(R)$ for the axisymmetric geometry described previously. Accordingly, the difference of $T(r,\theta,t)-\bar{T}(R)$ represents the deviation of the local temperature field, which varies with r and θ, from the wafer averaged temperature. Notations for the system's thickness, thermal and mechanical properties $h_f$, $h_s$, $\alpha_f$, $\alpha_s$, $E_f$, $E_s$, $v_f$, $v_s$, $\bar{E}_{f,s}$, and $\hat{E}_{f,s}$ are defined as before. All fields are expressed in Polar coordinates r and θ denoting position on the film substrate system. The arbitrary temperature profile $T(r,\theta,t)$ is expressed in polar coordinates and, without loss of generality, can be expanded in Taylor series as follows:

$$T(r, \theta, t) = T^{(0)}(r, t) + \sum_{n=1}^{\infty} T_c^{(n)}(r, t)\cos n\theta + \sum_{n=1}^{\infty} T_s^{(n)}(r, t)\sin n\theta \quad (17)$$

The coefficients of the Taylor expansion are then given by:

$$T^{(0)}(r, t) = \frac{1}{2\pi} \int_0^{2\pi} T(r, \theta, t) d\theta \quad (18)$$

$$T_c^{(n)}(r, t) = \frac{1}{\pi} \int_0^{2\pi} T(r, \theta, t) \cos n\theta d\theta,$$

$$n = 1, 2, 3$$

$$T_s^{(n)}(r, t) = \frac{1}{\pi} \int_0^{2\pi} T(r, \theta, t) \sin n\theta d\theta$$

Any arbitrary temperature variation can be expressed in terms of an infinite series as described above.

The system curvature (e.g. $K_{rr}$, $K_{\theta\theta}$, $K_{r\theta}$) components, the stress ($\sigma_{rr}$, $\sigma_{\theta\theta}$, $\sigma_{r\theta}$, $\sigma_{3r}$, $\sigma_{3\theta}$ . . . ) components and the temperature increase field T, all are arbitrary functions of in-plane position (r,θ) and time (t). We first provide the generalized relations between the system curvatures and T. In the following relations, the dependence on r, θ and t is implied but not explicitly shown. The variations are completely general. The expression for the sum of the direct curvature is given by $$K_{rr} + K_{\theta\theta} = \frac{6E_f h_f (1 - v_s^2)}{E_s h_s^2 (1 - v_f^2)} \Bigg\{ 2(\alpha_s - \alpha_f) \frac{1 + v_f}{1 + v_s} T + \quad (19)$$

$$\left[\left(1 + v_s - 2\frac{1 + v_f}{1 + v_s}\right)\alpha_s + \frac{1 + v_f}{1 + v_s}(1 - v_s)\alpha_f\right](T - \overline{T}(R)) +$$

$$\frac{2}{3 + v_s}\{(1 - v_s)[(1 + v_s)\alpha_s - (1 + v_f)\alpha_f] + 4(v_f - v_s)\alpha_s\} \times$$

$$\sum_{n=1}^{\infty} \frac{(n+1)r^n}{R^{2n+2}}\left[\cos n\theta \int_0^R \eta^{1+n} T_c^{(n)} d\eta + \sin n\theta \int_0^R \eta^{1+n} T_s^{(n)} d\eta\right]\Bigg\}$$

It is noted that for purely axisymmetric (radially symmetric) variations Equation (19) reduces to Eq. (7). This is true since there is no circumferential variation and as a result, the parameters $T_c^{(n)}$ and $T_s^{(n)}$ both vanish for every integer n (see eq. (18)). For the most general case, the coefficients of the infinite sum involve integrals over r (from 0 to R) and over θ (from 0 to 2π) arising from the definition, of $T_c^{(n)}$ and $T_s^{(n)}$. This demonstrates the non-local nature of the result.

The general relation between the difference of direct curvatures and T are given by the following:

$$K_{rr} - K_{\theta\theta} = \quad (20)$$

$$\frac{6E_f h_f (1 - v_s^2)}{E_s h_s^2 (1 - v_f^2)}[(1 + v_f)\alpha_s - (1 + v_f)\alpha_f]\Bigg\{\left\{T - \frac{2}{r^2}\int_0^r \eta T^{(0)} d\eta\right\} -$$

$$\sum_{n=1}^{\infty} \frac{n+1}{r^{n+2}}\left[\cos n\theta \int_0^r \eta^{1+n} T_c^{(n)} d\eta + \sin n\theta \int_0^r \eta^{1+n} T_s^{(n)} d\eta\right] -$$

$$\sum_{n=1}^{\infty} (n-1)r^{n-2}\left[\cos n\theta \int_r^R \eta^{1-n} T_c^{(n)} d\eta + \right.$$

-continued $$\left. \sin n\theta \int_r^R \eta^{1-n} T_s^{(n)} d\eta\right]\Bigg\} + \frac{6E_f h_f (1 - v_s^2)}{E_s h_s^2 (1 - v_f^2)}\frac{1}{3 + v_s}$$

$$\{(1 - v_s)[(1 + v_s)\alpha_s - (1 + v_f)\alpha_f] + 4(v_f - v_s)\alpha_s\} *$$

$$\sum_{n=1}^{\infty} \frac{n+1}{R^{n+2}}\left[n\left(\frac{r}{R}\right)^n - (n - 1)\left(\frac{r}{R}\right)^{n-2}\right]\left[\right.$$

$$\left. \cos n\theta \int_0^R \eta^{1+n} T_c^{(n)} d\eta + \sin n\theta \int_o^R \eta^{1+n} T_s^{(n)} d\eta\right]\Bigg\}$$

The line integrals are evaluated over circular discs or radius of r and over annular regions ranging from r to R. Such integrals are of the type:

$$\int_r^R \eta^{1\pm n}(\ldots) d\eta \text{ or } \int_o^r \eta^{1\pm n}(\ldots) d\eta.$$

It is also noted that ($K_{rr}$–$K_{\theta\theta}$) vanishes for the special case of the uniform temperature (as expected in the restricted case by Stoney).

In the most general case treated here, the twist curvatures $K_{r\theta}$ does not vanish and is given by:

$$K_{r\theta} = \frac{3E_f h_f (1 - v_s^2)}{E_s h_s^2 (1 - v_f^2)}[(1 + v_s)\alpha_s - (1 + v_f)\alpha_f] \quad (21)$$

$$\left\{-\sum_{n=1}^{\infty} \frac{n+1}{r^{n+2}}\left[\sin n\theta \int_0^r \eta^{1+n} T_c^{(n)} d\eta - \cos n\theta \int_0^r \eta^{1+n} T_s^{(n)} d\eta\right] + \right.$$

$$\sum_{n=1}^{\infty} (n - 1)r^{n-2}\left[\sin n\theta \int_r^R \eta^{1-n} T_c^{(n)} d\eta - \right.$$

$$\left. \cos n\theta \int_r^R \eta^{1-n} T_s^{(n)} d\eta\right]\Bigg\} - \frac{3E_f h_f (1 - v_s^2)}{E_s h_s^2 (1 - v_f^2)}$$

$$\frac{1}{3 + v_s}\{(1 - v_s)[(1 + v_s)\alpha_s - (1 + v_f)\alpha_f] + 4(v_f - v_s)\alpha_s\} \times$$

$$\sum_{n=1}^{\infty} \frac{n+1}{R^{n+2}}\left[n\left(\frac{r}{R}\right)^n - (n - 1)\left(\frac{r}{R}\right)^{n-2}\right]\left[\sin n\theta \int_0^R \eta^{1+n} T_c^{(n)} d\eta - \right.$$

$$\left. \cos n\theta \int_0^R \eta^{1+n} T_s^{(n)} d\eta\right]$$

The right hand side of Eq. (21) vanishes for a constant temperature distribution and for a temperature distribution with a radial only variation. For both of these special cases, Eq. (18) predicts $T_c^{(n)}$=$T_s^{(n)}$=0 for every positive integer n=1, 2, 3 . . . .

Relations in Eqs. (19)-(21) can be reduced to the previously presented formulae for the special case where a layered plate structure is axisymmetric (i.e., radially symmetric) so that the temperature T is not a function of θ. If T is a constant and does not change spatially, Eqs. (19)-(21) can be further reduced to the predictions from the highly restrictive Stoney formula. Additional relations can be derived from the above equations. For example, adding Eqs. (19) and (20) and dividing the result by two provides a relation between $K_{rr}$ and T(r,θ,t). As another example, subtracting Eq. (20) from Eq. (19) and dividing the result by two provides $K_{\theta\theta}$(r,θ,t) as a function of T(r,θ,t).

All of these relations are clearly non-local in nature. Hence, the temperature at a particular location r,θ influences the curvature components in all other locations on the wafer. When the spatial variation is small, e.g., the spatial temperature gradients are small, the curvature components at one location may be mainly affected by the local temperature as predicted by the Stoney formula. In many practical situations in semiconductor processing and other fabrications of other layered plate structures, the effects of spatial variations cannot be ignored and the non-local contributions are significant. Therefore, the Stoney formula may become inadequate.

The following section discusses a way of inverting Eq. (19) to provide a method for inferring arbitrary spatial temperature distributions from the measurement of the system's first curvature invariant. For convenience, the following coefficients are defined:

$$C_n = \frac{1}{\pi R^2} \int\int_A (K_{rr} + K_{\theta\theta})\left(\frac{\eta}{R}\right)^n \cos n\varphi \, dA \quad (22)$$

$$S_n = \frac{1}{\pi R^2} \int\int_A (K_{rr} + K_{\theta\theta})\left(\frac{\eta}{R}\right)^n \sin n\varphi \, dA$$

where A is the area of the wafer and is equal to $\pi R^2$ for a circular wafer with a radius of R. For n=0, the coefficient $C_0$ is given by $$C_0 = \frac{1}{\pi R^2} \int\int (K_{rr} + K_{\theta\theta}) \, dA = \overline{K_{rr} + K_{\theta\theta}} \quad (23)$$

which is the area averaged value of $K_{rr}+K_{\theta\theta}(r,\theta,t)$. For this particular case, the coefficient $S_0$=0.

Taking the area average of both sides of Eq. (19) furnishes a relation between $\overline{K_{rr}+K_{\theta\theta}}$ and T as follows:

$$\overline{T} = \frac{E_s h_s^2 (1-v_f)}{12 E_f h_f (1-v_s)} \frac{\overline{K_{rr}+K_{\theta\theta}}}{\alpha_s - \alpha_f} \quad (24)$$

From Eqs. (19) and (24), the relation between T(r,θ, t) and $K_{rr}+K_{\theta\theta}(r,\theta,t)$ can be expressed as follows:

$$T(r, \theta, t) = \quad (25)$$

$$\frac{E_s h_s^2 (1-v_f^2)}{6 E_f h_f (1-v_s^2)} \frac{1}{(1+v_s)\alpha_s - (1+v_f)\alpha_f} \Bigg\{ K_{rr} + K_{\theta\theta} - \overline{K_{rr}+K_{\theta\theta}} - $$

$$\frac{(1-v_s)[(1+v_s)\alpha_s - (1+v_f)\alpha_f] + 4(v_f-v_s)\alpha_s}{2(1+v_f)(\alpha_s-\alpha_f)} \times$$

$$\sum_{n=1}^{\infty} (n+1)\left(\frac{r}{R}\right)^n [C_n \cos n\theta + S_n \sin n\theta] \Bigg\} +$$

$$\frac{E_s h_s^2 (1-v_f)}{12 E_f h_f (1-v_s)} \frac{\overline{K_{rr}+K_{\theta\theta}}}{\alpha_s + \alpha_f}$$

where $C_n$ and $S_n$ are given in Eq. (22) in terms of area integrals involving $(K_{rr}+K_{\theta\theta})(r,\theta,t)$. Eq. (25) allows for the inference of $T(r,\theta,t)$ once $K_{rr}+K_{\theta\theta}=K_1+K_2=K_{11}+K_{22}$ is measured in full field. A full field interferometric method, e.g. any shearing interferometer such as CGS or any other type of optical topography mapping device, can be used to measure $K_{rr}$ and $K_{\theta\theta}$.

Equation (25) reduces to the equivalent axisymmetric result for radially symmetric temperature distributions (see Eqs. (8) and (9)).

The following sections provide generalized relations between film stresses and temperatures increase for layered plate structures with arbitrary spatial variations in r and θ. We further define the following notations:

$\sigma_{rr}(r,\theta,t)$: direct stress in the radial direction;

$\sigma_{\theta\theta}(r,\theta,t)$: direct hoop (or circumferential) stress;

$\sigma_{r\theta}(r,\theta,t)=\sigma_{\theta r}(r,\theta,t)$: in-plane shear stress in the plane of film (polar coordinates);

$\sigma_{33}(r,\theta,t)=0$: the out of plane direct stress vanishes because of the assumption that each film on the substrate is thin relative to the substrate;

$\tau_r=\sigma_{3r}(r,\theta,t)=\sigma_{r3}(r,\theta,t)$: shear stress, along the radial direction, acting on film at the interface between the film and the substrate; and $\tau_\theta=\sigma_{3\theta}(r,\theta,t)=\sigma_{\theta 3}(r,\theta,t)$: shear stress, along the hoop direction, acting on film at the interface between the film and the substrate.

Figure 1B:
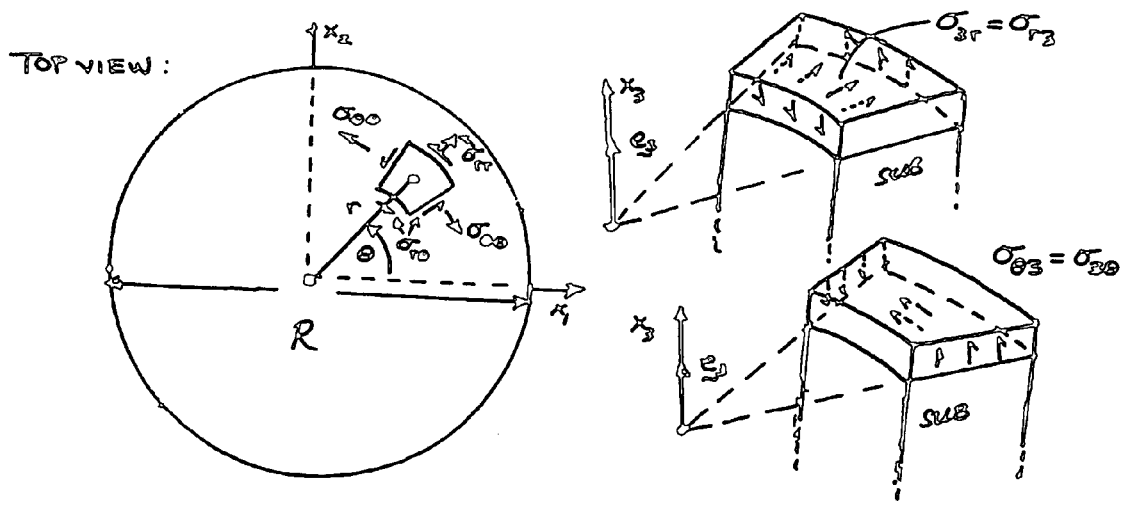
FIG. 1B illustrates various film stress components.

FIG. 1B illustrates various stresses defined above.

Based on the thermoelastic plate theory and small deformation kinematics, the relation between the above-defined stress components and a spatial-varying temperature profile on the film-substrate system can be expressed as follows. First the sum of the diagonal stress tensor elements, which is an invariant, is given by:

$$\sigma_{rr} + \sigma_{\theta\theta} = \frac{E_f}{1-v_f}\Bigg\{ 2(\alpha_s - \alpha_f)T - (1-v_s)\alpha_s(T-\overline{T}) + 2(1-v_s)\alpha_s \quad (26)$$

$$\sum_{n=1}^{\infty} \frac{n+1}{R^{2n+2}} r^n \left[\cos n\theta \int_0^R \eta^{1+n} T_c^{(n)} d\eta + \sin n\theta \int_0^R \eta^{1+n} T_s^{(n)} d\eta\right]\Bigg\}$$

where the spatial average temperature over the entire substrate disk is $$\overline{T} = \frac{1}{\pi R^2} \int\int_A T \, dA$$

Notably, the first term in Eq. (26) is Stoney-like and reflects the local contribution; the second term is similar in structure to the axisymmetric case and reflects the first-order non-local contribution (see, Eq. (11)). In addition, the third term in Eq. (26) is also highly non-local and vanishes only if the temperature increase has no dependence on θ.

Second, the difference between the diagonal stress tensor elements is given by:

$$\sigma_{rr} - \sigma_{\theta\theta} = \frac{E_f(1+v_s)\alpha_s}{1+v_f}\Bigg\{ T - \frac{2}{r^2}\int_0^r \eta \Delta T^{(0)} d\eta - \quad (27)$$

$$\sum_{n=1}^{\infty} \frac{n+1}{r^{n+2}}\left[\cos n\theta \int_0^r \eta^{n+1} T_c^{(n)} d\eta + \sin n\theta \int_0^r \eta^{n+1} T_s^{(n)} d\eta\right] -$$

$$\sum_{n=1}^{\infty} (n-1) r^{n-2} \Bigg[\cos n$$

-continued $$\theta \int_r^R \eta^{1-n} T_c^{(n)} d\eta + +\sin n\theta \int_r^R \eta^{1-n} T_s^{(n)} d\eta \Bigg] -$$

$$\sum_{n=1}^{\infty} \frac{n+1}{R^{n+2}} \left[ n\left(\frac{r}{R}\right)^n - (n-1)\left(\frac{r}{R}\right)^{n-2} \right] \left[ \cos n\theta \int_0^R \eta^{1+n} T_c^{(n)} d\eta + \sin n\theta \int_0^R \eta^{1+n} T_s^{(n)} d\eta \right] \Bigg\}$$

where the first term on the right hand side of Eq. (27) is similar in structure to the axisymmetric case (Eq. (12)) and the following terms with infinite series vanish when the temperature T is axisymmetric. Both terms in Eq. (27) vanish for $T(r, \theta, t) = Tc = $ constant so that Eq. (27) reduces to the Stoney formula.

The in-plane shear stress component is given by $$\sigma_{r\theta} = \frac{E_f(1+v_s)\alpha_s}{2(1+v_f)} \Bigg\{ -\sum_{n=1}^{\infty} \frac{n+1}{r^{n+2}} \left[ \sin n\theta \int_0^r \eta^{1+n} T_c^{(n)} d\eta - \cos n\theta \int_0^r \eta^{1+n} T_s^{(n)} d\eta \right] + \qquad (28)$$

$$\sum_{n=1}^{\infty} (n-1) r^{n-2} \left[ \sin n\theta \int_r^R \eta^{1-n} T_c^{(n)} d\eta - \cos n\theta \int_r^R \eta^{1-n} T_s^{(n)} d\eta \right] +$$

$$\sum_{n=1}^{\infty} \frac{n+1}{R^{n+2}} \left[ n\left(\frac{r}{R}\right)^n - (n-1)\left(\frac{r}{R}\right)^{n-2} \right] \left[ \sin n\theta \int_0^R \eta^{1+n} T_c^{(n)} d\eta - \cos n\theta \int_0^R \eta^{1+n} T_s^{(n)} d\eta \right] \Bigg\}$$

This in-plane shear stress component is entirely caused by non-local contributions. For both radially symmetric and constant T, the stress component $\sigma_{r\theta}$ above becomes zero.

The interfacial shear stress components along the radial direction and along the hoop or polar direction are $$\tau_r = \sigma_{3r} = \qquad (29)$$

$$\frac{E_f h_f}{1-v_f^2} \Bigg\{ [(1+v_s)\alpha_s - (1+v_f)\alpha_f] \frac{\partial T}{\partial r} + 2(v_f - v_s)\alpha_s \sum_{n=1}^{\infty} n(n+1)$$

$$\frac{r^{n-1}}{R^{2n+2}} \left[ \cos n\theta \int_0^R \eta^{1+n} T_c^{(n)} d\eta + \sin n\theta \int_0^R \eta^{1+n} T_s^{(n)} d\eta \right] \Bigg\}$$

$$\tau_\theta = \sigma_{3\theta} = \qquad (30)$$

$$\frac{E_f h_f}{1-v_f^2} \Bigg\{ [(1+v_s)\alpha_s - (1+v_f)\alpha_f] \frac{1}{r} \frac{\partial T}{\partial \theta} - 2(v_f - v_s)\alpha_s \sum_{n=1}^{\infty} n(n+1)$$

$$\frac{r^{n-1}}{R^{2n+2}} \left[ \sin n\theta \int_0^R \eta^{1+n} T_c^{(n)} d\eta - \cos n\theta \int_0^R \eta^{1+n} T_s^{(n)} d\eta \right] \Bigg\}$$

Hence, a spatially non-uniform T is required to generate interfacial shear stresses. For axisymmetric temperatures i layered plate structures, Eq. (29) reduces to Eq. (13) while Eq. (30) predicts a zero value for $\tau_\theta$. If, in addition, T is spatially uniform (i.e., $$\frac{\partial T}{\partial \theta} = \frac{\partial T}{\partial r} = 0),$$

then these shear stresses vanish everywhere as is the case for Stoney's restrictive approach.

Elimination of temperature from the curvature/temperature and the stress/temperature relations (Eqs. (19)-(21) and (26)-(30) respectively) provides the connection between film stresses and system curvatures for the most general case of arbitrary film stress variations. The results provide a simple analytical framework for the accurate and fast measurement of spatially and temporally varying stress fields through full field measurements of the complete curvature tensor. The results show that the classical Stoney approach may be inadequate, and in certain cases may be highly inaccurate since it has been derived on the basis of the assumption of spatial uniformity. The axisymmetric case is recovered as a special case.

Recall the definitions of $C_n$ and $S_n$ which are integrals in Eq. (22) and involve the first curvature invariant ($I = K_{rr} + K_{\theta\theta}/2$). In addition, recall that $S_0 = 0$, while $C_0$ is the area average of $(K_{rr} + K_{\theta\theta})$. Based on these, the relations between the in-plane film stresses $\sigma_{rr}$, $\sigma_{\theta\theta}$ and $\sigma_{r\theta}$ and the system curvatures $K_{rr}$, $K_{\theta\theta}$ and $K_{r\theta}$ can be expressed as follows:

$$\sigma_{rr} + \sigma_{\theta\theta} = \qquad (31)$$

$$\frac{E_s h_s^2}{6 h_f (1-v_s)} \Bigg\{ K_{rr} + K_{\theta\theta} + \left[ \frac{1-v_s}{1+v_s} - \frac{(1-v_f)\alpha_s}{(1+v_s)\alpha_s - (1+v_f)\alpha_f} \right]$$

$$(K_{rr} + K_{\theta\theta} - \overline{K_{rr} + K_{\theta\theta}}) + \sum_{n=1}^{\infty} (n+1)(C_n \cos n\theta + S_n \sin n\theta)$$

$$\left(\frac{r}{R}\right)^n \left[ \frac{2(1-v_f)\alpha_s}{(1+v_s)\alpha_s - (1+v_f)\alpha_f} - \frac{1-v_s}{1+v_s} \right] \Bigg\}$$

$$\sigma_{rr} - \sigma_{\theta\theta} = \frac{E_s h_s^2 (1-v_f)}{6 h_f (1-v_s)} \frac{\alpha_s}{(1+v_s)\alpha_s - (1+v_f)\alpha_f} \times \Bigg\{ K_{rr} - K_{\theta\theta} - \qquad (32)$$

$$\sum_{n=1}^{\infty} (n+1)(C_n \cos n\theta + S_n \sin n\theta) \left[ n\left(\frac{r}{R}\right)^n - (n-1)\left(\frac{r}{R}\right)^{n-2} \right] \Bigg\}$$

$$\sigma_{r\theta} = \frac{E_s h_s^2 (1-v_f)}{6 h_f (1-v_s)} \frac{\alpha_s}{(1+v_s)\alpha_s - (1+v_f)\alpha_f} \times \qquad (33)$$

$$\Bigg\{ K_{r\theta} + \frac{1}{2} \sum_{n=1}^{\infty} (n+1)(C_n \sin n\theta - S_n \cos n\theta) \left[ n\left(\frac{r}{R}\right)^n - (n-1)\left(\frac{r}{R}\right)^{n-2} \right] \Bigg\}$$

where the first terms of Eqs. (31) and (32) are identical in structure to the axisymmetric case described in Eqs. (14) and (15). In addition, the subsequent terms with infinite series of Eqs. (31) and (32) involve area integrals whose integrands are weighted contributions from $K_{rr} + K_{\theta\theta}$ only. Eq. (33) also has a structure similar to Eqs. (31) and (32) but both sides of Eq. (33) become identically zero for the axisymmetric case.

The relation between interfacial shears and curvatures are given by:

$$\tau_r = \sigma_{3r} = \frac{E_s h_s^2}{6(1-v_s^2)} \Bigg\{ \frac{\partial}{\partial r} (K_{rr} + K_{\theta\theta}) - \qquad (34)$$

$$\frac{1-v_s}{2R} \sum_{n=1}^{\infty} n(n+1)(C_n \cos n\theta + S_n \sin n\theta) \left(\frac{r}{R}\right)^{n-1} \Bigg\}$$

-continued $$\tau_\theta = \sigma_{3\theta} = \frac{E_s h_s^2}{6(1-v_s^2)} \left\{ \frac{1}{r} \frac{\partial}{\partial \theta} (K_{rr} + K_{\theta\theta}) + \right. \tag{35}$$

$$\left. \frac{1-v_s}{2R} \sum_{n=1}^{\infty} n(n+1)(C_n \sin n\theta - S_n \cos n\theta)\left(\frac{r}{R}\right)^{n-1} \right\}$$

The shear stress components acting in the interface between the film and the substrate depend on the gradient of $K_{rr}+K_{\theta\theta}$ and on non-local contributions through the area integrals $C_n$ and $S_n$ which involve $K_{rr}+K_{\theta\theta}$. The pure dependence of these expressions on the first invariant of the curvature is noted here.

When the first invariant is axisymmetric, then $C_n=S_n=0$ and:

$$\tau_r = \frac{E_s h_s^2}{6(1-v_s^2)} \frac{\partial}{\partial r}(K_{rr} + K_{\theta\theta}) \tag{36}$$

$$\tau_\theta = \frac{E_s h_s^2}{6(1-v_s^2)} \frac{1}{r} \frac{\partial}{\partial \theta}(K_{rr} + K_{\theta\theta}) = 0$$

which is consistent with the predictions of the axisymmetric special case discussed above.

The infinite series representation in Equations (31)-(35) can be rigorously substituted by a more complex to evaluate but more compact non-local integral form. The two forms are mathematically equivalent. Three examples given here:

$$\sigma_{rr} + \sigma_{\theta\theta} = \tag{37}$$

$$\frac{E_s h_s^2}{6h_f(1-v_s)} \times \left\{ (K_{rr} + K_{\theta\theta}) + \left[ \frac{1-v_s}{1+v_s} - \frac{(1-v_f)\alpha_s}{(1+v_s)\alpha_s - (1+v_f)\alpha_f} \right] \right.$$

$$\left( K_{rr} + K_{\theta\theta} - \overline{K_{rr} + K_{\theta\theta}} \right) + \left[ \frac{2(1-v_f)\alpha_s}{(1+v_s)\alpha_s - (1+v_f)\alpha_f} - \frac{1-v_s}{1+v_s} \right] \cdot$$

$$\frac{r}{\pi R^3} \times \int\int_A (K_{rr} + K_{\theta\theta}) \frac{\eta}{R}$$

$$\frac{2\cos(\varphi - \theta)\left[1 + 2\frac{\eta^2 r^2}{R^4}\right] - \frac{\eta r}{R^2}\cos(2\varphi - 2\theta) - \frac{\eta r}{R^2}\left[4 + \frac{\eta^2 r^2}{R^4}\right]}{\left[1 - 2\frac{\eta r}{R^2}\cos(\varphi - \theta) + \frac{\eta^2 r^2}{R^4}\right]^2}$$

$$\left. dA_{\eta\varphi} \right\}$$

where the integration variables are $\eta$ and $\phi$.

$$\tau_\theta = \frac{E_s h_s^2}{6(1-v_s^2)} \left\{ \frac{1}{r}\frac{\partial}{\partial \theta}(K_{rr} + K_{\theta\theta}) - \frac{(1-v_s)}{\pi R^3}\int\int_A (K_{rr} + K_{\theta\theta}) \right. \tag{38}$$

$$\left. \frac{\eta}{R} \cdot \frac{\left(1 - 3\frac{\eta^2 r^2}{R^4}\right)\sin(\varphi - \theta) + \frac{\eta^3 r^3}{R^6}\sin(2\varphi - 2\theta)}{\left[1 - 2\frac{\eta r}{R^2}\cos(\varphi - \theta) + \frac{\eta^2 r^2}{R^4}\right]^2} dA_{\eta\varphi} \right\}$$

$$\tau_r = \frac{E_s h_s^2}{6(1-v_s^2)} \left\{ \frac{\partial}{\partial r}(K_{rr} + K_{\theta\theta}) - \frac{(1-v_s)}{\pi R^3}\int\int_A (K_{rr} + K_{\theta\theta})\frac{\eta}{R} \cdot \right. \tag{39}$$

$$\left. \frac{\left(1 + 3\frac{\eta^2 r^2}{R^4}\right)\cos(\varphi - \theta) - \left[3\frac{\eta r}{R^2} + \frac{\eta^3 r^3}{R^6}\cos(2\varphi - 2\theta)\right]}{\left[1 - 2\frac{\eta r}{R^2}\cos(\varphi - \theta) + \frac{\eta^2 r^2}{R^4}\right]^3} dA_{\eta\varphi} \right\}$$

Equations (31) to (39) represent the general formulations which relate stress and curvature components and their invariants. The results hold for arbitrarily varying deformation and stresses. They are referred to here as the H.R. stress-curvature relations and can appropriately reduce to the axisymmetric formulation for radial symmetry and to the restrictive Stoney relation for spatially uniform states.

The H.R. relations are clearly non-local despite the fact that they have been obtained through the use of linearized kinematics (small strain theory) and a linear, elastic, constitutive law. When the H.R. relations are presented in the form which involves an infinite series, their non-local nature is demonstrated through the area integrals used to calculate the coefficients $C_n$ and $S_n$. The integrants of these integrals involve expression of the form:

$$K_{rr} + K_{\theta\theta}(\eta, \varphi) \cdot \left(\frac{\eta}{R}\right)^n \left\{ \begin{array}{c} \cos n\varphi \\ \sin n\varphi \end{array} \right\}$$

where $\eta, \phi$ are the two spatial integration variables. As n increases, $(\eta/R)^n$ drops drastically for most points on the wafer since $\eta \leq R$, making $C_n$ and $S_n$ decreasingly smaller.

As a consequence of this, we expect that only a few limited terms, e.g., three to five terms, in the series (depending on the severity of the non-uniformity with respect to the angular parameter $\theta$ in $K_{rr}+K_{\theta\theta}$) will be needed for most cases encountered in practice. We expect that this will allow for the early truncation of the series making the process of evaluation straight forward and quick. Of significance here is that these non-local contributions demonstrate themselves only through the combination $K_{rr}+K_{\theta\theta}$ which is equal to twice the first curvature invariant I. Indeed all the area integrals involved in the evaluation of every single stress component involve the first curvature invariant and no other contribution from individual curvature components or other invariants.

The integral forms involved in equations (37)-(39) are very compact and physically revealing. Each point $(r,\theta)$ on the film features stresses that are dependent on:

1. The local value of individual curvature components. This is referred to here as the Stoney-like contribution
2. The deviation of the local value of $K_{rr}+K_{\theta\theta}$ from its area-averaged value $\overline{K_{rr}+K_{\theta\theta}}$. This is the most primitive form of non-locality and is referred to here as the axisymmetric-like contribution.
3. The value of $K_{rr}+K_{\theta\theta}$ from all other points on the wafer. This is the non-local contribution and it becomes important when the first curvature invariant has a non-uniform $\theta$ distribution.

It should finally be noted that the above formulation can trivially be extended to cases where the film deposited on the substrate is replaced by a composite film structure which is also mechanically and thermally isotropic. In such a case the thermal and mechanical properties $\alpha_f$, $E_f$ and $v_f$ should be replaced by their composite values $\alpha_f^c$, $E_f^c$ and $v_f^c$ computed by a simple rule of mixtures involving the volume fractions and properties of the individual constituents. In this case the computed stresses simple are the averages of the stresses acting over the thickness of the composite film structure.

The above techniques for analyzing film stresses and curvatures due to spatially non-uniform temperature distributions in both spatially axisymmetric and arbitrary profiles remove certain restrictions in the classic Stoney formulation and provide relations between the film stresses and the temperature and the plate curvatures and the temperature with both Stoney-like local contributions and non-local contributions that are missing from Stoney's formulation. The temperature analyses are based on the assumption that both the substrate and the film at each location are at the same temperature and thus the driving force for the system curvature is the temperature distribution. As such, the analyses do not include the effects to the curvatures and stresses from other sources, such as the misfit strain between the film and the underlying substrate. Due to differences in material properties between the film and the substrate and due to impacts of various processes applied during the fabrication, the misfit strain between the film and the underlying substrate can be a significant source to the stresses and curvatures. Hence, it is desirable to include the misfit strain in the analysis to provide tools for relating film stresses and system curvatures to the misfit strain distribution, and for providing a relation between the film stresses and the system curvatures for spatially varying, in-plane isotropic misfit strain distributions. Such tools can be used to provide accurate experimental inference of accumulated film stress from full-field curvature measurements which may take place following various processing steps for on-line monitoring, fabrication process analysis, wafer examination and other applications.

As discussed above, many other methodologies used for the inference of thin film stress through curvature measurements are strictly restricted to stress and curvature states which are assumed to remain uniform over the entire film/substrate system. By considering a circular thin-film/substrate system subject to arbitrarily non-uniform misfit strain distributions, we derive relations between the film stresses and the misfit strain, and between the plate system's curvatures and the misfit strain. These relations feature a "local" part which involves a direct dependence of the stress or curvature components on the misfit strain at the same point, and a "non-local" part which reflects the effect of misfit strain of other points on the location of scrutiny. Most notably, we also derive relations between components of the film stress and those of system curvatures which allow for the experimental inference of such stresses from full-field curvature measurements in the presence of arbitrary non-uniformities. These relations also feature a "non-local" dependence on curvatures making full-field measurements of curvature a necessity for the correct inference of stress. Finally, it is shown that the interfacial shear tractions between the film and the substrate are related to the gradients of the first curvature invariant and can also be inferred experimentally.

Thin film structures on substrates are often made from a multiplicity of fabrication and processing steps (e.g., sequential film deposition, thermal anneal and etch steps) and often experience stresses caused by each of these steps. Examples of known phenomena and processes that build up stresses in thin films include, but are not limited to, lattice mismatch, chemical reaction, doping by e.g., diffusion or implantation, rapid deposition by evaporation or sputtering and of course thermal treatment (e.g., various thermal anneal steps). The film stress build up associated with each of these steps often produces undesirable damage that may be detrimental to the manufacturing process because of its cumulative effect on process "yield." Known problems associated to thermal excursions, in particular, include stress-induced film cracking and film/substrate delamination resulting during uncontrolled wafer cooling which follows the many anneal steps.

The intimate relation between stress-induced failures and process yield loss makes the identification of the origins of stress build-up, the accurate measurement and analysis of stresses, and the acquisition of information on the spatial distribution of stresses a crucial step in designing and controlling processing steps and in ultimately improving reliability and manufacturing yield. Stress changes in thin films following discrete process steps or occurring during thermal excursions may be calculated in principle from changes in the film/substrate systems curvatures or "bow" based on analytical correlations between such quantities.

The techniques disclosed in this application remove the two restrictive assumptions of the Stoney analysis relating to spatial uniformity and equi-biaxiality. Previous sections of this application provide analyses on the cases of thin film/substrate systems subject to a non-uniform, axisymmetric temperature distribution T(r) and an "arbitrary" temperature distribution $T(r,\theta)$. The results of this generalization are substantially much more complicated than those of the axisymmetric case T(r) but have a very similar structure. As perhaps expected they can be decomposed to a "local" or "Stoney-like" part, and a non-local part. The first term of the non-local part is identical in structure to that of the axisymmetric prediction while the rest is given in terms of an infinite series of terms of diminishing strength.

An example of non-axisymmetric curvature distribution is given in FIG. 1C. FIGS. 1C(a)-(c) show the x-direction, y-direction and mixed curvature distributions of a large, industrial wafer composed of a low-k dielectric film deposited on a Si substrate. The curvatures have been obtained by means of CGS interferometry, a technique capable of performing full-field, real-time measurements of all three independent Cartesian components ($\kappa_{xx}$, $\kappa_{yy}$ and $\kappa_{xy}=\kappa_{xy}$) of the curvature tensor over the entire wafer. The non-axisymmetry of these maps as well as the clear presence of large scale curvature non-uniformities provides strong motivation for this study. This non-uniformity is in clear violation of Stoney's $6^{th}$ assumption. Furthermore the two maps in FIGS. 1C(a) and (b) are clearly different. This is also in clear violation of Stoney's $5^{th}$ assumption which requires equi-biaxiality of curvature.

The generalization of the axisymmetric misfit strain $\in_m(r)$ to an arbitrarily varying misfit strain $\in_m(r,\theta)$ is the subject of the present investigation. Indeed, the main purpose of the present paper is to remove the two restrictive assumptions of the Stoney analysis relating to stress and curvature spatial uniformity and to in-plane isotropic equi-biaxiality for the general case of a thin film/substrate system subject to an arbitrarily varying misfit strain distribution $\in_m(r,\theta)$ whose presence can create an arbitrary stress and curvature field as well as arbitrarily large stress and curvature gradients. It should be noted that this misfit strain although spatially varying it is locally assumed to be in-plane isotropic. This does not imply that the stress state is also in-plane isotropic.

Although many important features of the two solutions, corresponding to $T(r,\theta)$ or $\in_m(r,\theta)$ non-uniformities are expected to be similar, some fundamental differences between these two situations are also anticipated. For $T(r,\theta)$, the driving force for system curvature is the temperature distribution while for $\in_m(r,\theta)$ the driving force is is the misfit strain between film and substrate. In $T(r,\theta)$, both the film and the substrate are each subjected to $T(r,\theta)$ and even if not bonded they independently develop non-uniform deformation and stress states. These states need to be further reconsidered due to eventual film/substrate bonding (continuity of displacements across the interface). In $\in_m(r,\theta)$, however, the film misfit strain induces the system deformations and the film and substrate stress. Accordingly, in the limit of zero film thickness the system and substrate stresses and deformations vanish. This is not true however when a non-uniform temperature is prescribed. When the limit is considered in this case the bare substrate still involves non-zero stresses and deformations. As a result of this there seems to be "additional" interactions and coupling between the film and the substrate which are only active when a non-uniform temperature film is in existence.

The practical implications of the above are as follows: during processes, such as various anneal or cooling steps when the temperature varies with time and across a film/substrate system, the former analysis is appropriate and should be used for the in-situ, real-time monitoring of film stress, through full-field curvature measurement. However, after the end of a process when the temperature field has equilibrated to a uniform state, the latter analysis is of relevance and can be used to provide the measurement of permanent (residual) stresses which have been locked in the film through the process and its non-uniformities (e.g., residual effects of previously performed thermal treatment due to a non-uniform temperature distribution at the time of the treatment, effects of uneven doping in the film, and others). The latter analysis is also relevant for the study of non-uniform stress build up or relieve in cases where temperature is not involved. These include certain types of film deposition, etching or polishing process all of which can be monitored by means of on-line full field curvature measurement methods.

Figure 1D:
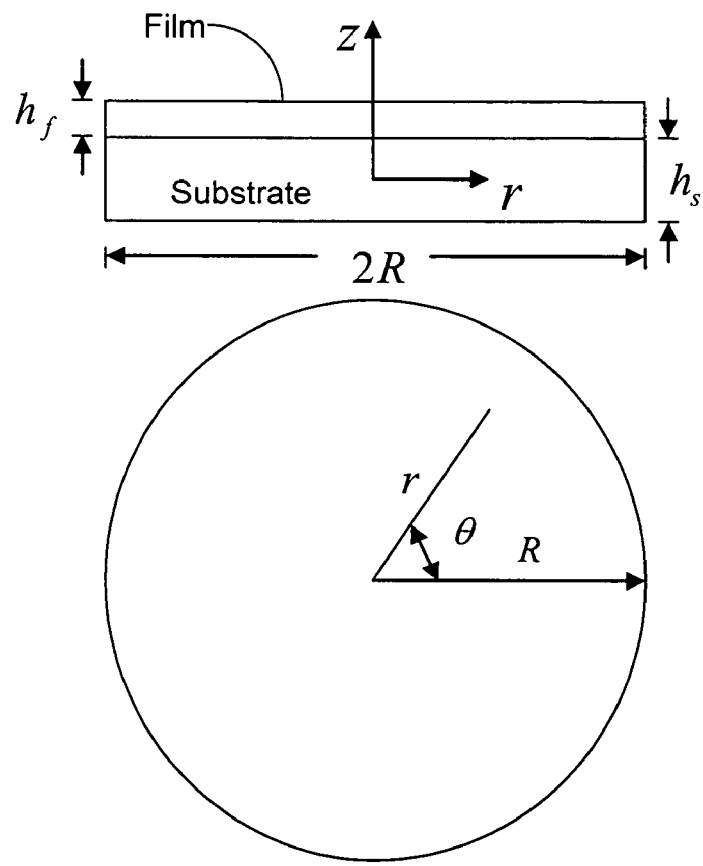
FIG. 1D is a schematic diagram of the thin film/substrate system, showing the cylindrical coordinates $(r, \theta, z)$.

The following sections will first describe the analyzing methods for film systems with an axisymmetric $\in_m(r)$ non-uniformity and then the analyzing methods for film systems with an arbitrary $\in_m(r,\theta)$ non-uniformity. The solutions for an arbitrary $\in_m(r,\theta)$ non-uniformity reduce to the solutions for axisymmetric $\in_m(r)$ non-uniformity. FIG. 1D shows the thin film system model and the cylindrical coordinates used for both analyses. In the following two sections, the equation numbering in each section is independent from elsewhere in this application.

1. Non-Uniform, Axisymmetric Misfit Strain in Thin Films Bonded on Plate Substrates/Substrate Systems: the Relation Between Non-Uniform Film Stresses and System Curvatures Radially symmetric or axisymmetric variations in particular are often present in film/substrate systems. This is in part due to the circular wafer geometry and in part due to the axisymmetric geometries of most processing equipment used to manufacture such wafers. An example of axisymmetric radial curvature distribution is given in FIG. 1E. FIGS. 1E(a) and 1E(b) show the maximum and the minimum curvature distributions (principal curvature maps) of a large, industrial 300 mm wafer composed of a 1 μm thick low-k dielectric film deposited on a 730 μm Si substrate. This wafer was subjected to thermal anneal and the curvatures shown correspond to curvature changes (after-before) following cooling from 400° C. The principal curvatures have been obtained by means of CGS interferometry. Following optical measurement of the Cartesian components, the principal curvatures $\kappa_1$ and $\kappa_2$ were obtained by using:

$$\kappa_{1,2} = \frac{\kappa_{xx}+\kappa_{yy}}{2} \pm \left\{\left(\frac{\kappa_{xx}-\kappa_{yy}}{2}\right)^2 + \kappa_{xy}^2\right\}^{1/2}. \quad (1.2)$$

The wafer shape was not a priori assumed to be radially symmetric. However, the resulting principal curvature maps clearly show that this would be an accurate approximation in this case. The axisymmetry of these maps as well as the clear presence of large scale curvature non-uniformities, along the radial direction, provides strong motivation for this study. This non-uniformity is in clear violation of Stoney's $6^{th}$ assumption. Furthermore the two maps in FIG. 1E are clearly different. This is also in clear violation of Stoney's $5^{th}$ assumption which requires equi-biaxiality of curvature. To clarify the last statement one should recall that once radial symmetry is established the only two surviving components of curvature are $$\kappa_r(r) = \frac{d^2 w(r)}{dr^2} \text{ and } \kappa_\theta(r) = \frac{1}{r}\frac{dw}{dr},$$

where $z=w(r)$ is the equation of the radial wafer shape. With respect to the polar system of FIG. 1D, $\kappa_r$ and $\kappa_\theta$ are the radial and circumferential curvature components respectively and are also equal to the maximum and minimum principal curvatures. The remaining independent curvature component (twist) vanishes along radial lines. Indeed in this case $\kappa_r(r) \neq \kappa_\theta(r) \forall R>r>0$, clearly indicating that Stoney's assumption of equi-biaxiality is violated.

This section considers the case of a thin film/substrate system subjected to arbitrary, radially symmetric misfit strain fields $\in_m(r)$ in the thin film whose presence will create a radially symmetric stress and curvature field as well as arbitrarily large stress and curvature gradients. Here the misfit strain refers to the intrinsic strain in thin film that is not associated with the stress. Our goal is to relate film stresses and system curvatures to the misfit strain distribution and to ultimately derive a relation between the film stresses and the system curvatures that would allow for the accurate experimental inference of film stress from full-field and real-time curvature measurements.

A thin film deposited on a substrate is subject to axisymmetric misfit strain distribution $\in_m(r)$, where r is the radial coordinate (FIG. 1D). The thin film and substrate are circular in the lateral direction and have a radius R.

The thin-film thickness $h_f$ is much less than the substrate thickness $h_s$, and both are much less than R, i.e. $h_f<<h_s<<R$. The Young's modulus and Poisson's ratio of the film and substrate are denoted by $E_f$, $v_f$, $E_s$, and $v_s$, respectively. The deformation is axisymmetric and is therefore independent of the polar angle $\theta$, where $(r,\theta,z)$ are cylindrical coordinates with the origin at the center of the substrate (FIG. 1D).

The substrate is modeled as a plate since it can be subjected to bending, and $h_s<<R$. The thin film is modeled as a membrane which cannot be subject to bending due to its small thickness $h_f<<h_s$. Let $u_f=u_f(r)$ denote the displacement in the radial (r) direction. The strains in the thin film are $$\varepsilon_{rr} = \frac{du_f}{dr} \text{ and } \varepsilon_{\theta\theta} = \frac{u_f}{r}.$$

The stresses in the thin film can be obtained from the linear elastic constitutive model as $$\sigma_{rr} = \frac{E_f}{1-v_f^2}\left[\frac{du_f}{dr} + v_f\frac{u_f}{r} - (1+v_f)\varepsilon_m\right], \quad (2.1)$$

$$\sigma_{\theta\theta} = \frac{E_f}{1-v_f^2}\left[v_f\frac{du_f}{dr} + \frac{u_f}{r} - (1+v_f)\varepsilon_m\right].$$

The membrane forces in the thin film are $$N_r^{(f)} = h_f\sigma_{rr}, \quad N_\theta^{(f)} = h_f\sigma_{\theta\theta}. \quad (2.2)$$

It is recalled that, for uniform misfit strain $\varepsilon_m(r)$=constant, the normal and shear stresses across the thin film/substrate interface vanish except near the free edge r=R, i.e., $$\sigma_{zz} = \sigma_{rz} = 0 \text{ at } z = \frac{h_s}{2} \text{ and } r < R.$$

Figure 1F:
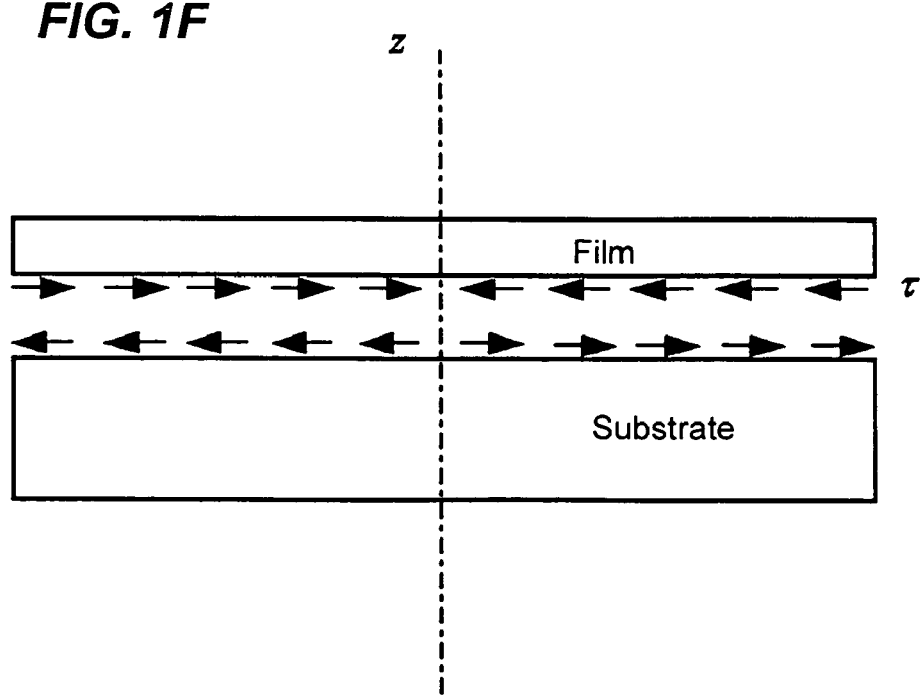
FIG. 1F is a schematic diagram of the non-uniform shear traction distribution at the interface between the film and the substrate.
Figure 1E:
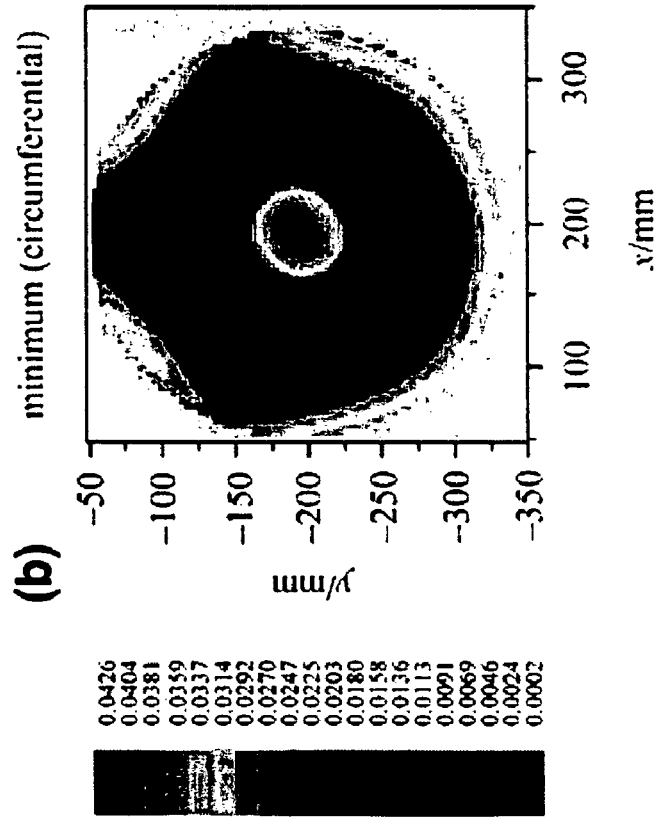
FIG. 1E shows full field curvature measurements of maximum and minimum principal curvatures of a thin film/substrate system using a CGS system.
Figure 1E:
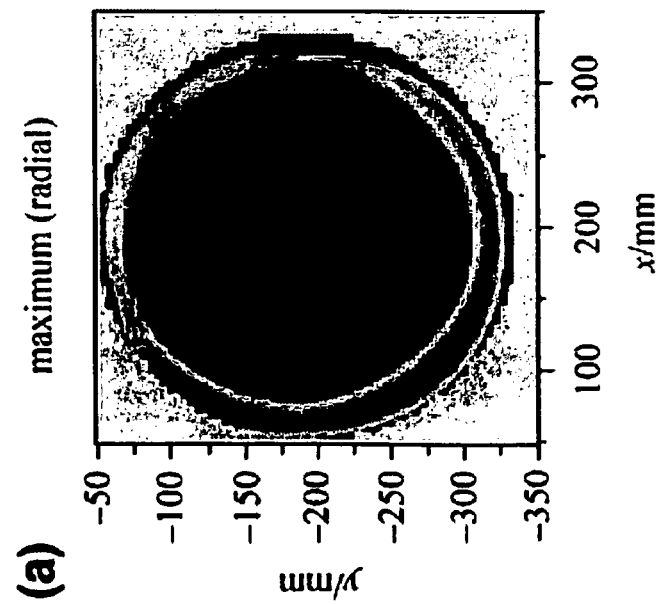

For non-uniform misfit strain $\varepsilon_m = \varepsilon_m(r)$ as in the present study, the shear stress traction may not vanish anymore, and this shear stress $\sigma_{rz}$ is denoted by $\tau(r)$ as shown in FIG. 1F. It is important to note that the normal stress traction $\sigma_{zz}$ still vanishes (except near the free edge r=R) because the thin film cannot be subject to bending. The equilibrium equation for the thin film, accounting for the effect of interface shear stress traction $\tau(r)$, becomes $$\frac{dN_r^{(f)}}{dr} + \frac{N_r^{(f)} - N_\theta^{(f)}}{r} - \tau = 0. \quad (2.3)$$

The substitution of Eqs. (2.1) and (2.2) into (2.3) yields the following governing equation for $u_f$ (and $\tau$)

$$\frac{d^2 u_f}{dr^2} + \frac{1}{r}\frac{du_f}{dr} - \frac{u_f}{r^2} = \frac{1-v_f^2}{E_f h_f}\tau + (1+v_f)\frac{d\varepsilon_m}{dr}. \quad (2.4)$$

Let $u_s$ denote the displacement in the radial (r) direction at the neutral axis (z=0) of the substrate, and w the displacement in the normal (z) direction. It is important to consider w since the substrate can be subject to bending and is modeled as a plate. The strains in the substrate are given by $$\varepsilon_{rr} = \frac{du_s}{dr} - z\frac{d^2 w}{dr^2}, \quad \varepsilon_{\theta\theta} = \frac{u_s}{r} - z\frac{1}{r}\frac{dw}{dr}. \quad (2.5)$$

The stresses in the substrate can then be obtained from the linear elastic constitutive model as $$\sigma_{rr} = \frac{E_s}{1-v_s^2}\left[\frac{du_s}{dr} + v_s\frac{u_s}{r} - z\left(\frac{d^2 w}{dr^2} + \frac{v_s}{r}\frac{dw}{dr}\right)\right], \quad (2.6)$$

$$\sigma_{\theta\theta} = \frac{E_s}{1-v_s^2}\left[v_s\frac{du_s}{dr} + \frac{u_s}{r} - z\left(v_s\frac{d^2 w}{dr^2} + \frac{1}{r}\frac{dw}{dr}\right)\right].$$

The forces and bending moments in the substrate are $$N_r^{(s)} = \int_{-\frac{h_s}{2}}^{\frac{h_s}{2}}\sigma_{rr}dz = \frac{E_s h_s}{1-v_s^2}\left[\frac{du_s}{dr} + v_s\frac{u_s}{r}\right], \quad (2.7)$$

$$N_\theta^{(s)} = \int_{-\frac{h_s}{2}}^{\frac{h_s}{2}}\sigma_{\theta\theta}dz = \frac{E_s h_s}{1-v_s^2}\left[v_s\frac{du_s}{dr} + \frac{u_s}{r}\right],$$

$$M_r = -\int_{-\frac{h_s}{2}}^{\frac{h_s}{2}}z\sigma_{rr}dz = \frac{E_s h_s^3}{12(1-v_s^2)}\left(\frac{d^2 w}{dr^2} + \frac{v_s}{r}\frac{dw}{dr}\right), \quad (2.8)$$

$$M_\theta = -\int_{-\frac{h_s}{2}}^{\frac{h_s}{2}}z\sigma_{\theta\theta}dz = \frac{E_s h_s^3}{12(1-v_s^2)}\left(v_s\frac{d^2 w}{dr^2} + \frac{1}{r}\frac{dw}{dr}\right).$$

The shear stress $\tau$ at the thin film/substrate interface is equivalent to the distributed axial force $\tau(r)$ and bending moment $h_s/2\tau(r)$ applied at the neutral axis (z=0) of the substrate. The in-plane force equilibrium equation of the substrate then becomes $$\frac{dN_r^{(s)}}{dr} + \frac{N_r^{(s)} - N_\theta^{(s)}}{r} + \tau = 0. \quad (2.9)$$

The out-of-plane force and moment equilibrium equations are given by $$\frac{dM_r}{dr} + \frac{M_r - M_\theta}{r} + Q - \frac{h_s}{2}\tau = 0, \quad (2.10)$$

$$\frac{dQ}{dr} + \frac{Q}{r} = 0, \quad (2.11)$$

where Q is the shear force normal to the neutral axis. The substitution of Eq. (2.7) into Eq. (2.9) yields the following governing equation for $u_s$ (and $\tau$)

$$\frac{d^2 u_s}{dr^2} + \frac{1}{r}\frac{du_s}{dr} - \frac{u_s}{r^2} = -\frac{1-v_s^2}{E_s h_s}\tau. \quad (2.12)$$

Equation (2.11), together with the requirement of finite Q at the center r=0, gives Q=0 in the entire substrate. Its substitution into Eq. (2.10), in conjunction with Eq. (2.8), gives the following governing equation for w (and $\tau$)

$$\frac{d^3 w}{dr^3} + \frac{1}{r}\frac{d^2 w}{dr^2} - \frac{1}{r^2}\frac{dw}{dr} = \frac{6(1-v_s^2)}{E_s h_s^2}\tau. \quad (2.13)$$

The continuity of displacement across the thin film/substrate interface requires $$u_f = u_s - \frac{h_s}{2}\frac{dw}{dr}. \quad (2.14)$$

Equations (2.4) and (2.12)-(2.14) constitute four ordinary differential equations for $u_f$, $u_s$, w and $\tau$.

We can eliminate $u_f$, $u_s$ and w from these four equations to obtain the shear stress at the thin film/substrate interface in terms of the misfit strain as $$\tau = -\frac{(1+v_f)}{\frac{1-v_f^2}{E_f h_f} + 4\frac{1-v_s^2}{E_s h_s}} \frac{d\varepsilon_m}{dr}, \quad (2.15)$$

which is a remarkable result that holds regardless of boundary conditions at the edge r=R. Therefore, the interface shear stress is proportional to the gradient of misfit strain. For uniform misfit strain $\varepsilon_m(r)$=constant, the interface shear stress vanishes, i.e., $\tau$=0.

The substitution of the above solution for shear stress $\tau$ into Eqs. (2.13) and (2.12) yields ordinary differential equations for displacements w and us in the substrate. Their general solutions are $$\frac{dw}{dr} = -\frac{6(1-v_s^2)}{E_s h_s^2} \frac{1+v_f}{\frac{1-v_f^2}{E_f h_f} + 4\frac{1-v_s^2}{E_s h_s}} \frac{1}{r}\int_0^r \eta\varepsilon_m(\eta)d\eta + \frac{B_1}{2}r, \quad (2.16)$$

$$u_s = \frac{1-v_s^2}{E_s h_s} \frac{1+v_f}{\frac{1-v_f^2}{E_f h_f} + 4\frac{1-v_s^2}{E_s h_s}} \frac{1}{r}\int_0^r \eta\varepsilon_m(\eta)d\eta + \frac{B_2}{2}r, \quad (2.17)$$

where $B_1$ and $B_2$ are constants to be determined by boundary conditions to be given in the next section. We have imposed the conditions that w and us are bounded at the center of the substrate r=0. The displacement $u_f$ in the thin film can be obtained from interface continuity condition in Eq. (2.14) as $$u_f = \frac{4(1-v_s^2)}{E_s h_s} \frac{(1+v_f)}{\frac{1-v_f^2}{E_f h_f} + 4\frac{1-v_s^2}{E_s h_s}} \frac{1}{r}\int_0^r \eta\varepsilon_m(\eta)d\eta + \left(\frac{B_2}{2} - \frac{h_s B_1}{4}\right)r. \quad (2.18)$$

The force $N_r^{(f)}$ in the thin film, which is needed for boundary conditions in the next section, is obtained from Eq. (2.2) as $$N_r^{(f)} = \quad (2.19)$$

$$\frac{E_f h_f}{1-v_f^2}\left\{-(1+v_f)\frac{\frac{1-v_f^2}{E_f h_f}\varepsilon_m}{\frac{1-v_f^2}{E_f h_f} + 4\frac{1-v_s^2}{E_s h_s}} - 4(1-v_f^2)\frac{\frac{1-v_s^2}{E_s h_s}}{\frac{1-v_f^2}{E_f h_f} + 4\frac{1-v_s^2}{E_s h_s}}\right.$$

$$\left.\frac{1}{r^2}\int_0^r \eta\varepsilon_m(\eta)d\eta + \frac{1+v_f}{2}\left(B_2 - \frac{h_s}{2}B_1\right)\right\}.$$

The force $N_r^{(s)}$ and moment $M_r$ in the substrate, which are also needed for boundary conditions in the next section, are obtained from Eqs. (2.7) and (2.8) as $$N_r^{(s)} = \frac{E_s h_s}{1-v_s^2} \quad (2.20)$$

$$\left\{(1+v_f)\frac{\frac{1-v_s^2}{E_s h_s}\varepsilon_m}{\frac{1-v_f^2}{E_f h_f} + 4\frac{1-v_s^2}{E_s h_s}} - (1-v_s)(1+v_f)\frac{\frac{1-v_s^2}{E_s h_s}}{\frac{1-v_f^2}{E_f h_f} + 4\frac{1-v_s^2}{E_s h_s}}\right.$$

$$\left.\frac{1}{r^2}\int_0^r \eta\varepsilon_m(\eta)d\eta + \frac{1+v_s}{2}B_2\right\},$$

$$M_r = \frac{h_s}{2}\left\{-(1+v_f)\frac{\varepsilon_m}{\frac{1-v_f^2}{E_f h_f} + 4\frac{1-v_s^2}{E_s h_s}} + (1-v_s)(1+v_f)\right. \quad (2.21)$$

$$\left.\frac{1}{\frac{1-v_f^2}{E_f h_f} + 4\frac{1-v_s^2}{E_s h_s}}\frac{1}{r^2}\int_0^r \eta\varepsilon_m(\eta)d\eta + \frac{E_s h_s^2}{12(1-v_s)}B_1\right\}.$$

It is interesting to observe that, in the limit of $h_f/h_s$<<1, the displacements in Eqs. (2.16)-(2.18) become $$\frac{dw}{dr} = -6\frac{E_f h_f}{1-v_f}\frac{1-v_s^2}{E_s h_s^2}\frac{1}{r}\int_0^r \eta\varepsilon_m(\eta)d\eta + \frac{B_1}{2}r + O\left(\frac{h_f^2}{h_s^2}\right), \quad (2,22)$$

$$u_s = \frac{E_f h_f}{1-v_f}\frac{1-v_s^2}{E_s h_s^2}\frac{1}{r}\int_0^r \eta\varepsilon_m(\eta)d\eta + \frac{B_2}{2}r + O\left(\frac{h_f^2}{h_s^2}\right), \quad (2.23)$$

$$u_f = 4\frac{E_f h_f}{1-v_f}\frac{1-v_s^2}{E_s h_s^2}\frac{1}{r}\int_0^r \eta\varepsilon_m(\eta)d\eta + \left(\frac{B_2}{2} - \frac{h_s B_1}{4}\right)r + O\left(\frac{h_f^2}{h_s^2}\right). \quad (2.24)$$

The boundary conditions for the analysis are as follows. The first boundary condition at the free edge r=R requires that the net force vanishes, $$N_r^{(f)} + N_r^{(s)} = 0 \text{ at } r=R. \quad (3.1)$$

The above equation, in conjunction with Eqs. (2.19) and (2.20), gives $$\frac{B_2}{2} = \frac{E_f h_f}{1-v_f}\frac{(1-v_s)^2}{E_s h_s^2}\frac{1}{R^2}\int_0^R \eta\varepsilon_m(\eta)d\eta + O\left(\frac{h_f^2}{h_s^2}\right) \quad (3.2)$$

under the limit $\varepsilon = h_f/h_s$<<1. The second boundary condition at the free edge r=R is vanishing of net moment, i.e., $$M_r - \frac{h_s}{2}N_r^{(f)} = 0 \text{ at } r = R. \quad (3.3)$$

In conjunction with Eqs. (2.22), (2.24) and (3.2), the above equation gives $$\frac{B_1}{2} = -6\frac{E_f h_f}{1-v_f}\frac{(1-v_s)^2}{E_s h_s^2}\frac{1}{R^2}\int_0^R \eta\varepsilon_m(\eta)d\eta + O\left(\frac{h_f^2}{h_s^2}\right). \quad (3.4)$$

It is important to point out that the boundary conditions can also be established from the variational principle (e.g., Freund, 2000). The total potential energy in the thin film/substrate system with the free edge at r=R is $$\Pi = 2\pi \int_0^R r\, dr \int_{-\frac{h_s}{2}}^{\frac{h_s}{2}+h_f} U\, dz, \qquad (3.5)$$

where U is the strain energy density which gives $$\frac{\partial U}{\partial \varepsilon_{rr}} = \sigma_{rr}$$

and $$\frac{\partial U}{\partial \varepsilon_{\theta\theta}} = \sigma_{\theta\theta}.$$

For constitutive relations in Eqs. (2.1) and (2.6), we obtain $$U = \frac{E}{2(1-v^2)}[\varepsilon_{rr}^2 + \varepsilon_{\theta\theta}^2 + 2v\varepsilon_{rr}\varepsilon_{\theta\theta} - 2(1+v)\varepsilon_m(\varepsilon_{rr}+\varepsilon_{\theta\theta})], \qquad (3.6)$$

where E and v take their corresponding values in the thin film (i.e., $E_f$ and $v_f$ for $$\frac{h_s}{2} + h_f \ge z \ge \frac{h_s}{2})$$

and in the substrate (i.e., $E_s$ and $v_s$ for $$\frac{h_s^\square}{2} \ge z \ge -\frac{h_s^\square}{2}),$$

and $\in_m$ is zero in the substrate. For the displacement field in Section 2 and the associated strain field, the potential energy $\pi$ in Eq. (3.5) becomes a quadratic function of parameters $B_1$ and $B_2$. The principle of minimal potential energy requires $$\frac{\partial \Pi}{\partial B_1} = 0 \text{ and } \frac{\partial \Pi}{\partial B_2} = 0. \qquad (3.7)$$

It can be shown that, as expected in the limit $h_f/h_s \ll 1$, the above two equations are equivalent to the vanishing of net force in Eq. (3.1) and net moment in Eq. (3.3). The displacements in $$\frac{dw}{dr} = -6\frac{E_f h_f}{1-v_f}\frac{1-v_s^2}{E_s h_s^2}\left[\frac{1}{r}\int_0^r \eta\varepsilon_m(\eta)\,d\eta + \frac{1-v_s}{1+v_s}\frac{r}{R^2}\int_0^R \eta\varepsilon_m(\eta)\,d\eta\right], \qquad (3.8)$$

$$u_f = \qquad (3.9)$$
$$4u_s = 4\frac{E_f h_f}{1-v_f}\frac{1-v_s^2}{E_s h_s}\left[\frac{1}{r}\int_0^r \eta\varepsilon_m(\eta)\,d\eta + \frac{1-v_s}{1+v_s}\frac{r}{R^2}\int_0^R \eta\varepsilon_m(\eta)\,d\eta\right]$$

for $h_f/h_s \ll 1$.

We now examine the stresses and curvatures in thin film and substrate. The substrate curvatures can be obtained from the displacement w as $$\kappa_r = \frac{d^2 w}{dr^2} = -6\frac{E_f h_f}{1-v_f} \qquad (4.1)$$
$$\frac{1-v_s^2}{E_s h_s^2}\left[\varepsilon_m - \frac{1}{r^2}\int_0^r \eta\varepsilon_m(\eta)\,d\eta + \frac{1-v_s}{1+v_s}\frac{1}{R^2}\int_0^R \eta\varepsilon_m(\eta)\,d\eta\right],$$

$$\kappa_\theta = \frac{1}{r}\frac{dw}{dr} = -6\frac{E_f h_f}{1-v_f}$$
$$\frac{1-v_s^2}{E_s h_s^2}\left[\frac{1}{r^2}\int_0^r \eta\varepsilon_m(\eta)\,d\eta + \frac{1-v_s}{1+v_s}\frac{1}{R^2}\int_0^R \eta\varepsilon_m(\eta)\,d\eta\right].$$

The sum of these two curvatures is $$\kappa_r + \kappa_\theta = -12\frac{E_f h_f}{1-v_f}\frac{1-v_s}{E_s h_s^2}\left[\overline{\varepsilon_m} + \frac{1+v_s}{2}(\varepsilon_m - \overline{\varepsilon_m})\right], \qquad (4.2)$$

or equivalently $$\kappa_r + \kappa_\theta = -12\frac{E_f h_f}{1-v_f}\frac{1-v_s}{E_s h_s^2}\left[\varepsilon_m - \frac{1-v_s}{2}(\varepsilon_m - \overline{\varepsilon_m})\right], \qquad (4.3)$$

where $$\overline{\varepsilon_m} = \frac{2}{R^2}\int_0^R \eta\varepsilon_m(\eta)\,d\eta = \frac{\iint \varepsilon_m dA}{\pi R^2}$$

is the average misfit strain in the thin film. The first term on the right hand side of Eq. (4.2) corresponds to a uniform (average) misfit strain, while the second term gives the deviation from the uniform misfit strain. Such a deviation is proportional to the difference between the local misfit strain $\in_m$ and the average misfit strain $\overline{\in_m}$. Similarly, the first term on the right hand side of Eq. (4.3) corresponds to the local misfit strain $\in_m$, while the second term gives the deviation from the local misfit strain and is also proportional to $\in_m - \overline{\in_m}$.

The difference between two curvatures in Eq. (4.1) is $$\kappa_r - \kappa_\theta = -6\frac{E_f h_f}{1-v_f}\frac{1-v_s^2}{E_s h_s^2}\left[\varepsilon_m - \frac{2}{r^2}\int_0^r \eta\varepsilon_m(\eta)\,d\eta\right]. \qquad (4.4)$$

The forces in the substrate are obtained from Eq. (2.7) as $$N_r^{(s)} = \frac{E_f h_f}{1-v_f}\left\{\varepsilon_m - \frac{1-v_s}{2}\left[\frac{2}{r^2}\int_0^r \eta\varepsilon_m(\eta)d\eta - \overline{\varepsilon_m}\right]\right\}, \quad (4.5)$$

$$N_\theta^{(s)} = \frac{E_f h_f}{1-v_f}\left\{v_s\varepsilon_m + \frac{1-v_s}{2}\left[\frac{2}{r^2}\int_0^r \eta\varepsilon_m(\eta)d\eta + \overline{\varepsilon_m}\right]\right\}$$

for $h_f/h_s \ll 1$. The bending moments in the substrate are obtained from Eq. (2.8) as $$M_r = \frac{E_f h_f}{1-v_f}\frac{h_s}{2}\left\{-\varepsilon_m + \frac{1-v_s}{2}\left[\frac{2}{r^2}\int_0^r \eta\varepsilon_m(\eta)d\eta - \overline{\varepsilon_m}\right]\right\}, \quad (4.6)$$

$$M_\theta = \frac{\cdot E_f h_f}{1-v_f}\frac{h_s}{2}\left\{-v_s\varepsilon_m - \frac{1-v_s}{2}\left[\frac{2}{r^2}\int_0^r \eta\varepsilon_m(\eta)d\eta + \overline{\varepsilon_m}\right]\right\}$$

for $h_f/h_s \ll 1$. The stresses in the substrate are related to the forces and moments by $$\sigma_{rr}^{(s)} = \frac{N_r^{(s)}}{h_s} - \frac{12 M_r}{h_s^3}z, \quad (4.7)$$

$$\sigma_{\theta\theta}^{(s)} = \frac{N_\theta^{(s)}}{h_s} - \frac{12 M_\theta}{h_s^3}z.$$

The stresses in the thin film are obtained from Eq. (2.1), $$\sigma_{rr}^{(f)} = \frac{E_f}{1-v_f}\left\{-\varepsilon_m + 4\frac{E_f h_f}{1-v_f^2}\frac{1-v_s^2}{E_s h_s}\left[\varepsilon_m - (1-v_f)\frac{1}{r^2}\int_0^r \eta\varepsilon_m(\eta)d\eta + \frac{1+v_f}{2}\frac{1-v_s}{1+v_s}\overline{\varepsilon_m}\right]\right\} + O\left(\frac{h_f^2}{h_s^2}\right), \quad (4.8)$$

$$\sigma_{\theta\theta}^{(f)} = \frac{E_f}{1-v_f}\left\{-\varepsilon_m + 4\frac{E_f h_f}{1-v_f^2}\frac{1-v_s^2}{E_s h_s}\left[v_f\varepsilon_m + (1-v_f)\frac{1}{r^2}\int_0^r \eta\varepsilon_m(\eta)d\eta + \frac{1+v_f}{2}\frac{1-v_s}{1+v_s}\overline{\varepsilon_m}\right]\right\} + O\left(\frac{h_f^2}{h_s^2}\right),$$

where we have kept the terms that are up to the order of $O(h_f/h_s)$ in order to illustrate the difference between these two stresses. The sum and difference of these stresses have the following simple expressions $$\sigma_{rr}^{(f)} + \sigma_{\theta\theta}^{(f)} = \frac{E_f}{1-v_f}(-2\varepsilon_m) + O\left(\frac{h_f}{h_s}\right), \quad (4.9)$$

$$\sigma_{rr}^{(f)} - \sigma_{\theta\theta}^{(f)} = 4E_f\frac{E_f h_f}{1-v_f^2}\frac{1-v_s^2}{E_s h_s}\left[\varepsilon_m - \frac{2}{r^2}\int_0^r \eta\varepsilon_m(\eta)d\eta\right] + O\left(\frac{h_f^2}{h_s^2}\right).$$

It is noted that $\sigma_{rr}^{(f)} - \sigma_{\theta\theta}^{(f)}$ is in general expected to be smaller than $\sigma_{rr}^{(f)} + \sigma_{\theta\theta}^{(f)}$ for $h_f/h_s \ll 1$. This issue will be discussed again in the next section in relation to the dependence of this stress difference to the difference between polar curvature components.

For uniform misfit strain $\in_m=$ constant, the curvatures in the substrate obtained from Eqs. (4.2)-(4.4) become $$\kappa = \kappa_r = \kappa_\theta = -6\frac{E_f h_f}{1-v_f}\frac{1-v_s}{E_s h_s^2}\varepsilon_m.$$

The stresses in the thin film obtained from Eq. (4.9) become $$\sigma = \sigma_{rr}^{(f)} = \sigma_{\theta\theta}^{(f)} = \frac{E_f}{1-v_f}(-\varepsilon_m).$$

For this special case only, both stress and curvature states become equi-biaxial. The elimination of misfit strain $\in_m$ from the above two equations yields a simple relation $$\sigma = \frac{E_s h_s^2}{6(1-v_s)h_f}\kappa.$$

This is the relation obtained by Stoney [see Eq. (1.1)] and it has been used to estimate the thin-film stress σ from the substrate curvature κ, if the misfit strain, stress and curvature are all constants, and if the plate system shape is spherical. In the following, we extend such a relation for non-uniform misfit strain distribution.

We now describe the extension of Stoney formula for non-uniform misfit strain distribution. The stresses and curvatures are all given in terms of the misfit strain in the previous section. We extend the Stoney formula for non-uniform misfit distribution in this section by establishing the direct relation between the thin-film stresses and substrate curvatures.

It is shown that both $\kappa_r - \kappa_\theta$ in Eq. (4.4) and $\sigma_{rr}^{(f)} - \sigma_{\theta\theta}^{(f)}$ in Eq. (4.9) are proportional to $$\varepsilon_m(r) - \frac{2}{r^2}\int_0^r \eta\varepsilon_m(\eta)d\eta.$$

Therefore, elimination of misfit strain gives the difference $\sigma_{rr}^{(f)} - \sigma_{\theta\theta}^{(f)}$ in thin-film stresses directly proportional to the difference $\kappa_r - \kappa_\theta$ in substrate curvatures, $$\sigma_{rr}^{(f)} - \sigma_{\theta\theta}^{(f)} = -\frac{2E_f h_s}{3(1+v_f)}(\kappa_r - \kappa_\theta). \quad (5.1)$$

Figure 2:
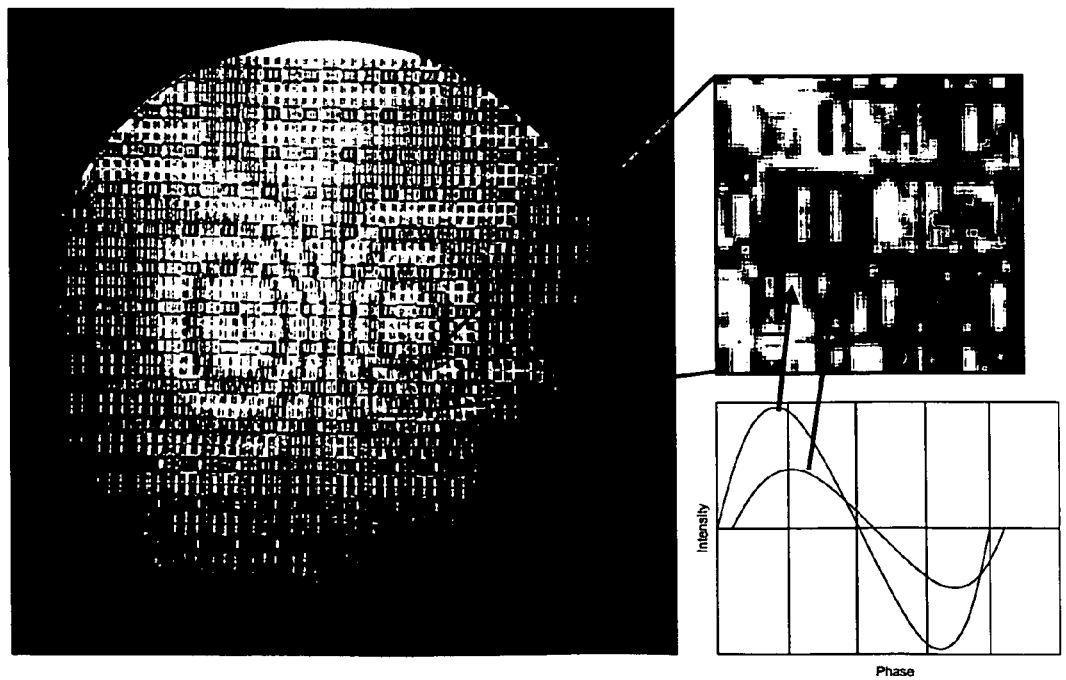
FIG. 2 shows an interference pattern to illustrate a phase shifting technique.

The above relation clearly shows that the radial and circumferential stress components will be equal only if the equivalent curvature components are also equal (Unlike what was stated in Stoney's $5^{th}$ and $6^{th}$ assumptions this is not true in general as can be clearly seen by FIG. 2. In this experimental example, the two polar components of curvature displayed are radially varying but are clearly unequal.

We now focus on the sum of thin-film stresses $\sigma_{rr}^{(f)} + \sigma_{\theta\theta}^{(f)}$ and sum of substrate curvatures $\kappa_r + \kappa_\theta$. We define the average substrate curvature $\overline{\kappa_r + \kappa_\theta}$ as $$\overline{\kappa_r + \kappa_\theta} = \frac{1}{\pi R^2} \int\int_A (\kappa_r + \kappa_\theta) \eta d\eta d\theta = \frac{2}{R^2} \int_0^R \eta(\kappa_r + \kappa_\theta) d\eta. \quad (5.2)$$

It can be related to the average misfit strain $\overline{\in_m}$ by averaging both sides of Eq. (4.3), i.e., $$\overline{\kappa_r + \kappa_\theta} = 12 \frac{E_f h_f}{1 - \nu_f} \frac{1 - \nu_s}{E_s h_s^2}(-\overline{\varepsilon_m}). \quad (5.3)$$

The deviation from the average curvature, $\kappa_r + \kappa_\theta - \overline{\kappa_r + \kappa_\theta}$, can be related to the deviation from the average misfit strain $\in_m - \overline{\in_m}$ as $$\kappa_{rr} + \kappa_{\theta\theta} - \overline{\kappa_{rr} + \kappa_{\theta\theta}} = -6 \frac{E_f h_f}{1 - \nu_f} \frac{1 - \nu_s^2}{E_s h_s^2}(\varepsilon_m - \overline{\varepsilon_m}). \quad (5.4)$$

The elimination of misfit strain $\in_m - \overline{\in_m}$ and average misfit strain $\overline{\in_m}$ from Eqs. (5.3), (5.4) and (4.9) gives the sum of thin-film stresses in terms of curvature as $$\sigma_{rr} + \sigma_{\theta\theta} = \frac{E_s h_s^2}{6(1 - \nu_s) h_f} \left\{ \kappa_{rr} + \kappa_{\theta\theta} + \frac{1 - \nu_s}{1 + \nu_s}[\kappa_{rr} + \kappa_{\theta\theta} - \overline{\kappa_{rr} + \kappa_{\theta\theta}}] \right\}. \quad (5.5)$$

The above equation, together with Eq. (5.1), provides direct relations between thin-film stresses and substrate curvatures. It is important to note that stresses at a point in the thin film depend not only on curvatures at the same point (local dependence), but also on the average curvature in the entire substrate (non-local dependence).

The interface stress $\tau(r)$ gives in Eq. (2.15) can also be directly related to substrate curvatures via $$\tau = \frac{E_s h_s^2}{6(1 - \nu_s^2)} \frac{d}{dr}(\kappa_{rr} + \kappa_{\theta\theta}). \quad (5.6)$$

This provides a remarkably simple way to estimate the interface shear stress from radial gradients of the two non-zero substrate curvatures.

Since interfacial shear stresses are responsible for promoting system failures through delamination of the thin film from the substrate, Eq. (5.6) has particular significance. It shows that such stresses are proportional to the radial gradient of $\kappa_{rr} + \kappa_{\theta\theta}$ and not to its magnitude as might have been expected of a local, Stoney-like formulation. The implementation value of Eq. (5.6) is that it provides an easy way of inferring these special interfacial shear stresses once the full-field curvature information is available. As a result, the methodology also provides a way to evaluate the risk of and to mitigate such important forms of failure. It should be noted that for the special case of spatially constant curvatures, this interfacial shear stress $\tau$ vanishes as is the case for all Stoney-like formulations described in the introduction.

In addition, Eq. (5.5) also reduces to Stoney's result for the case of spatial curvature uniformity. Indeed for this case, Eq. (5.5) reduces to:

$$\sigma_{rr} + \sigma_{\theta\theta} = \frac{E_s h_s^2}{6(1 - \nu_s) h_f}(\kappa_{rr} + \kappa_{\theta\theta}). \quad (5.7)$$

If in addition the curvature state is equi-biaxial ($\kappa_{rr} = \kappa_{\theta\theta}$), as assumed by Stoney, the classic Stoney formula is recovered while relation (5.1) furnishes $\sigma_{rr} = \sigma_{\theta\theta}$ (stress equi-biaxiality) as a special case.

Unlike Stoney's original analysis and its extensions discussed in the introduction, the present analysis shows that the dependence of the stresses on the curvatures is not generally "local". Here the stress components at a point on the film will, in general, depend on both the local value of the curvature components (at the same point) and on the value of curvatures of all other points on the plate system (non-local dependence). The more pronounced the curvature non-uniformities are, the more important such non-local effects become in accurately determining film stresses from curvature measurements. This demonstrates that analyses methods based on Stoney's approach and its various extensions cannot handle the non-locality of the stress/curvature dependence and may result in substantial stress prediction errors if such analyses are applied locally in cases where spatial variations of system curvatures and stresses are present.

The presence of non-local contributions in such relations also has implications regarding the nature of diagnostic methods needed to perform wafer-level film stress measurements. Notably the existence of non-local terms necessitates the use of full-field methods capable of measuring curvature components over the entire surface of the plate system (or wafer). Furthermore measurement of all independent components of the curvature field is necessary. This is because the stress state at a point depends on curvature contributions (from both $K_{rr}$ and $K_{\theta\theta}$) from the entire plate surface.

Regarding the curvature-misfit strain [Eqs. (4.1)-(4.4)] and stress-misfit strain [Eqs. (4.8)-(4.10)] relations the following points are noteworthy. These relations also generally feature a dependence of local misfit strain $\in_m(r)$ which is "Stoney-like" as well as a "non-local" contribution from the misfit strain of other points on the plate system. Furthermore the stress and curvature states are always non-equibiaxial (i.e., $\sigma_{rr}^{(f)} \neq \sigma_{\theta\theta}^{(f)}$ and $\kappa_{rr} \neq \kappa_{\theta\theta}$) in the presence of misfit strain non-uniformities. Only if $\in_m$-constant these states become equi-biaxial, the "non-local" contributions vanish and Stoney's original results are recovered as a special case and a highly unlikely scenario as clearly demonstrated from FIG. 1E.

The existence of radial non-uniformities also results in the establishment of shear stresses along the film/substrate interface. These stresses are in general proportional to the radial derivatives of the first curvature invariant $\kappa_{rr} + \kappa_{\theta\theta}$ [Eq. (5.6)]. In terms of misfit strain these interfacial shear stresses are also proportional to the radial gradient of the misfit strain distribution $\in_m(r)$. The occurrence of such stresses is ultimately related to spatial non-uniformities and as a result such stresses vanish for the special case of uniform $\kappa_{rr} + \kappa_{\theta\theta}$ or $\in_m$ considered by Stoney and its various extensions. Since film delamination is a commonly encountered form of failure during wafer manufacturing, the ability to estimate the level and distribution of such stresses from wafer-level metrology might prove to be invaluable in enhancing the reliability of such systems.

2. Spatially Non-Uniform, Isotropic Misfit Strain in Thin Films Bonded on Plate Substrates: the Relation Between Non-Uniform Film Stresses and System Curvatures We now describe analysis of a thin film deposited on a substrate that is subject to arbitrary misfit strain distribution $\in^m(r,\theta)$, where $r$ and $\theta$ are the polar coordinates (FIG. 1D). The thin film and substrate are circular in the lateral direction and have a radius R. Like in the previous section, the thin-film thickness $h_f$ is much less than the substrate thickness $h_s$, and both are much less than R, i.e. $h_f \ll h_s \ll R$. The Young's modulus and Poisson's ratio of the film and substrate are denoted by $E_f$, $v_f$, $E_s$ and $v_s$, respectively. The substrate is modeled as a plate since it can be subjected to bending, and $h_s \ll R$. The thin film is modeled as a membrane which cannot be subject to bending due to its small thickness $h_f \ll h_s$.

Let $u_r^{(f)}$ and $u_\theta^{(f)}$ denote the displacements in the radial (r) and circumferential ($\theta$) directions. The strains in the thin film are $$\varepsilon_{rr} = \frac{\partial u_r^{(f)}}{\partial r}, \; \varepsilon_{\theta\theta} = \frac{u_r^{(f)}}{r} + \frac{1}{r}\frac{\partial u_\theta^{(f)}}{\partial \theta},$$

and $$\gamma_{r\theta} = \frac{1}{r}\frac{\partial u_r^{(f)}}{\partial \theta} + \frac{\partial u_\theta^{(f)}}{\partial r} - \frac{u_\theta^{(f)}}{r}.$$

The strains in the film are related to the stresses and the misfit strain $\in^m$ by $$\varepsilon_{ij} = \frac{1}{E_f}[(1+v_f)\sigma_{ij} - v_f \sigma_{kk}\delta_{ij}] + \varepsilon^m \delta_{ij}$$

via the linear elastic constitutive model, which can be equivalently written as $$\sigma_{rr} = \frac{E_f}{1-v_f^2}\left[\frac{\partial u_r^{(f)}}{\partial r} + v_f\left(\frac{u_r^{(f)}}{r} + \frac{1}{r}\frac{\partial u_\theta^{(f)}}{\partial \theta}\right) - (1+v_f)\varepsilon^m\right], \quad (2.1)$$

$$\sigma_{\theta\theta} = \frac{E_f}{1-v_f^2}\left[v_f \frac{\partial u_r^{(f)}}{\partial r} + \frac{u_r^{(f)}}{r} + \frac{1}{r}\frac{\partial u_\theta^{(f)}}{\partial \theta} - (1+v_f)\varepsilon^m\right],$$

$$\sigma_{r\theta} = \frac{E_f}{2(1-v_f)}\left(\frac{1}{r}\frac{\partial u_r^{(f)}}{\partial \theta} + \frac{\partial u_\theta^{(f)}}{\partial r} - \frac{u_\theta^{(f)}}{r}\right).$$

The membrane forces in the thin film are $$N_r^{(f)} = h_f \sigma_{rr}, N_\theta^{(f)} = h_f \sigma_{\theta\theta}, N_{r\theta}^{(f)} = h_f \sigma_{r\theta}. \quad (2.2)$$

For uniform misfit strain distribution $\in^m$=constant, the normal and shear stresses across the thin film/substrate interface vanish except near the free edge r=R, i.e., $$\sigma_{zz} = \sigma_{rz} = \sigma_{r\theta} = 0 \text{ at } z = \frac{h_s}{2} \text{ and } r < R.$$

For non-uniform misfit strain distribution $\in^m = \in^m(r,\theta)$, the shear stress $\sigma_{rz}$ and $\sigma_{\theta z}$ at the interface may not vanish anymore, and are denoted by $\tau_r$ and $\tau_\theta$, respectively. It is important to note that the normal stress traction $\sigma_{zz}$ still vanishes (except near the free edge r=R) because the thin film cannot be subject to bending. The equilibrium equations for the thin film, accounting for the effect of interface shear stresses $\tau_r$ and $\tau_\theta$, become $$\frac{\partial N_r^{(f)}}{\partial r} + \frac{N_r^{(f)} - N_\theta^{(f)}}{r} + \frac{1}{r}\frac{\partial N_{r\theta}^{(f)}}{\partial \theta} - \tau_r = 0, \quad (2.3)$$

$$\frac{\partial N_{r\theta}^{(f)}}{\partial r} + \frac{2}{r}N_{r\theta}^{(f)} + \frac{1}{r}\frac{\partial N_\theta^{(f)}}{\partial \theta} - \tau_\theta = 0.$$

The substitution of Eqs. (2.1) and (2.2) into (2.3) yields the following governing equations for $u_r^{(f)}$, $u_\theta^{(f)}$, $\tau_r$, and $\tau_\theta$ $$\frac{\partial^2 u_r^{(f)}}{\partial r^2} + \frac{1}{r}\frac{\partial u_r^{(f)}}{\partial r} - \frac{u_r^{(f)}}{r^2} + \frac{1-v_f}{2}\frac{1}{r^2}\frac{\partial^2 u_r^{(f)}}{\partial \theta^2} + \frac{1+v_f}{2}\frac{1}{r}\frac{\partial^2 u_\theta^{(f)}}{\partial r\partial\theta} - \quad (2.4)$$

$$\frac{3-v_f}{2}\frac{1}{r^2}\frac{\partial u_\theta^{(f)}}{\partial \theta} = \frac{1-v_f^2}{E_f h_f}\tau_r + (1+v_f)\frac{\partial \varepsilon^m}{\partial r},$$

$$\frac{1+v_f}{2}\frac{1}{r}\frac{\partial^2 u_r^{(f)}}{\partial r\partial\theta} + \frac{3-v_f}{2}\frac{1}{r^2}\frac{\partial u_r^{(f)}}{\partial \theta} +$$

$$\frac{1-v_f}{2}\left(\frac{\partial^2 u_\theta^{(f)}}{\partial r^2} + \frac{1}{r}\frac{\partial u_\theta^{(f)}}{\partial r} - \frac{u_\theta^{(f)}}{r^2}\right) + \frac{1}{r^2}\frac{\partial^2 u_\theta^{(f)}}{\partial \theta^2} =$$

$$\frac{1-v_f^2}{E_f h_f}\tau_\theta + (1+v_f)\frac{1}{r}\frac{\partial \varepsilon^m}{\partial \theta}.$$

Let $u_r^{(s)}$ and $u_\theta^{(s)}$ denote the displacements in the radial (r) and circumferential ($\theta$) directions at the neutral axis (z=0) of the substrate, and w the displacement in the normal (z) direction. It is important to consider w since the substrate can be subject to bending and is modeled as a plate. The strains in the substrate are given by $$\varepsilon_{rr} = \frac{\partial u_r^{(s)}}{\partial r} - z\frac{\partial^2 w}{\partial r^2}, \quad (2.5)$$

$$\varepsilon_{\theta\theta} = \frac{u_r^{(s)}}{r} + \frac{1}{r}\frac{\partial u_\theta^{(s)}}{\partial \theta} - z\left(\frac{1}{r}\frac{\partial w}{\partial r} + \frac{1}{r^2}\frac{\partial^2 w}{\partial \theta^2}\right),$$

$$\gamma_{r\theta} = \frac{1}{r}\frac{\partial u_r^{(s)}}{\partial \theta} + \frac{\partial u_\theta^{(s)}}{\partial r} - \frac{u_\theta^{(s)}}{r} - 2z\frac{\partial}{\partial r}\left(\frac{1}{r}\frac{\partial w}{\partial \theta}\right).$$

The stresses in the substrate can then be obtained from the linear elastic constitutive model as $$\sigma_{rr} = \frac{E_s}{1-v_s^2} \quad (2.6)$$

$$\left\{\frac{\partial u_r^{(s)}}{\partial r} + v_s\left(\frac{u_r^{(s)}}{r} + \frac{1}{r}\frac{\partial u_\theta^{(s)}}{\partial \theta}\right) - z\left[\frac{\partial^2 w}{\partial r^2} + v_s\left(\frac{1}{r}\frac{\partial w}{\partial r} + \frac{1}{r^2}\frac{\partial^2 w}{\partial \theta^2}\right)\right]\right\},$$

$$\sigma_{\theta\theta} = \frac{E_s}{1-v_s^2}\left[v_s \frac{\partial u_r^{(s)}}{\partial r} + \frac{u_r^{(s)}}{r} + \frac{1}{r}\frac{\partial u_\theta^{(s)}}{\partial \theta} - \right.$$

$$\left. z\left(v_s \frac{\partial^2 w}{\partial r^2} + \frac{1}{r}\frac{\partial w}{\partial r} + \frac{1}{r^2}\frac{\partial^2 w}{\partial \theta^2}\right)\right],$$

$$\sigma_{r\theta} = \frac{E_s}{2(1+v_s)}\left[\frac{1}{r}\frac{\partial u_r^{(s)}}{\partial \theta} + \frac{\partial u_\theta^{(s)}}{\partial r} - \frac{u_\theta^{(s)}}{r} - 2z\frac{\partial}{\partial r}\left(\frac{1}{r}\frac{\partial w}{\partial \theta}\right)\right].$$

The forces and bending moments in the substrate are $$N_r^{(s)} = \int_{-\frac{h_s}{2}}^{\frac{h_s}{2}} \sigma_{rr} dz \qquad (2.7)$$

$$= \frac{E_s h_s}{1-v_s^2}\left[\frac{\partial u_r^{(s)}}{\partial r} + v_s\left(\frac{u_r^{(s)}}{r} + \frac{1}{r}\frac{\partial u_\theta^{(s)}}{\partial \theta}\right)\right],$$

$$N_\theta^{(s)} = \int_{-\frac{h_s}{2}}^{\frac{h_s}{2}} \sigma_{\theta\theta} dz$$

$$= \frac{E_s h_s}{1-v_s^2}\left(v_s\frac{\partial u_r^{(s)}}{\partial r} + \frac{u_r^{(s)}}{r} + \frac{1}{r}\frac{\partial u_\theta^{(s)}}{\partial \theta}\right),$$

$$N_{r\theta}^{(s)} = \int_{-\frac{h_s}{2}}^{\frac{h_s}{2}} \sigma_{r\theta} dz$$

$$= \frac{E_s h_s}{2(1+v_s)}\left(\frac{1}{r}\frac{\partial u_r^{(s)}}{\partial \theta} + \frac{\partial u_\theta^{(s)}}{\partial r} - \frac{u_\theta^{(s)}}{r}\right),$$

$$M_r = -\int_{-\frac{h_s}{2}}^{\frac{h_s}{2}} z\sigma_{rr} dz \qquad (2.8)$$

$$= \frac{E_s h_s^3}{12(1-v_s^2)}\left[\frac{\partial^2 w}{\partial r^2} + v_s\left(\frac{1}{r}\frac{\partial w}{\partial r} + \frac{1}{r^2}\frac{\partial^2 w}{\partial \theta^2}\right)\right],$$

$$M_\theta = -\int_{-\frac{h_s}{2}}^{\frac{h_s}{2}} z\sigma_{\theta\theta} dz$$

$$= \frac{E_s h_s^3}{12(1-v_s^2)}\left(v_s\frac{\partial^2 w}{\partial r^2} + \frac{1}{r}\frac{\partial w}{\partial r} + \frac{1}{r^2}\frac{\partial^2 w}{\partial \theta^2}\right),$$

$$M_{r\theta} = -\int_{-\frac{h_s}{2}}^{\frac{h_s}{2}} z\sigma_{r\theta} dz$$

$$= \frac{E_s h_s^3}{12(1+v_s)}\frac{\partial}{\partial r}\left(\frac{1}{r}\frac{\partial w}{\partial \theta}\right).$$

The shear stresses $\tau_r$ and $\tau_\theta$ at the thin film/substrate interface are equivalent to the distributed forces $\tau_r$ in the radial direction and $\tau_\theta$ in the circumferential direction, and bending moments $h_s/2\tau_r$ and $h_s/2\tau_\theta$ applied at the neutral axis (z=0) of the substrate. The in-plane force equilibrium equations of the substrate then become $$\frac{\partial N_r^{(s)}}{\partial r} + \frac{N_r^{(s)} - N_\theta^{(s)}}{r} + \frac{1}{r}\frac{\partial N_{r\theta}^{(s)}}{\partial \theta} + \tau_r = 0, \qquad (2.9)$$

$$\frac{\partial N_{r\theta}^{(s)}}{\partial r} + \frac{2}{r}N_{r\theta}^{(s)} + \frac{1}{r}\frac{\partial N_{\theta\theta}^{(s)}}{\partial \theta} + \tau_\theta = 0.$$

The out-of-plane moment and force equilibrium equations are given by $$\frac{\partial M_r}{\partial r} + \frac{M_r - M_\theta}{r} + \frac{1}{r}\frac{\partial M_{r\theta}}{\partial \theta} + Q_r - \frac{h_s}{2}\tau_r = 0, \qquad (2.10)$$

$$\frac{\partial M_{r\theta}}{\partial r} + \frac{2}{r}M_{r\theta} + \frac{1}{r}\frac{\partial M_\theta}{\partial \theta} + Q_\theta - \frac{h_s}{2}\tau_\theta = 0,$$

$$\frac{\partial Q_r}{\partial r} + \frac{Q_r}{r} + \frac{1}{r}\frac{\partial Q_\theta}{\partial \theta} = 0, \qquad (2.11)$$

where $Q_r$ and $Q_\theta$ are the shear forces normal to the neutral axis. The substitution of Eq. (2.7) into Eq. (2.9) yields the following governing equations for $u_r^{(s)}$ and $u_\theta^{(s)}$ (and $\tau$)

$$\frac{\partial^2 u_r^{(s)}}{\partial r^2} + \frac{1}{r}\frac{\partial u_r^{(s)}}{\partial r} - \frac{u_r^{(s)}}{r^2} + \frac{1-v_s}{2}\frac{1}{r^2}\frac{\partial^2 u_r^{(s)}}{\partial \theta^2} + \qquad (2.12)$$

$$\frac{1+v_s}{2}\frac{1}{r}\frac{\partial^2 u_\theta^{(s)}}{\partial r \partial \theta} - \frac{3-v_s}{2}\frac{1}{r^2}\frac{\partial u_\theta^{(s)}}{\partial \theta} = -\frac{1-v_s^2}{E_s h_s}\tau_r,$$

$$\frac{1+v_s}{2}\frac{1}{r}\frac{\partial^2 u_r^{(s)}}{\partial r \partial \theta} + \frac{3-v_s}{2}\frac{1}{r^2}\frac{\partial u_r^{(s)}}{\partial \theta} +$$

$$\frac{1-v_s}{2}\left(\frac{\partial^2 u_\theta^{(s)}}{\partial r^2} + \frac{1}{r}\frac{\partial u_\theta^{(s)}}{\partial r} - \frac{u_\theta^{(s)}}{r^2}\right) + \frac{1}{r^2}\frac{\partial^2 u_\theta^{(s)}}{\partial \theta^2} = -\frac{1-v_s^2}{E_s h_s}\tau_\theta.$$

Elimination of $Q_r$ and $Q_\theta$ from Eqs. (2.10) and (2.11), in conjunction with Eq. (2.8), give the following governing equation for w (and $\tau$)

$$\nabla^2(\nabla^2 w) = \frac{6(1-v_s^2)}{E_s h_s^2}\left(\frac{\partial \tau_r}{\partial r} + \frac{\tau_r}{r} + \frac{1}{r}\frac{\partial \tau_\theta}{\partial \theta}\right), \qquad (2.13)$$

where $\nabla^2 = \frac{\partial^2}{\partial r^2} + \frac{1}{r}\frac{\partial}{\partial r} + \frac{1}{r^2}\frac{\partial^2}{\partial \theta^2}$.

The continuity of displacements across the thin film/substrate interface requires $$u_r^{(f)} = u_r^{(s)} - \frac{h_s}{2}\frac{\partial w}{\partial r}, \quad u_\theta^{(f)} = u_\theta^{(s)} - \frac{h_s}{2}\frac{1}{r}\frac{\partial w}{\partial \theta}. \qquad (2.14)$$

Equations (2.4) and (2.12)-(2.14) constitute seven ordinary differential equations for seven variables, namely $u_r^{(f)}$, $u_\theta^{(f)}$, $u_r^{(s)}$, $u_\theta^{(s)}$, w, $\tau_r$, and $\tau_\theta$.

We discuss in the following how to decouple these seven equations under the limit $h_f/h_s \ll 1$ such that we can solve $u_r^{(s)}$, $u_\theta^{(s)}$ first, then w, followed by $u_r^{(f)}$ and $u_\theta^{(f)}$, and finally $\tau_r$ and $\tau_\theta$.

(i) Elimination of $\tau_r$ and $\tau_\theta$ from force equilibrium equations (2.4) for the thin film and (2.12) for the substrate yields two equations for $u_r^{(f)}$, $u_\theta^{(f)}$, $u_r^{(s)}$, and $u_\theta^{(s)}$. For $h_f/h_s \ll 1$, $u_r^{(f)}$ and $u_\theta^{(f)}$ disappear in these two equations, which become the following governing equations for $u_r^{(s)}$ and $u_\theta^{(s)}$ only, $$\frac{\partial^2 u_r^{(s)}}{\partial r^2} + \frac{1}{r}\frac{\partial u_r^{(s)}}{\partial r} - \frac{u_r^{(s)}}{r^2} + \frac{1-v_s}{2}\frac{1}{r^2}\frac{\partial^2 u_r^{(s)}}{\partial \theta^2} + \frac{1+v_s}{2}\frac{1}{r}\frac{\partial^2 u_\theta^{(s)}}{\partial r \partial \theta} - \qquad (2.15)$$

$$\frac{3-v_s}{2}\frac{1}{r^2}\frac{\partial u_\theta^{(s)}}{\partial \theta} = \frac{E_f h_f}{1-v_f}\frac{1-v_s^2}{E_s h_s}\frac{\partial \varepsilon^m}{\partial r} + O\left(\frac{h_f^2}{h_s^2}\right),$$

$$\frac{1+v_s}{2}\frac{1}{r}\frac{\partial^2 u_r^{(s)}}{\partial r \partial \theta} + \frac{3-v_s}{2}\frac{1}{r^2}\frac{\partial u_r^{(s)}}{\partial \theta} +$$

$$\frac{1-v_s}{2}\left(\frac{\partial^2 u_\theta^{(s)}}{\partial r^2} + \frac{1}{r}\frac{\partial u_\theta^{(s)}}{\partial r} - \frac{u_\theta^{(s)}}{r^2}\right) + \frac{1}{r^2}\frac{\partial^2 u_\theta^{(s)}}{\partial \theta^2} =$$

$$-\frac{E_f h_f}{1-v_f}\frac{1-v_s^2}{E_s h_s}\frac{1}{r}\frac{\partial \varepsilon^m}{\partial \theta} + O\left(\frac{h_f^2}{h_s^2}\right).$$

The substrate displacements $u_r^{(s)}$ and $u_\theta^{(s)}$ are on the order of $h_f/h_s$.

(ii) Elimination of $u_r^{(f)}$ and $u_\theta^{(f)}$ from the continuity condition (2.14) and equilibrium equation (2.4) for the thin film gives $\tau_r$ and $\tau_\theta$ in terms of $u_r^{(s)}$, $u_\theta^{(s)}$ and w (and $\in^m$)

(iii) The substitution of the above $\tau_r$ and $\tau_\theta$ into the moment equilibrium equation (2.13) yields the governing equation for the normal displacement w. For $h_f/h_s<<1$, this governing equation takes the form $$\nabla^2(\nabla^2 w) = -6\frac{E_f h_f}{1-\nu_f}\frac{1-\nu_s^2}{E_s h_s^2}\nabla^2 \varepsilon^m. \quad (2.16)$$

This is a biharmonic equation which can be solved analytically. The substrate displacement w is on the order of $h_f/h_s$.

(iv) The displacements $u_r^{(f)}$ and $u_\theta^{(f)}$ in the thin film are obtained from Eq. (2.14), and they are also on the same order $h_f/h_s$ as $u_r^{(s)}$, $u_\theta^{(s)}$ and w. The leading terms of the interface shear stresses $\tau_r$ and $\tau_\theta$ are then obtained from Eq. (2.4) as $$\tau_r = -\frac{E_f h_f}{1-\nu_f}\frac{\partial \varepsilon^m}{\partial r}, \quad \tau_\theta = -\frac{E_f h_f}{1-\nu_f}\frac{1}{r}\frac{\partial \varepsilon^m}{\partial \theta}. \quad (2.17)$$

These are remarkable results that hold regardless of boundary conditions at the edge r=R. Therefore the interface shear stresses are proportional to the gradients of misfit strain. For uniform misfit strain the interface shear stresses vanish.

We expand the arbitrary non-uniform misfit strain distribution $\varepsilon^m(r,\theta)$ to the Fourier series, $$\varepsilon^m(r,\theta) = \sum_{n=0}^{\infty} \varepsilon_c^{m(n)}(r)\cos n\theta + \sum_{n=1}^{\infty} \varepsilon_s^{m(n)}(r)\sin n\theta, \quad (2.18)$$

where $$\varepsilon_c^{m(0)}(r) = \frac{1}{2\pi}\int_0^{2\pi} \varepsilon^m(r,\theta)d\theta,$$

$$\varepsilon_c^{m(n)}(r) = \frac{1}{\pi}\int_0^{2\pi} \varepsilon^m(r,\theta)\cos n\theta d\theta \ (n \geq 1) \text{ and}$$

$$\varepsilon_s^{m(n)}(r) = \frac{1}{\pi}\int_0^{2\pi} \varepsilon^m(r,\theta)\sin n\theta d\theta \ (n \geq 1).$$

Without losing generality, we focus on the cos nθ term here. The corresponding displacements and interface shear stresses can be expressed as $$u_r^{(s)}=u_r^{(sn)}(r)\cos n\theta, u_\theta^{(s)}=u_\theta^{(sn)}(r)\sin n\theta, w=w^{(n)}(r)\cos n\theta. \quad (2.19)$$

Equation (2.15) then provides two ordinary differential equations for $u_r^{(sn)}$ and $u_\theta^{(sn)}$, which have the general solution $$\begin{Bmatrix} u_r^{(sn)} \\ u_\theta^{(sn)} \end{Bmatrix} = \begin{Bmatrix} 1-\nu_s-\frac{1+\nu_s}{2}n \\ \frac{1+\nu_s}{2}n+2 \end{Bmatrix} \quad (2.20)$$

$$\left[A_0 r^{n+1} + \frac{E_f h_f}{1-\nu_f}\frac{1+\nu_s}{E_s h_s}\frac{1}{4(n+1)}r\varepsilon_c^{m(n)}\right] +$$

-continued $$\begin{Bmatrix} 1 \\ 1 \end{Bmatrix} \left\{ \frac{E_f h_f}{1-\nu_f}\frac{1+\nu_s}{E_s h_s}\frac{1}{4(n+1)} \right.$$

$$\left\{ \begin{array}{l} -\left[1-\nu_s-\frac{n}{2}(1+\nu_s)\right]r\varepsilon_c^{m(n)} + \\ 2(1-\nu_s)(n+1)\frac{1}{r^{n+1}}\int_0^r \eta^{1+n}\varepsilon_c^{m(n)}(\eta)d\eta \end{array} \right\} -$$

$$\begin{Bmatrix} 1-\nu_s+\frac{1+\nu_s}{2}n \\ \frac{1+\nu_s}{2}n-2 \end{Bmatrix} \frac{E_f h_f}{1-\nu_f}\frac{1+\nu_s}{E_s h_s}\frac{1}{4(n-1)}r\varepsilon_c^{m(n)} +$$

$$\begin{Bmatrix} -1 \\ 1 \end{Bmatrix} \left\{ D_0 r^{n-1} - \frac{E_f h_f}{1-\nu_f}\frac{1+\nu_s}{E_s h_s}\frac{1}{4(n-1)} \right.$$

$$\left\{ \begin{array}{l} \left[1-\nu_s+\frac{n}{2}(1+\nu_s)\right]r\varepsilon_c^{m(n)} - \\ 2(1-\nu_s)(n-1)r^{n-1}\int_r^R \eta^{1-n}\varepsilon_c^{m(n)}(\eta)d\eta \end{array} \right\} + O\left(\frac{h_f^2}{h_s^2}\right),$$

where $A_0$ and $D_0$ are constants to be determined, and we have used the condition that the displacements are finite at the center r=0.

The normal displacement w is obtained from the biharmonic equation (2.16) as $$w^{(n)} = A_1 r^{n+2} + B_1 r^n + \frac{3}{n}\frac{1-\nu_s^2}{E_s h_s^2} \quad (2.21)$$

$$\frac{E_f h_f}{1-\nu_f}\left[r^n \int_r^R \eta^{1-n}\varepsilon_c^{m(n)}(\eta)d\eta + r^{-n}\int_0^r \eta^{n+1}\varepsilon_c^{m(n)}(\eta)d\eta\right] + O\left(\frac{h_f^2}{h_s^2}\right),$$

where $A_1$ and $B_1$ are constants to be determined, and we have used the condition that the displacement w is finite at the center r=0.

We now describe the corresponding boundary conditions for the analysis. The first two boundary conditions at the free edge r=R require that the net forces vanish, $$N_r^{(f)}+N_r^{(s)}=0 \text{ and } N_{r\theta}^{(f)}+N_{r\theta}^{(s)}=0 \text{ at } r=R, \quad (3.1)$$

where $A_0$ and $D_0$ are defined as:

$$A_0 = \frac{E_f h_f}{1-\nu_f}\frac{1-\nu_s}{E_s h_s}\frac{1}{R^{2n+2}}\int_0^R \eta^{n+1}\varepsilon_c^{m(n)}(\eta)d\eta + O\left(\frac{h_f^2}{h_s^2}\right), \quad (3.2)$$

$$D_0 = -\frac{E_f h_f}{1-\nu_f}\frac{1-\nu_s^2}{E_s h_s}\frac{n+1}{2R^{2n}}\int_0^R \eta^{n+1}\varepsilon_c^{m(n)}(\eta)d\eta + O\left(\frac{h_f^2}{h_s^2}\right)$$

under the limit $h_f/h_s<<1$. The other two boundary conditions at the free edge r=R are the vanishing of net moments, i.e., $$M_r - \frac{h_s}{2} N_r^{(f)} = 0 \text{ and } Q_r - \frac{1}{r}\frac{\partial}{\partial \theta}\left(M_{r\theta} - \frac{h_s}{2} N_{r\theta}^{(f)}\right) = 0$$

where $A_1$ and $B_1$ are defined as $$A_1 = -\frac{3(1-v_s)}{3+v_s}\frac{E_f h_f}{1-v_f}\frac{1-v_s^2}{E_s h_s^2}\frac{1}{R^{2n+2}}\int_0^R \eta^{n+1} \varepsilon_c^{m(n)}(\eta) d\eta + O\left(\frac{h_f^2}{h_s^2}\right), \quad (3.4)$$

$$B_1 = -\frac{n+1}{n} R^2 A_1 + O\left(\frac{h_f^2}{h_s^2}\right).$$

The boundary conditions can also be established from the variational principle [11]. The total potential energy in the thin film/substrate system with the free edge at r=R is $$\Pi = \int_0^R r dr \int_0^{2\pi} d\theta \int_{-\frac{h_s}{2}}^{\frac{h_s}{2}+h_f} U dz, \quad (3.5)$$

where U is the strain energy density which gives $$\frac{\partial U}{\partial \varepsilon_{rr}} = \sigma_{rr}, \frac{\partial U}{\partial \varepsilon_{\theta\theta}} = \sigma_{\theta\theta} \text{ and } \frac{\partial U}{\partial \gamma_{r\theta}} = \sigma_{r\theta}.$$

For constitutive relations in Eqs. (2.1) and (2.6), we obtain $$U = \quad (3.6)$$

$$\frac{E}{2(1-v^2)}\left[\varepsilon_{rr}^2 + \varepsilon_{\theta\theta}^2 + 2v\varepsilon_{rr}\varepsilon_{\theta\theta} + \frac{1-v}{2}\gamma_{r\theta}^2 - 2(1+v)\varepsilon^m(\varepsilon_{rr} + \varepsilon_{\theta\theta})\right],$$

where E and v take their corresponding values in the thin film (i.e., $E_f$ and $v_f$ for $$\frac{h_s^\square}{2} + h_f \geq z \geq \frac{h_s^\square}{2})$$

and in the substrate (i.e., $E_s$ and $v_s$ for $$\frac{h_s^\square}{2} \geq z \geq -\frac{h_s^\square}{2}).$$

For the displacement fields in Section 2 and the associated strain fields, the potential energy $\Pi$ in Eq. (3.5) becomes a quadratic function of parameters $A_0$, $D_0$, $A_1$ and $B_1$. The principle of minimum potential energy requires $$\frac{\partial \Pi}{\partial A_0} = 0, \frac{\partial \Pi}{\partial D_0} = 0, \frac{\partial \Pi}{\partial A_1} = 0 \text{ and } \frac{\partial \Pi}{\partial B_1} = 0. \quad (3.7)$$

It can be shown that, as expected in the limit $h_f/h_s \ll 1$, the above four conditions in Eq. (3.7) are equivalent to the vanishing of net forces in Eq. (3.1) and net moments in Eq. (3.3).

We now describe analysis of thin-film stresses and substrate curvatures. We provide the general solution that includes both cosine and sine terms in this section. The substrate curvatures are $$\kappa_{rr} = \frac{\partial^2 w}{\partial r^2}, \kappa_{\theta\theta} = \frac{1}{r}\frac{\partial w}{\partial r} + \frac{1}{r^2}\frac{\partial^2 w}{\partial \theta^2}, \kappa_{r\theta} = \frac{\partial}{\partial r}\left(\frac{1}{r}\frac{\partial w}{\partial \theta}\right). \quad (4.1)$$

The sum of substrate curvatures is related to the misfit strain by $$\kappa_{rr} + \kappa_{\theta\theta} = -12 \frac{E_f h_f}{1-v_f}\frac{1-v_s}{E_s h_s^2} * \quad (4.2)$$

$$\left\{\begin{array}{l}\overline{\varepsilon^m} - \frac{1-v_s}{2}(\varepsilon^m - \overline{\varepsilon^m}) + \frac{1-v_s^2}{3+v_s}\sum_{n=1}^\infty (n+1)\frac{r^n}{R^{2n+2}} \\ \left[\cos n\theta \int_0^R \eta^{n+1}\varepsilon_c^{m(n)}(\eta)d\eta + \sin n\theta \int_0^R \eta^{n+1}\varepsilon_s^{m(n)}(\eta) d\eta\right]\end{array}\right\},$$

where $$\overline{\varepsilon^m} = \frac{1}{\pi R^2}\int\int_A \varepsilon^m(\eta, \varphi) dA$$

is the average misfit strain over the entire area A of the thin film, $dA = \eta d\eta d\varphi$, and $\overline{\varepsilon_m}$ is also related to $\varepsilon_c^{m(0)}$ by $$\overline{\varepsilon^m} = \frac{2}{R^2}\int_0^R \eta \varepsilon_c^{m(0)}(\eta) d\eta.$$

The difference between two curvatures, $\kappa_{rr} - \kappa_{\theta\theta}$, and the twist $\kappa_{r\theta}$ are given by $$\kappa_{rr} - \kappa_{\theta\theta} = -6\frac{E_f h_f}{1-v_f}\frac{1-v_s^2}{E_s h_s^2} * \quad (4.3)$$

$$\left\{\begin{array}{l}\varepsilon^m - \frac{2}{r^2}\int_0^r \eta\varepsilon_c^{m(0)} d\eta + \frac{1-v_s}{3+v_s}\sum_{n=1}^\infty \frac{n+1}{R^{n+2}}\left[n\frac{r^n}{R^n} - (n-1)\frac{r^{n-2}}{R^{n-2}}\right] \\ \left(\cos n\theta \int_0^R \eta^{n+1}\varepsilon_c^{m(n)} d\eta + \sin n\theta \int_0^R \eta^{n+1}\varepsilon_s^{m(n)} d\eta\right) - \\ \sum_{n=1}^\infty \frac{n+1}{r^{n+2}}\left(\cos n\theta \int_0^r \eta^{n+1}\varepsilon_c^{m(n)} d\eta + \sin n\theta \int_0^r \eta^{n+1}\varepsilon_s^{m(n)} d\eta\right) - \\ \sum_{n=1}^\infty (n-1)r^{n-2}\left(\cos n\theta \int_r^R \eta^{1-n}\varepsilon_c^{m(n)} d\eta + \sin n\theta \int_r^R \eta^{1-n}\varepsilon_s^{m(n)} d\eta\right)\end{array}\right\},$$

$$\kappa_{r\theta} = 3\frac{E_f h_f}{1-v_f}\frac{1-v_s^2}{E_s h_s^2} * \quad (4.4)$$

$$\left\{\begin{array}{l}\frac{1-v_s}{3+v_s}\sum_{n=1}^\infty \frac{n+1}{R^{n+2}}\left[n\frac{r^n}{R^n} - (n-1)\frac{r^{n-2}}{R^{n-2}}\right] \\ \left(\sin n\theta \int_0^R \eta^{n+1}\varepsilon_c^{m(n)} d\eta - \cos n\theta \int_0^R \eta^{n+1}\varepsilon_s^{m(n)} d\eta\right) + \\ \sum_{n=1}^\infty \frac{n+1}{r^{n+2}}\left(\sin n\theta \int_0^r \eta^{n+1}\varepsilon_c^{m(n)} d\eta - \cos n\theta \int_0^r \eta^{n+1}\varepsilon_s^{m(n)} d\eta\right) - \\ \sum_{n=1}^\infty (n-1)r^{n-2}\left(\sin n\theta \int_r^R \eta^{1-n}\varepsilon_c^{m(n)} d\eta - \cos n\theta \int_r^R \eta^{1-n}\varepsilon_s^{m(n)} d\eta\right)\end{array}\right\}.$$

The stresses in the thin film are obtained from Eq. (2.1). Specifically, the sum of stresses $\sigma_{rr}^{(f)} + \sigma_{\theta\theta}^{(f)}$ is related to the misfit strain by $$\sigma_{rr}^{(f)} + \sigma_{\theta\theta}^{(f)} = \frac{E_f}{1-v_f}(-2\varepsilon^m). \tag{4.5}$$

The difference between stresses, $\sigma_{rr}^{(f)} - \sigma_{\theta\theta}^{(f)}$, and shear stress $\sigma_{r\theta}^{(f)}$ are given by $$\sigma_{rr}^{(f)} - \sigma_{\theta\theta}^{(f)} = 4E_f \frac{E_f h_f}{1-v_f^2} \frac{1-v_s^2}{E_s h_s} * \tag{4.6}$$

$$\left\{ \begin{array}{l} \varepsilon^m - \frac{2}{r^2} \int_0^r \eta \varepsilon_c^{m(0)} d\eta - \sum_{n=1}^{\infty} \frac{n+1}{r^{n+2}} \\ \left( \cos n\theta \int_0^r \eta^{n+1} \varepsilon_c^{m(n)} d\eta + \sin n\theta \int_0^r \eta^{n+1} \varepsilon_s^{m(n)} d\eta \right) - \\ \sum_{n=1}^{\infty} (n-1)r^{n-2} \left( \cos n\theta \int_r^R \eta^{1-n} \varepsilon_c^{m(n)} d\eta + \right. \\ \left. \sin n\theta \int_r^R \eta^{1-n} \varepsilon_s^{m(n)} d\eta \right) - \frac{v_s}{3+v_s} \sum_{n=1}^{\infty} \frac{n+1}{R^{n+2}} \left[ n \frac{r^n}{R^n} - (n-1) \frac{r^{n-2}}{R^{n-2}} \right] \\ \left( \cos n\theta \int_0^R \eta^{n+1} \varepsilon_c^{m(n)} d\eta + \sin n\theta \int_0^R \eta^{n+1} \varepsilon_s^{m(n)} d\eta \right) \end{array} \right\},$$

$$\sigma_{r\theta}^{(f)} = 2E_f \frac{E_f h_f}{1-v_f^2} \frac{1-v_s^2}{E_s h_s} * \tag{4.7}$$

$$\left\{ \begin{array}{l} -\sum_{n=1}^{\infty} \frac{n+1}{r^{n+2}} \left( \sin n\theta \int_0^r \eta^{n+1} \varepsilon_c^{m(n)} d\eta - \cos n\theta \int_0^r \eta^{n+1} \varepsilon_s^{m(n)} d\eta \right) + \\ \sum_{n=1}^{\infty} (n-1)r^{n-2} \left( \sin n\theta \int_r^R \eta^{1-n} \varepsilon_c^{m(n)} d\eta - \right. \\ \left. \cos n\theta \int_r^R \eta^{1-n} \varepsilon_s^{m(n)} d\eta \right) + \frac{v_s}{3+v_s} \sum_{n=1}^{\infty} \frac{n+1}{R^{n+2}} \left[ n \frac{r^n}{R^n} - (n-1) \frac{r^{n-2}}{R^{n-2}} \right] \\ \left( \sin n\theta \int_0^R \eta^{n+1} \varepsilon_c^{m(n)} d\eta - \cos n\theta \int_0^R \eta^{n+1} \varepsilon_s^{m(n)} d\eta \right) \end{array} \right\}.$$

For uniform misfit strain distribution $\in^m$=constant, the interface shear stresses in Eq. (2.17) vanish. The curvatures in the substrate obtained from Eqs. (4.2)-(4.4) become $$\kappa = \kappa_{rr} = \kappa_{\theta\theta} = -6 \frac{E_f h_f}{1-v_f} \frac{1-v_s}{E_s h_s^2} \varepsilon^m, \quad \kappa_{r\theta} = 0$$

The stresses in the thin film obtained from Eqs. (4.5)-(4.7) become $$\sigma^{(f)} = \sigma_{rr}^{(f)} = \sigma_{\theta\theta}^{(f)} = \frac{E_f}{1-v_f}(-\varepsilon^m), \quad \sigma_{r\theta}^{(f)} = 0$$

For this special case only, both stress and curvature states become equi-biaxial. The elimination of misfit strain $\in^m$ from the above two equations yields a simple relation $$\sigma^{(f)} = \frac{E_s h_s^2}{6(1-v_s)h_f} \kappa,$$

which is exactly the Stoney formula, and it has been used to estimate the thin-film stress $\sigma^{(f)}$ from the substrate curvature $\kappa$, if the misfit strain, stress and curvature are all constant and if the plate system shape is spherical.

In the following, we extend such a relation for arbitrary non-axisymmetric misfit strain distribution.

The stresses and curvatures are all given in terms of misfit strain in the previous section. We extend the Stoney formula for arbitrary non-uniform and non-axisymmetric misfit strain distribution in this section by establishing the direct relation between the thin-film stresses and substrate curvatures.

We first define the coefficients $C_n$ and $S_n$ related to the substrate curvatures by $$C_n = \frac{1}{\pi R^2} \int\int_A (\kappa_{rr} + \kappa_{\theta\theta}) \left(\frac{\eta}{R}\right)^n \cos n\varphi \, dA, \tag{5.1}$$

$$S_n = \frac{1}{\pi R^2} \int\int_A (\kappa_{rr} + \kappa_{\theta\theta}) \left(\frac{\eta}{R}\right)^n \sin n\varphi \, dA,$$

where the integration is over the entire area A of the thin film, and $dA = \eta \, d\eta \, d\phi$. Since both the substrate curvatures and film stresses depend on the misfit strain $\in^m$, elimination of misfit strain gives the film stress in terms of substrate curvatures by $$\sigma_{rr}^{(f)} - \sigma_{\theta\theta}^{(f)} = -\frac{E_f h_s}{6(1+v_f)} \left\{ 4(\kappa_{rr} - \kappa_{\theta\theta}) - \right. \tag{5.2}$$

$$\left. \sum_{n=1}^{\infty} (n+1)\left[n\left(\frac{r}{R}\right)^n - (n-1)\left(\frac{r}{R}\right)^{n-2}\right](C_n \cos n\theta + S_n \sin n\theta) \right\},$$

$$\sigma_{r\theta}^{(f)} = -\frac{E_f h_s}{6(1+v_f)} \left\{ 4\kappa_{r\theta} + \right. \tag{5.3}$$

$$\left. \frac{1}{2} \sum_{n=1}^{\infty} (n+1)\left[n\left(\frac{r}{R}\right)^n - (n-1)\left(\frac{r}{R}\right)^{n-2}\right](C_n \sin n\theta - S_n \cos n\theta) \right\},$$

$$\sigma_{rr}^{(f)} + \sigma_{\theta\theta}^{(f)} = \frac{E_s h_s^2}{6h_f(1-v_s)} \left[ \kappa_{rr} + \kappa_{\theta\theta} + \frac{1-v_s}{1+v_s}(\kappa_{rr} + \kappa_{\theta\theta} - \overline{\kappa_{rr} + \kappa_{\theta\theta}}) - \right. \tag{5.4}$$

$$\left. \frac{1-v_s}{1+v_s} \sum_{n=1}^{\infty} (n+1)\left(\frac{r}{R}\right)^n (C_n \cos n\theta + S_n \sin n\theta) \right],$$

where $$\overline{\kappa_{rr} + \kappa_{\theta\theta}} = C_0 = \frac{1}{\pi R^2} \int\int_A (\kappa_{rr} + \kappa_{\theta\theta}) \, dA$$

is the average curvature over entire area A of the thin film. Equations (5.2)-(5.4) provide direct relations between individual film stresses and substrate curvatures. It is important to note that stresses at a point in the thin film depend not only on curvatures at the same point (local dependence), but also on the curvatures in the entire substrate (non-local dependence) via the coefficients $C_n$ and $S_n$.

The interface shear stresses $\tau_r$ and $\tau_\theta$ can also be directly related to substrate curvatures via $$\tau_r = \frac{E_s h_s^2}{6(1-v_s^2)} \left[ \frac{\partial}{\partial r}(\kappa_{rr} + \kappa_{\theta\theta}) - \right. \tag{5.5}$$
$$\left. \frac{1-v_s}{2R} \sum_{n=1}^{\infty} n(n+1)(C_n \cos n\theta + S_n \sin n\theta)\left(\frac{r}{R}\right)^{n-1} \right],$$

$$\tau_\theta = \frac{E_s h_s^2}{6(1-v_s^2)} \left[ \frac{1}{r}\frac{\partial}{\partial \theta}(\kappa_{rr} + \kappa_{\theta\theta}) + \right. \tag{5.6}$$
$$\left. \frac{1-v_s}{2R} \sum_{n=1}^{\infty} n(n+1)(C_n \sin n\theta - S_n \cos n\theta)\left(\frac{r}{R}\right)^{n-1} \right].$$

This provides a way to estimate the interface shear stresses from the gradients of substrate curvatures. It also displays a non-local dependence via the coefficients $C_n$ and $S_n$.

Since interfacial shear stresses are responsible for promoting system failures through delamination of the thin film from the substrate, Eqs. (5.5) and (5.6) have particular significance. They show that such stresses are related to the gradients of $\kappa_{rr}+\kappa_{\theta\theta}$ and not to its magnitude as might have been expected of a local, Stoney-like formulation. The implementation value of Eqs. (5.5) and (5.6) is that it provides an easy way of inferring these special interfacial shear stresses once the full-field curvature information is available. As a result, the methodology also provides a way to evaluate the risk of and to mitigate such important forms of failure. It should be noted that for the special case of spatially constant curvatures, the interfacial shear stresses vanish as is the case for all Stoney-like formulations.

It can be shown that the relations between the film stresses and substrate curvatures given in the form of infinite series in Eqs. (5.2)-(5.4) can be equivalently expressed in the form of integration as $$\sigma_{rr}^{(f)} - \sigma_{\theta\theta}^{(f)} = -\frac{E_f h_s}{6(1+v_f)} \left\{ 4(\kappa_{rr} - \kappa_{\theta\theta}) - \right. \tag{5.7}$$
$$\left. \frac{1}{\pi R^2} \int\int_A (\kappa_{rr} + \kappa_{\theta\theta}) \frac{\frac{\eta}{R} F_{minus}\left(\frac{r}{R}, \frac{\eta}{R}, \varphi - \theta\right)}{\left[1 - 2\frac{\eta r}{R^2}\cos(\varphi-\theta) + \frac{\eta^2 r^2}{R^4}\right]^3} dA \right\},$$

$$\sigma_{r\theta}^{(f)} = -\frac{E_f h_s}{6(1+v_f)} \tag{5.8}$$
$$\left\{ 4\kappa_{r\theta} - \frac{1}{2}\frac{1}{\pi R^2} \int\int_A (\kappa_{rr} + \kappa_{\theta\theta}) \frac{\frac{\eta}{R} F_{shear}\left(\frac{r}{R}, \frac{\eta}{R}, \varphi - \theta\right)}{\left[1 - 2\frac{\eta r}{R^2}\cos(\varphi-\theta) + \frac{\eta^2 r^2}{R^4}\right]^3} dA \right\},$$

$$\sigma_{rr}^{(f)} + \sigma_{\theta\theta}^{(f)} = \frac{E_s h_s^2}{6 h_f (1-v_s)} * \tag{5.9}$$
$$\left\{ \begin{array}{l} \kappa_{rr} + \kappa_{\theta\theta} + \frac{1-v_s}{1+v_s}(\kappa_{rr} + \kappa_{\theta\theta} - \overline{\kappa_{rr} + \kappa_{\theta\theta}}) - \frac{1-v_s}{1+v_s} \\ \frac{r}{\pi R^3} \int\int_A (\kappa_{rr} + \kappa_{\theta\theta}) \frac{\frac{\eta}{R} F_{plus}\left(\frac{r}{R}, \frac{\eta}{R}, \varphi-\theta\right)}{\left[1-2\frac{\eta r}{R^2}\cos(\varphi-\theta)+\frac{\eta^2 r^2}{R^4}\right]^2} dA \end{array} \right\},$$

where functions $F_{minus}$, $F_{shear}$ and $F_{plus}$ are given by $F_{minus}(r_1,\eta_1,\phi_1) = r_1^2 \eta_1(6+9\eta_1^2+r_1^2\eta_1^4) + r_1(2+9\eta_1^2 + 6r_1^2\eta_1^2 + 6r_1^2\eta_1^4)\cos\phi_1 - \eta_1(3+3r_1^2\eta_1^2 + 2r_1^4\eta_1^2)\cos 2\phi_1 + r_1\eta_1^2\cos 3\phi_1$, $F_{shear}(r_1,\eta_1,\phi_1) = r_1(2+9\eta_1^2 - 6r_1^2\eta_1^2)\sin\phi_1 - \eta_1(3+3r_1^2\eta_1^{21} - 2r_1^4\eta_1^2)\sin 2\phi_1 + r_1\eta_1^2\sin 3\phi_1$, $F_{plus}(r_1,\eta_1,\phi_1) = 2(1+2r_1^2\eta_1^2)\cos\phi_1 - r_1\eta_1\cos 2\phi_1 - r_1\eta_1(4+r_1^2\eta_1^2)$. (5.10)

The interface shear stresses can also be related to substrate curvatures via integrals as $$\tau_r = \frac{E_s h_s^2}{6(1-v_s^2)} \left\{ \frac{\partial}{\partial r}(\kappa_{rr} + \kappa_{\theta\theta}) - \right. \tag{5.11}$$
$$\left. \frac{1-v_s}{\pi R^3} \int\int_A (\kappa_{rr} + \kappa_{\theta\theta}) \frac{\frac{\eta}{R} F_{radial}\left(\frac{r}{R}, \frac{\eta}{R}, \varphi-\theta\right)}{\left[1-2\frac{\eta r}{R^2}\cos(\varphi-\theta)+\frac{\eta^2 r^2}{R^4}\right]^3} dA \right\},$$

$$\tau_\theta = \frac{E_s h_s^2}{6(1-v_s^2)} \left\{ \frac{1}{r}\frac{\partial}{\partial \theta}(\kappa_{rr}+\kappa_{\theta\theta}) - \right. \tag{5.12}$$
$$\left. \frac{1-v_s}{\pi R^3} \int\int_A (\kappa_{rr}+\kappa_{\theta\theta}) \frac{\frac{\eta}{R} F_{circumferential}\left(\frac{r}{R},\frac{\eta}{R},\varphi-\theta\right)}{\left[1-2\frac{\eta r}{R^2}\cos(\varphi-\theta)+\frac{\eta^2 r^2}{R^4}\right]^3} dA \right\},$$

where $F_{radial}(r_1,\eta_1,\phi_1) = (1+3r_1^2\eta_1^2)\cos\phi_1 - r_1\eta_1(3+r_1^2\eta_1^2)\cos 2\phi_1$), $F_{circumferantial}(r_1,\eta_1,\phi_1) = (1-3r_1^2\eta_1^2)\sin\phi_1 + r_1^3\eta_1^3\sin 2\phi_1$. (5.13)

Eq. (5.4) also reduces to Stoney's result for the case of spatial curvature uniformity. Indeed for this case, Eq. (5.4) reduces to:

$$\sigma_{rr} + \sigma_{\theta\theta} = \frac{E_s h_s^2}{6(1-v_s)h_f}(\kappa_{rr}+\kappa_{\theta\theta}). \tag{5.14}$$

If in addition the curvature state is equi-biaxial ($\kappa_{rr}=\kappa_{\theta\theta}$), as assumed by Stoney, the Stoney formulation is recovered while relation (5.2) furnishes $\sigma_{rr}=\sigma_{\theta\theta}$ (stress equi-biaxiality) as a special case. Unlike Stoney's original analysis and some of its extensions, the present analysis shows that the dependence of film stresses on substrate curvatures is not generally "local." Here the stress components at a point on the film will, in general, depend on both the local value of the curvature components (at the same point) and on the value of curvatures of all other points on the plate system (non-local dependence). The more pronounced the curvature non-uniformities are, the more important such non-local effects become in accurately determining film stresses from curvature measurements. This demonstrates that analyses methods based on Stoney's approach and its various extensions cannot handle the non-locality of the stress/curvature dependence and may result in substantial stress prediction errors if such analyses are applied locally in cases where spatial variations of system curvatures and stresses are present.

The presence of non-local contributions in such relations also has implications regarding the nature of diagnostic methods needed to perform wafer-level film stress measurements.

Notably the existence of non-local terms necessitates the use of full-field methods capable of measuring curvature components over the entire surface of the plate system (or wafer). Furthermore measurement of all independent components of the curvature field is necessary. This is because the stress state at a point depends on curvature contributions (from $\kappa_{rr}$, $\kappa_{\theta\theta}$ and $\kappa_{r\theta}$) from the entire plate surface.

Regarding the curvature-misfit strain [Eqs. (4.2)-(4.4)] and stress-misfit strain [Eqs. (4.5)-(4.7)] relations the following points are noteworthy. These relations also generally feature a dependence of local misfit strain $\in^m(r,\theta)$ which is "Stoney-like" as well as a "non-local" contribution from the misfit strain of other points on the plate system. Furthermore the stress and curvature states are always non-equibiaxial (i.e., $\sigma_{rr}^{(f)} \neq \sigma_{\theta\theta}^{(f)}$ and $\kappa_{rr} \neq \kappa_{\theta\theta}$) in the presence of misfit strain non-uniformities. Only if $\in^m$=constant these states become equibiaxial, the "non-local" contributions vanish and Stoney's original results are recovered as a special case.

Finally it should be noted that the existence of non-uniformities also results in the establishment of shear stresses along the film/substrate interface. These stresses are in general related to the derivatives of the first curvature invariant $\kappa_{rr}+\kappa_{\theta\theta}$[Eqs. (5.11) and (5.12)]. In terms of misfit strain these interfacial shear stresses are also related to the gradients of the misfit strain distribution $\in^m(r,\theta)$. The occurrence of such stresses is ultimately related to spatial non-uniformities and as a result such stresses vanish for the special case of uniform $\kappa_{rr}+\kappa_{\theta\theta}$ or $\in^m$ considered by Stoney and its various extensions. Since film delamination is a commonly encountered form of failure during wafer manufacturing, the ability to estimate the level and distribution of such stresses from wafer-level metrology might prove to be invaluable in enhancing the reliability of such systems.

In implementations, the above described techniques and their variations may be implemented as computer software instructions. Such software instructions may be stored in an article with one or more machine-readable storage media or stored in one or more machine-readable storage devices connected to one or more computers as part of the processor shown in FIG. 1A. In operation, the instructions are executed by, e.g., one or more computer processors, to cause the machine (e.g., the processor in FIG. 1A) to perform the described functions and operations.

In general, embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable, for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Referring back to FIG. 1A, the above sections provide detailed descriptions on the processing algorithms for the processor that performs the stress analysis based on the full-field curvature map of the layered plate structure under measurement. The full-field curvature map may be obtained by various techniques. Non-invasive, full-field optical methods may be preferred since such methods are efficient and fast and may allow for real time and in situ monitoring of substrates under fabrication.

The following sections describe examples of such optical probing methods for measuring the full-field curvature map of the layered structure under test based on optical interferometry. Such optical methods can be used to achieve non-invasive, full-field measurements of patterned and unpatterned surfaces in various devices and structures. Described implementations include measurements of patterned and unpatterned surface profiles of various surfaces by using optical shearing interferometry. Optical interferometry techniques for illumination of an un-patterned backside surface of a wafer or substrate with a patterned front surface are also described. When properly configured, a surface monitoring system based on one of the disclosed optical techniques may provide full-field measurements of a surface in real time. In addition, such a surface monitoring system may provide in-situ monitoring of a wafer under processing.

In one implementation, for example, an optical probe beam with a substantially uniform wavefront may be used to illuminate a surface under measurement to produce a reflected probe beam with a reflected wavefront that carries distortions caused by an illuminated area on the surface. The reflected probe beam is directed through an optical shearing interferometer device to obtain an optical interference pattern between the reflected wavefront and another replica of the reflected wavefront that is spatially shifted by a shearing distance. Next, a phase shift between the reflected wavefront and the replica of the reflected wavefront is adjusted to obtain a plurality of phase-shifted interference patterns of different phase shifts from the optical shearing interferometer. The interference patterns are then processed to obtain information on surface slopes across the illuminated area in the surface under measurement.

In other implementations, support members may be to contact a backside surface of a wafer to hold the wafer (or of a reticle to hold the reticle, etc.). The wafer is fabricated with patterns on a front surface opposite to the backside surface. The backside surface is illuminated with a probe beam to produce a reflected probe beam with a reflected wavefront that carries distortions caused by an illuminated area on the backside surface. An optical interference pattern is then produced with the reflected probe beam to include discontinuities due to presence of support members on the backside surface. An interpolation algorithm is applied in processing the optical interference pattern to interpolate interference fringes caused by the backside surface across regions with the discontinuities to obtain interference pattern features within the illuminated area that are caused solely by the backside surface. Next, the interpolated interference pattern from the backside surface are processed to obtain surface slopes of corresponding positions on the front surface of the wafer.

Alternatively, the above interpolation in data processing may be substituted by additional measurements and processing to obtain data in the areas on the backside surface occupied by the support members. For example, without applying the interpolation, the interference pattern from the backside surface is processed to obtain surface slopes of corresponding positions on the front surface of the wafer. Next, the angular orientation of the wafer on the support members is changed at least once to obtain at least one another reflected optical probe beam from the same incident optical probe beam and thus another optical interference pattern. The other interference pattern from the backside surface is then processed to obtain surface slopes of corresponding positions on the front surface of the wafer. The surface slopes obtained from different interference patterns at different angular orientations of the wafer are then compared. The missing data found at a location in one interference pattern is filled by data at the same location in another interference pattern obtained at a different angular orientation.

This application also describes techniques for using interference patterns obtained at different shearing distances in a shearing interferometer to improve the measurements. In one implementation, for example, an optical probe beam with a substantially uniform wavefront is used to illuminate a surface under measurement to produce a new optical beam with a distorted wavefront caused by the surface. The new optical beam is directed through an optical shearing interferometer to obtain an optical interference pattern between the distorted wavefront and another replica of the distorted wavefront that is spatially shifted by a shearing distance. The shearing distance is then adjusted to obtain optical interference patterns at different shearing distances. These interference patterns at different shearing distances are processed to extract information on the surface under measurement.

In the above example, two interference patterns with two different shearing distances may be subtracted to produce a differentiated interference pattern that corresponds to a new shearing distance equal to a difference between the two different shearing distances. This technique can be used to obtain data at a small shearing distance that may be difficult to achieve with the given shearing interferometer.

This application further describes a number of shearing interferometers different from a coherent gradient sensing (CGS) system for measuring surfaces. These non-CGS shearing interferometers may have certain advantages over CGS in specific applications.

Optical shearing interferometers produce and interfere two spatially shifted replicas of the same, usually distorted wavefront of an optical beam along a direction transverse to the direction of propagation of the said wavefront. For example, transverse and radial shearing interferometers may be used. The interference between the spatially shifted replicated wavefronts generates an interference pattern representing the spatial distribution of slopes in the wavefront. In effect such interferometers perform an optical differentiation of the wavefront. In some of the examples for optically measuring surfaces described in this application, at least one optical shearing interferometer may be used to optically measure a surface by illuminating the surface with a collimated probe beam. The shearing interferometer may be configured to produce a shearing interference pattern from either of the optical transmission of the probe beam through the surface or from the optical reflection of the probe beam by the surface. The shearing interference pattern is then processed to obtain surface, slopes, curvatures and other surface topographical information. For example, surface topography on the global profile of the surface and nanotopography on the local profile of the surface may be obtained from the shearing interferometer. Examples of measurable surfaces include but are not limited to surfaces in various panels and plates, various substrates and wafers, integrated electronic circuits, integrated optical devices, opto-electronic circuits, and micro-electro-mechanical systems (MEMs), flat panel display systems (e.g., LCD and plasma displays), and photolithography masks, pellicles and reticles.

The use of optical shearing interferometry presents certain advantages in optically measuring surfaces. Optical hearing interferometry may be an effective measuring tool for surfaces patterned with various microstructures such as patterned wafers and patterned mask substrates. In addition, an optical shearing interferometer may be used for in-situ monitoring of the surface properties such as curvatures and related stresses during fabrication of devices at the wafer level and the measurements may be used to dynamically control the fabrication conditions or parameters in real time. As an example, measurement and operation of an optical shearing interferometer generally is not significantly affected by rigid body translations and rotations due to the self-referencing nature of the optical shearing interferometry. Hence, a wafer or device under measurement may be measured by directing a probe beam substantially normal to the surface or at low incident angles without affecting the measurements. By shifting or shearing the wavefront, the optical shearing interferometer measures the deformation of one point of the wavefront to another separated by the shearing distance, i.e., the distance between the two interfering replicas of the same wavefront. In this sense, the optical shearing interferometer is self referencing and thus increases its insensitivity or immunity to vibrations of the wafer or device under measurement. This resistance to vibrations may be particularly advantageous when the measurement is performed in a production environment or in situ during a particular process (e.g. deposition within a chamber), where vibration isolation is a substantial challenge.

As a comparison, many non-shearing interferometers generate wavefront interference of topology or topography (surface elevation) based on optical interference between a distorted wavefront reflected from a sample surface and an undistorted, reference wavefront reflected from a known reference surface. The use of such non-shearing optical interferometers for measuring patterned surfaces may be ineffective because, in many cases, the relatively non-uniform or diffuse wavefront reflected off the patterned surface may not interfere with fidelity with the wavefront reflected off the reference surface due to, e.g., the loss of light diffracted or scattered by the pattern into large angles. Also, a patterned surface may have substantially different reflective properties, e.g., certain areas of the patterned surface are highly absorbing at the probe wavelength than other areas of the patterned surface or the reference surface. In these and other circumstances, it may be difficult to unwrap and interpret the interferometric images produced by such non-shearing interferometers in the presence of extensive patterning.

Another feature of the shearing interferometry is that the wavefront is optically differentiated once and the optical differentiation is recorded in the shearing interference pattern. Hence, only a single derivative operation on the data from the shearing interference pattern is sufficient to calculate curvatures from slopes of the wavefront. This reduces the amount of computation in processing the interference data and thus reduces the time for data processing. Also, because the shearing interferometry method provides full-field interferometric data it can utilize many more data points compared to other methods such as the method of using a conventional capacitive probe to measure a few points (e.g., 3 points) of surface topology. This higher data density provides more accurate measurements and better resistance to noise than other methods which feature much less density of measured data. In addition, although various laser beam scanning tools may be used to measure wafer bow or surface curvature, these methods typically measure radial curvature only. Shearing interferometry may be easily implemented to measure surface slopes in two orthogonal directions (X and Y) within the surface and thus allow for elucidation of the full curvature tensor and the associated stress states of the wafer or substrate.

In applying shearing interferometry for measuring patterned surfaces on wafers and other structures (e.g. patterned mask elements), the patterned wafers, e.g., semiconductor and optoelectronic wafers with diameters of 200 mm, 300 mm or other wafer sizes may be placed in a shearing interferometer in a configuration that allows a collimated probe beam to be reflected off the wafer surface. The shearing interferometer uses the reflected probe beam from the wafer surface to produce the two interfering wavefronts, which are substantially similar in shape after being sheared by a small shearing distance. Hence, the interference between the two wavefronts produces coherent interference. Although each wavefront reflected off a patterned surface may be inherently noisy and diffuse, sufficient coherence exists between the wavefronts to produce meaningful fringe patterns and can be interpreted to extract surface information.

FIG. 1 illustrates one implementation of a system 100 for measuring a specimen surface 130 based on optical shearing interferometry. A light source 110 is provided to produce a collimated probe beam 112 with a substantially uniform wavefront. The light source 110 may produce radiation in a wide range spectral ranges including visible and invisible wavelengths (e.g., IR and UV radiation). The light from the source 110 may be coherent. Some interferometers, such as a CGS device, may also operate with incoherent light. This probe beam 112 is directed to illuminate the surface 130 and to produce a reflected probe beam 132. An optical element 120 such as a beam splitter may be used to direct the probe beam 110 to the surface 130 and to transmit the reflected probe beam 132. A shearing device 101, i.e., an optical shearing interferometer, is placed in the optical path of the reflected probe beam 132 to generate a shearing interference pattern from the reflected probe beam 132. Oblique incidence of the collimated beam 112 onto the reflective surface 130 may also be used and the beamsplitter element 120 is bypassed. In general, any shearing interferometer may be used to implement the shearing device 101. In actual applications, different shearing configurations may have unique features or attributes and hence are different from one another in this context. Examples of the shearing device 101 include a coherent gradient sensing (CGS) system using optical gratings to cause the shearing of the wavefront, a radial shear interferometers, wedge plate in a Bi-Lateral Shearing Interferometer (U.S. Pat. No. 5,710,631), and others, some of which are described in later sections of this application.

The system 100 also includes a light collecting unit 102 in the output optical path of the shearing device 101 to direct the optical output of the shearing device 101, the shearing interference pattern, to an imaging sensor 180, such as a camera (e.g., a CCD or other pixel sensing array). The light collecting unit 102 may include a filtering lens 160 and a spatial filter plane 170 with an aperture 172 when the shearing device 101 uses optical gratings to produce the shearing. The imaging sensor 180 converts the shearing interference pattern into an electronic form and a signal processing circuit which may include a computer is used to process the shearing interference pattern to extract desired surface information.

The measurements of patterned wafers by optical reflection with a shearing interferometer may be improved by using phase shifting in the measurements. Phase shifting may be implemented to progressively adjust the phase separation between the two shifted interfering wavefronts which cycles or manipulates fringe position on the specimen's surface under measurement. In one implementation, a shearing interferometer may be configured to obtain multiple phased images of a patterned wafer's surface, for example at 0, 90, 180, 270 and 360 degrees in phase. The phase shifting method allows for the wavefront slope to be measured by calculating the "relative phase" modulation at each pixel on a detector array that receives the interference pattern. The phase shifting method also allows for consistent interpretation of wavefront and specimen slope on a surface that exhibits changing reflectivity, like those found on patterned wafers. On a patterned wafer surface, each pixel location on the specimen may reflect light with a varying degree of intensity-relative to other pixel locations. This may complicate the interpretation of any single shearing interferogram. The phase shifting method in shearing interferometry can simultaneously increase the accuracy of the slope resolution and allow for accurate interpretation of interferograms on patterned surfaces with a spatially varying optical reflectivity. This is possible in part because the relative phase of each pixel or location within the shearing interfering pattern is measured, rather than merely measuring the variation in the fringe intensity.

FIG. 2 illustrates an example of a measurement of the relative phase in the phase-shifted interference pattern. The interference pattern image on the left was collected off the patterned surface of a 300 mm silicon wafer. The interference pattern represents one out a series of, for example, 5 phase-shifted interference patterns. The detail in the upper right portion of the image illustrates that locally, the fringe intensity may vary dramatically from point to point as a result of the patterning on the wafer surface. For comparison, a fringe pattern on a bare or continuous surface would have smooth and continuous variations in fringe intensity. The inserted graph in the bottom right of FIG. 2 shows schematically the variation in the fringe intensity as a function of the phase-shift value or angle for two points on the patterned wafer surface. The phase axis has angular increments of 90 degrees, whereas the intensity axis is meant to represent the full dynamic range of the CCD or other imaging array. Point 1 marked by the arrow on the left corresponds to a pixel region on the wafer where the reflectivity is relatively high and is indicated schematically by the large amplitude of the curve. Point 2 marked by the arrow on the right corresponds to a pixel region on the wafer where the reflectivity is relatively low and is indicated schematically by the smaller amplitude curve. When phase shifting is implemented, the relevant quantity of interest is the relative phase angle, or the horizontal offset of one curve (e.g. Point 1 curve) relative to the other (e.g. Point 2 curve), and not the amplitude of the curve. The intensity at any given point from a series of phase shifted interferograms should be sufficiently large to enable adequate characterization of the relative phase offset.

In implementation of the phase shifting, the collected multiple phase-shifted interferograms of the patterned wafer surface are subsequently processed by a phase extraction algorithm and an unwrapping algorithm to accurately interpret the surface slopes embedded in the phase-shifted interferograms. Suitable phase extraction algorithms may include Bucket nA, nB, or nC, where 'n' is the number of frames in the phase shifted data set. Phase extraction algorithms other than the above Bucket A type, Bucket B type, and Bucket C type algorithms may also be used. Suitable unwrapping algorithms may include Minimum Discontinuity (MDF) and Preconditioned Conjugate Gradient (PCG) algorithms. In addition, Branch Cut Minimization and Tiled Modulation Guided algorithms may also be used to process the phase-shifted interferograms and may be effective in unwrapping lightly patterned surfaces.

Once the phase-shifted interferograms have been unwrapped, the interpretation of raw slope data and the derivation of curvature may be enhanced by statistically fitting a surface polynomial to the raw slope data. Statistical surface fits, including Zernicke polynomials and Legendre polynomials, may be applied to raw slope data derived from Patterned Wafers for the purpose of deriving topography (or nanotopography) and curvature data.

One property of the shearing interferometry due to its self-referencing nature is that the resulting shearing interference pattern essentially measures the deviations from flatness of the surface under measurement by using the surface itself as a reference surface. Such relative data on surface height or flatness may be useful in various applications where the height or flatness of a surface is monitored or controlled. For example, in a chemical mechanical polishing (CMP) process or other surface polishing processes, the relative height across the surface may be monitored to determine the effectiveness of the polishing process. A shearing interferometer may be used to monitor the surface flatness and the measurements may be used to dynamically control the polishing condition of the polishing process in real time.

In some implementations, the shearing distance between the transversely shifted wavefronts that interfere with each other may be adjusted during the measurement process to improve the resolution and accuracy of the data. By capturing interferometric images of the surface at multiple increments of shearing distances, it is possible to resolve features smaller than the effective pixel size of the camera or imaging sensing array being used to sample the interferometric data. In addition, as described later in this application, the use of multiple shearing distances enables the highly accurate calculation of the estimated surface topography or nanotopography from the relative data by a geometric calculation rather than a standard numerical integration algorithm to compute the actual surface profile.

Referring back to FIG. 1, the system 100 may be used to measure surfaces of a variety of wafers, substrates, flat panels or lithographic mask elements. The system 100 can simultaneously measure each and every point in the illuminated area on the specimen surface to obtain information on the flatness, topography, slope, curvature and stress. The shearing interferometry may be especially advantageous in measuring patterned surfaces such as microfabricated surfaces commonly found in semiconductor or optoelectronics wafers and substrates. The shearing device 101 may produce coherent or semi-coherent interference on a patterned surface.

Figure 3:
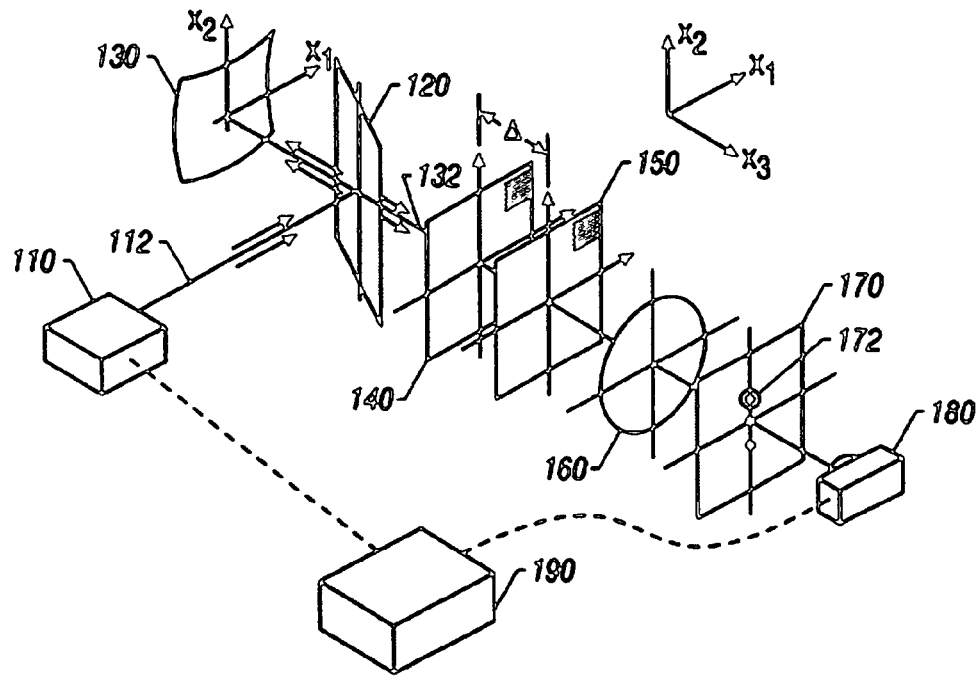
FIGS. 3 and 4 show two coherent gradient sensing (CGS) systems for measuring surfaces.

As an example, FIG. 3 shows an exemplary implementation of a coherent gradient sensing ("CGS") system 300 based on the system design in FIG. 1. Certain aspects of the system 300 are described in U.S. Pat. No. 6,031,611 to Rosakis et al., which is incorporated herein by reference. The CGS system 300 uses a collimated coherent optical beam 112 from a light source 110 as an optical probe to obtain surface slope and curvature information indicative of a specularly reflective surface 130 formed of essentially any material. An optical element 120 such as a beam splitter can be used to direct the beam 112 to the surface 130. When the reflective surface 130 is curved, the wavefront of the reflected probe beam 132 is distorted and thereby the reflected probe beam 132 acquires an optical path difference or phase change associated with the surface topographic of the surface 130 under measurement. This system produces a "snapshot" of each point within the illuminated area on the surface 130 and hence the surface topographic information at any point along any direction within the illuminated area can be obtained. This can eliminate the need for measuring one point at a time in a sequential manner by scanning a probe beam one point at a time across the surface 130.

Two optical diffraction elements such as optical diffraction gratings 140 and 150 spaced from each other by A are placed in the path of the reflected probe beam 132 to manipulate the distorted wavefront for curvature measurement. Two diffraction components produced by the second grating 150 from diffraction of two different diffraction components produced by the first grating 140 are combined, by using an optical element 160 such as a lens, to interfere with each other. When a lens is used as the optical element, the two diffracted beams produced by the second grating 150 and combined by the lens have the same diffraction angle out of the second grating 150 and thus are parallel to each other. The diffraction by the two gratings 140 and 150 effectuates a relative spatial displacement, i.e., a lateral spatial shift, between the two selected diffraction components. This shift is a function of the spacing $\Delta$ between the two gratings 140 and 150 when other grating parameters are fixed. More specifically, the shearing distance is ($\Delta \times \tan \theta$), where $\theta$ is the diffraction angle of two interfering diffraction beams. Hence, the gratings 140 and 150 produce two spatially shifted wavefronts from the same wavefront of the reflected probe beam 132. A spatial filter 170 is placed relative to the optical element 160 to transmit the interference pattern of the selected diffraction components and to block other diffraction orders from the second grating 150. In general, any desired diffraction order or combination of orders may be selected for the measurements.

The transmitted interference pattern is then captured by an imaging sensor 180 which may include an array of sensing pixels, such as a CCD array, to produce an electrical signal representing the interference pattern. A signal processor 190, processes the electrical signal to extract a spatial gradient of the wavefront distortion caused by the topography of the reflective surface 130. This spatial gradient, in turn, can be further processed to obtain the curvature information and hence a curvature map of the illuminated area on the surface 130 can be obtained. A single spatial differentiation is performed on the interference pattern to measure the surface gradient. This technique can provide accurate measurements of surface curvatures and the accuracy is high when the curvature variation of the surface is gradual, i.e., when the out-of-plane displacement is less than the thickness of the film, the line or the substrate. This technique is insensitive to rigid body motions in contrast to some other interferometric techniques. Details of this data processing operation are described in the above-referenced U.S. Pat. No. 6,031,611 to Rosakis et al. Upon completing the processing for the surface slopes and curvatures, the processor 190 further operates to compute the stresses from the surface curvatures.

The two gratings 140 and 150 in general may be any gratings, with different grating periods and oriented with respect to each other at any angle. Preferably, the two gratings may be oriented with respect to each other in the same direction and may have the same grating periods to simplify the data processing. In this case, the grating direction is essentially set by the direction of the relative spatial displacement ("shearing") between the two selected diffraction components due to the double diffractions by the gratings 140 and 150.

Certain applications may require spatial shearing in two different directions to obtain a full-field two-dimensional slope and curvature measurement. This may be done by using the CGS system 300 to perform a first measurement when the sample surface 130 is at a first orientation and subsequently to perform a second measurement when the sample surface 130 is rotated to a second orientation (e.g., perpendicular to the first orientation).

Figure 4:
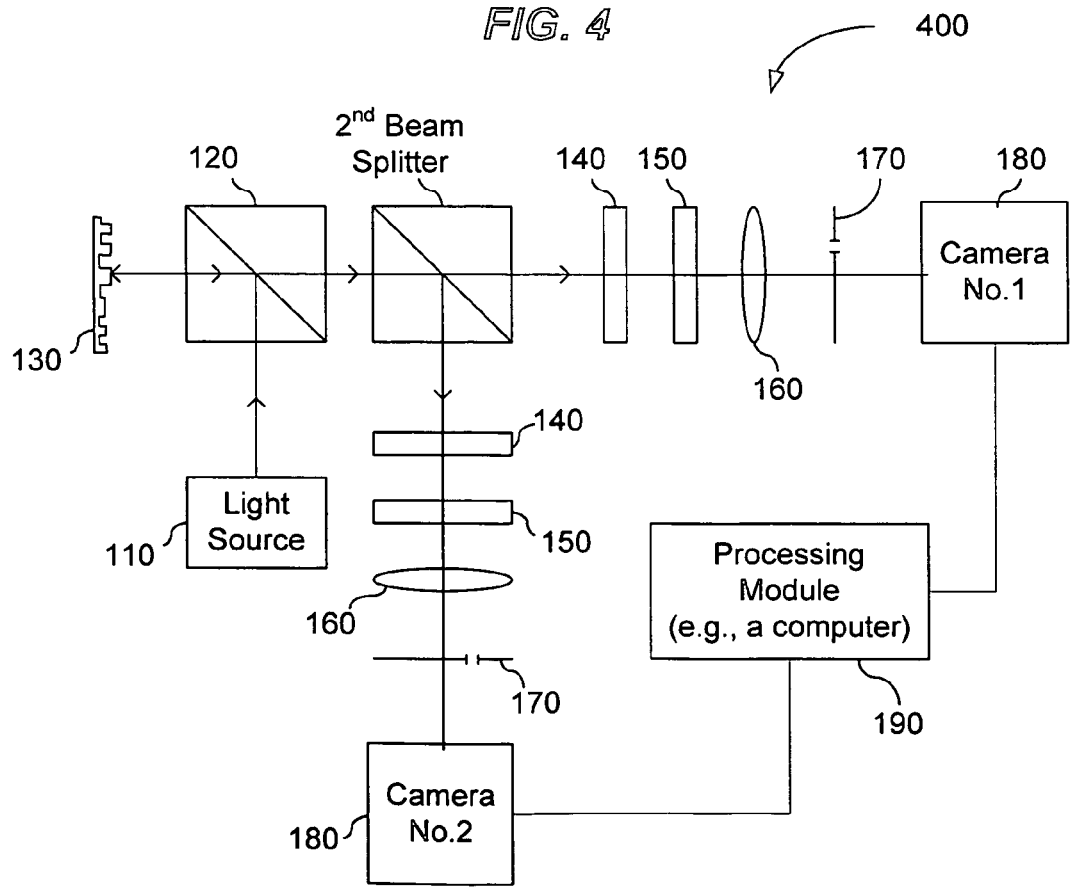

Alternatively, a two-arm CGS system, shown in FIG. 4 may be implemented to have two separate sets of double gratings in two different directions to simultaneously produce the interference pattern in two different spatial shearing directions. Hence, time-varying effects in the topography, slope and curvature distribution in both spatial shearing directions can be obtained.

In addition, each of the two gratings 140 and 150 in FIG. 3 may be replaced by a grating plate with two orthogonal cross gratings to effectuate the two dimensional shearing of the system in FIG. 4. The spatial filter 170 may be replaced by a substitute filter with an additional optical aperture shifted along the direction of x1 to selectively transmit an interference pattern for shearing along the orthogonal direction.

Figure 5A:
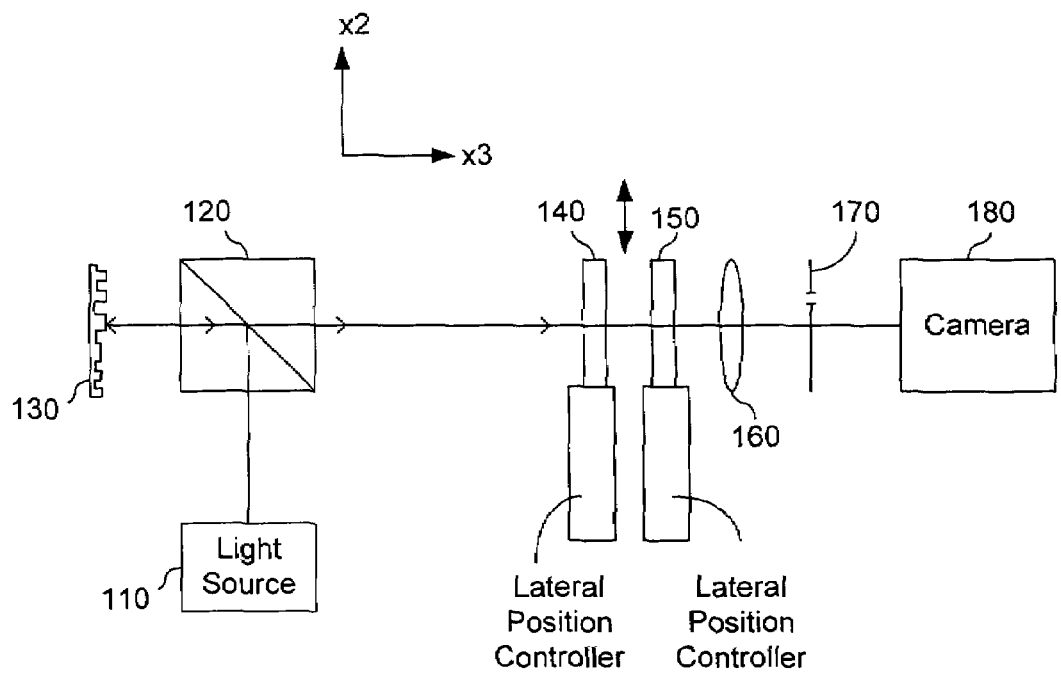
FIGS. 5A and 5B show two exemplary phase shifting techniques in CGS.

In the above exemplary CGS systems, the phase shifting may be achieved by changing the relative position between the two gratings 140 and 150. In one implementation, the relative position of the two gratings 140 and 150 in the transverse plane defined by directions x1 and x2 may be adjusted while maintaining the spacing between the two gratings 140 and 150 along the x3 direction fixed at a desired constant. FIG. 5A illustrates a CGS system where a positioning mechanism, such as precise translation stage or a positioning transducer, is used to implement this adjustment of the relative position between the gratings for phase shifting. At least one lateral position controller may be engaged to one of the two gratings to cause the lateral change in position. Two lateral position controllers may be respectively engaged to the two gratings 140 and 150 to cause the phase shift. In this implementation, the two gratings may be maintained to be parallel to each other with the fixed spacing during the lateral movement. Multiple shearing interference patterns with different lateral relative positions between the gratings 140 and 150 can be obtained for further processing with phase extraction and unwrapping algorithms.

Figure 5B:
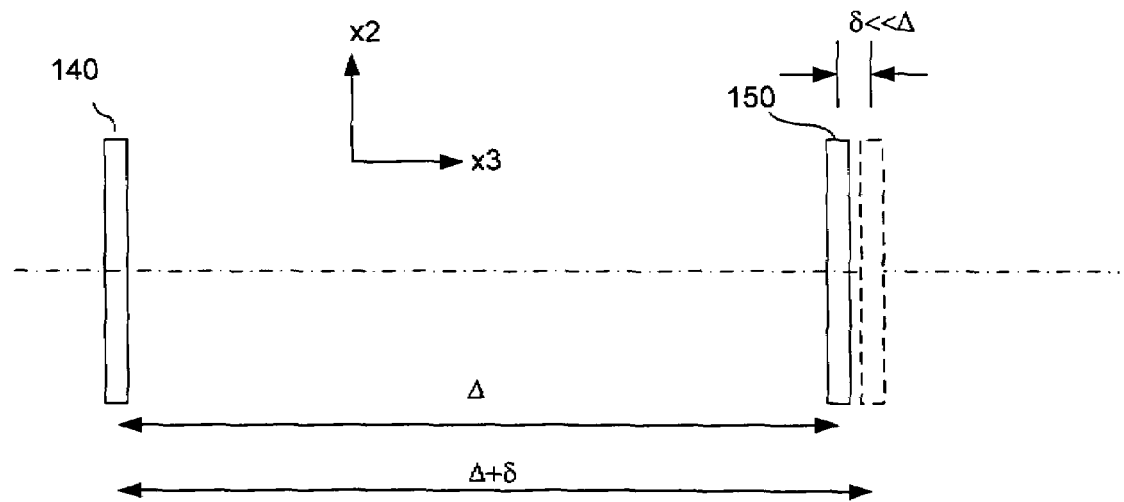

FIG. 5B shows another way for implementing the phase shifting mechanism in CGS. In this configuration, the relative lateral position between the two gratings 140 and 150 is fixed and the two gratings 140 and 150 are maintained to be substantially parallel. A position control mechanism is implemented to slightly change the spacing, $\Delta$, between the two gratings 140 and 150 along the x3 direction by a small amount ($\delta$). The magnitude of $\delta$ is much less than the desired spacing $\Delta$ so the spacing $\Delta$ and the measurement resolution is not significantly affected by the small change of $\delta$. This small change ($\delta$) in the spacing $\Delta$, however, changes the overall phase of the shearing interference pattern produced by the two gratings 140 and 150. In data acquisition, the spacing $\Delta$ is adjusted to have different small shifts ($\delta$) to obtain different shearing interference patterns with different phase shifts for further processing with phase extraction and unwrapping algorithms.

In addition, the specimen surface 130 may be tilted at different small angles to produce different phase shifts in the corresponding interference patterns in the CGS system. These and other phase shifting mechanisms may be combined to effect desired phase shifts.

A CGS system may be designed with dynamically configurable shearing distances to allow for obtaining data with different shearing distances during the measurement process as described above for improving the resolution and accuracy of the measurements. At least one of the two gratings in a CGS system such as examples shown in FIGS. 3 and 4 may be engaged to a positioning stage or positioning transducer to change the relative spacing between the two gratings in a controlled manner to achieve measurements at different shearing distances.

In addition to CGS systems, other shearing interferometer configurations may also be used to implement the shearing device 101 in FIG. 1. Several examples are provided below. These shearing interferometers use optical elements different from gratings in CGS to generate the lateral shearing between two interfering wavefronts and have their respective unique features in measuring surfaces.

Figure 6A:
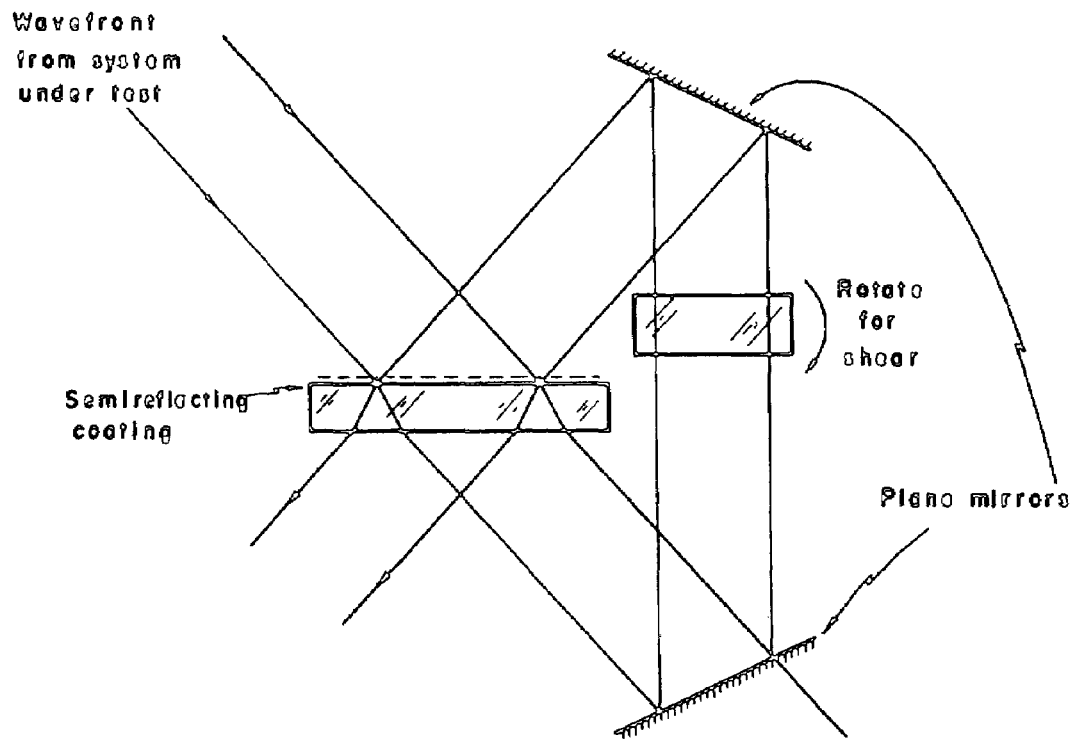
FIGS. 6A, 6B, 7A, 7B, 7C, 8, 9, 10A, 10B, 11A, 11B, and 11C show examples of non-CGS shearing interferometers suitable for measuring surfaces based on the techniques described in this patent application.
Figure 6B:
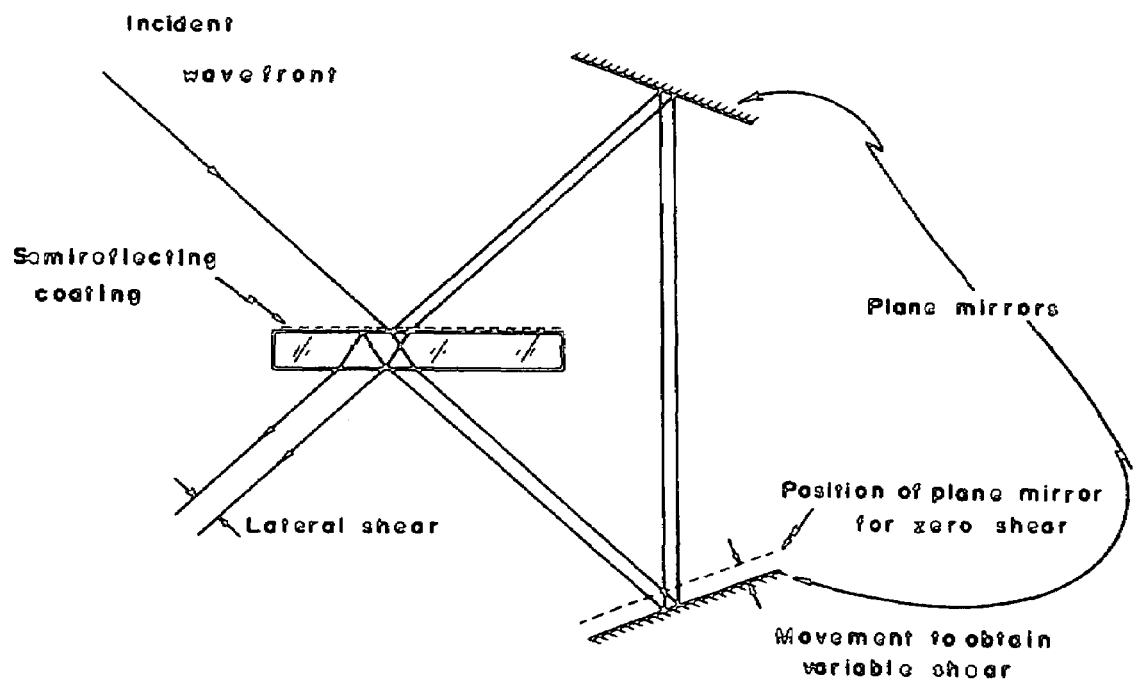
Figure 7A:
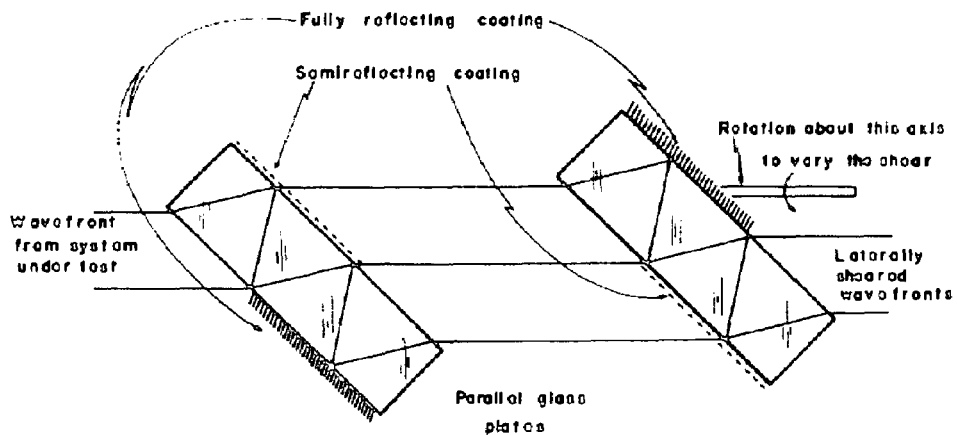
Figure 7B:
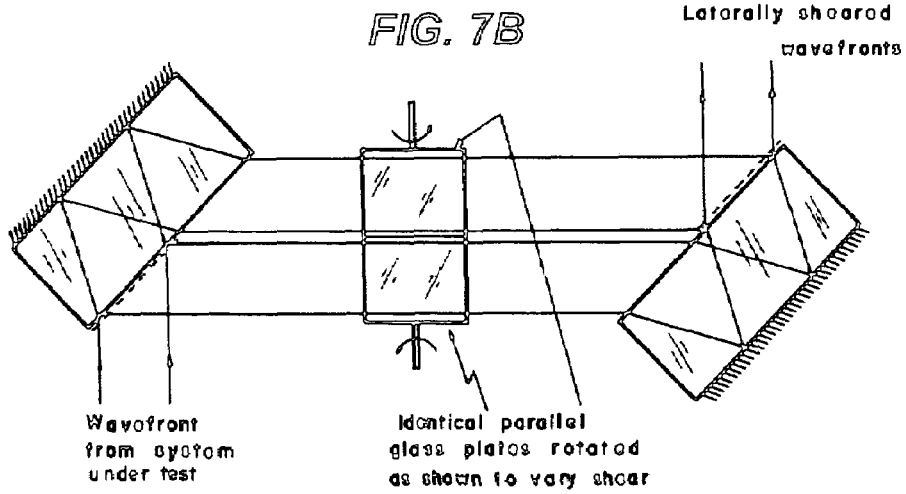
Figure 7C:
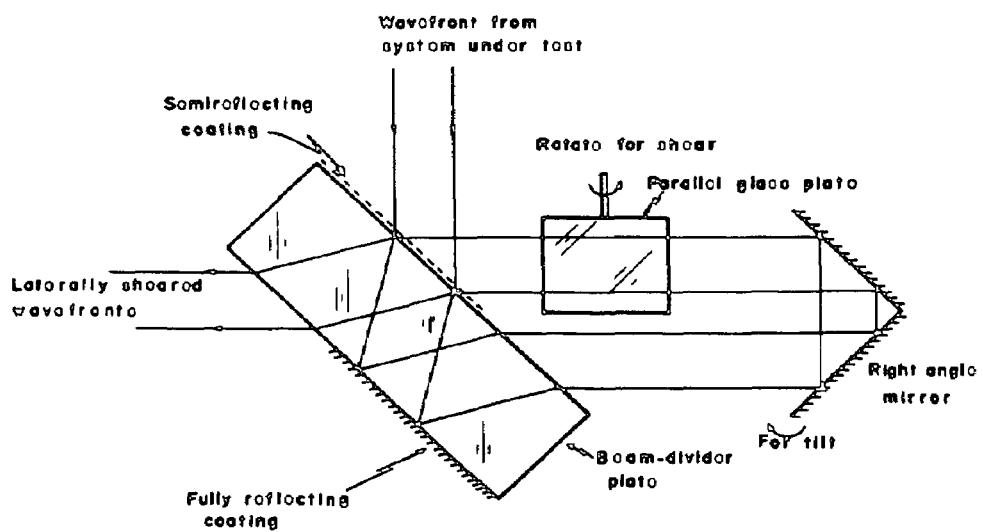
Figure 8:
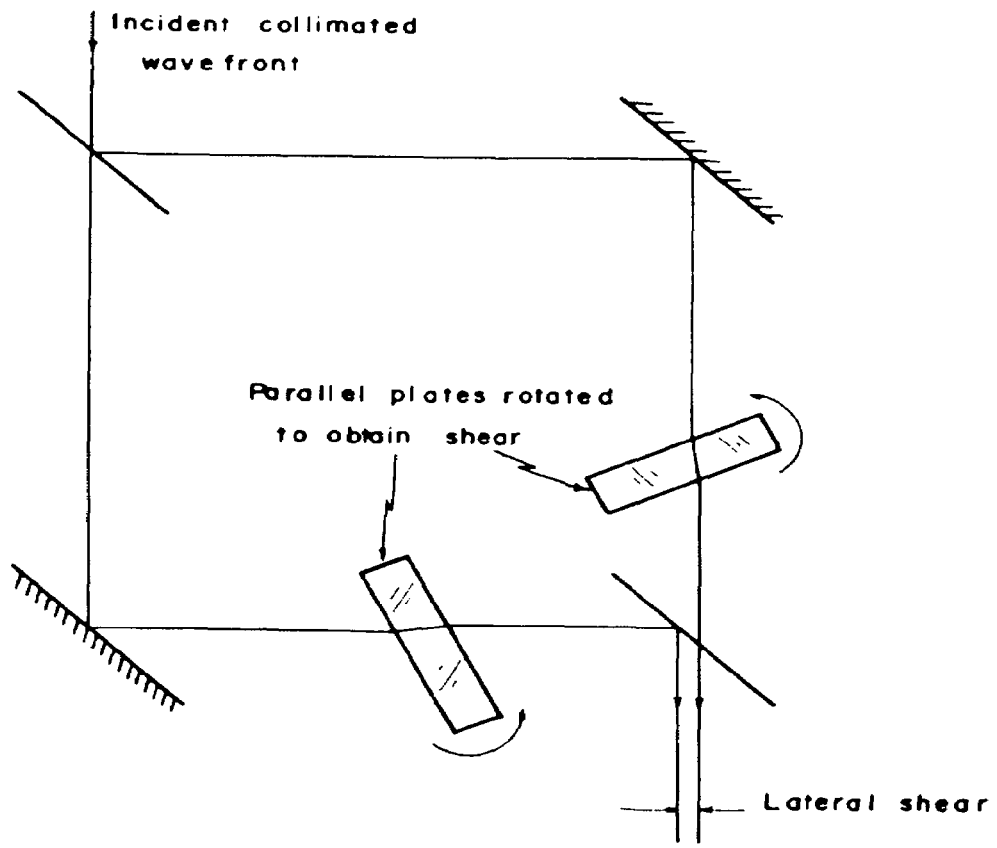
Figure 9:
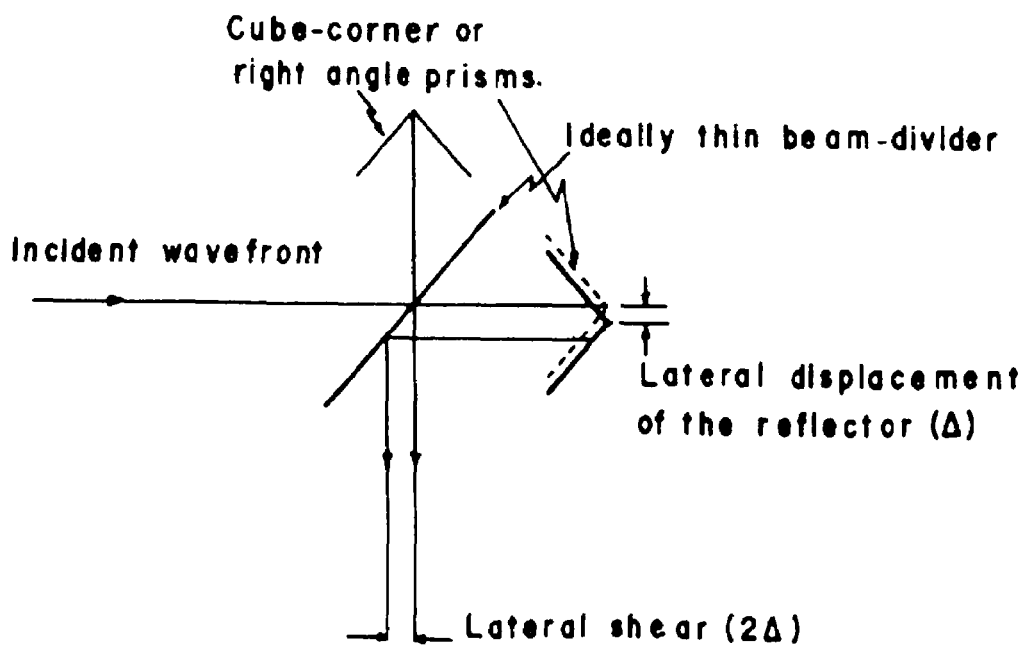
Figure 10A:
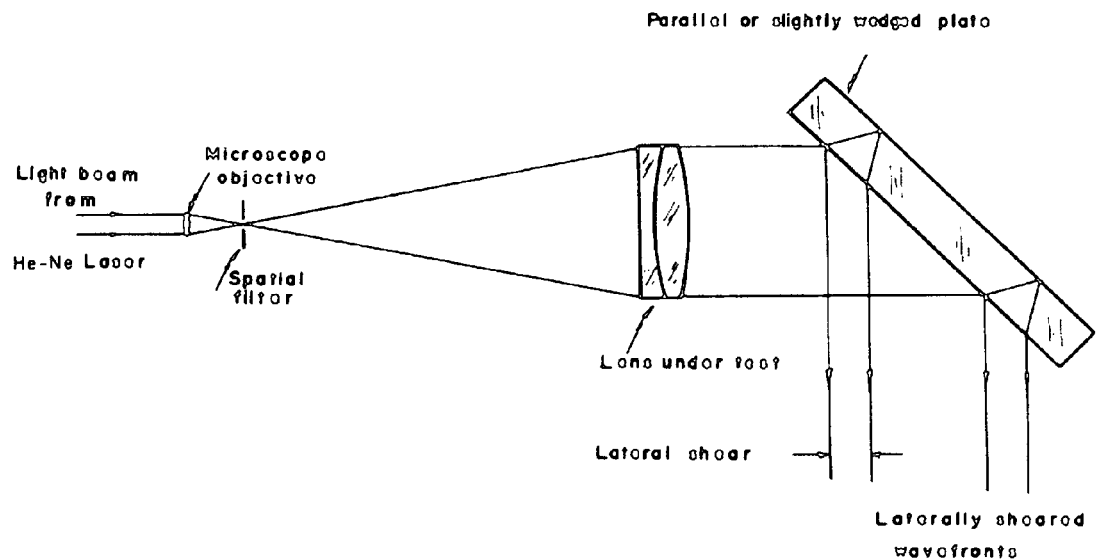
Figure 10B:
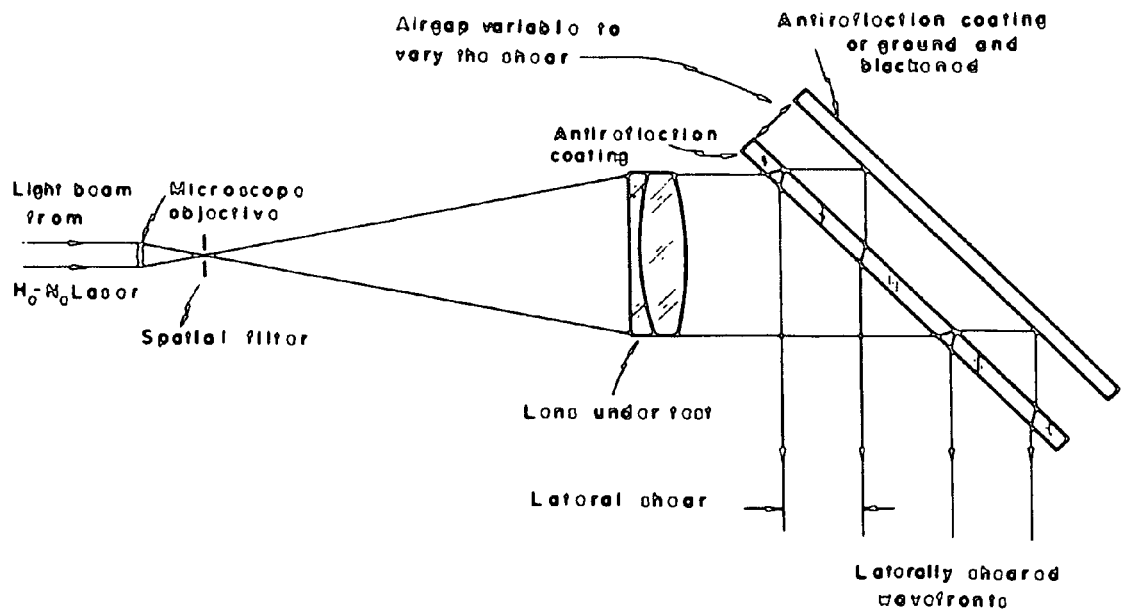
Figure 11A:
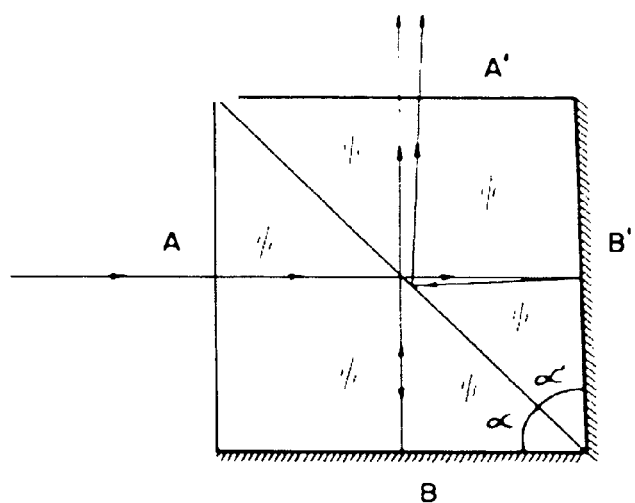
Figure 11B:
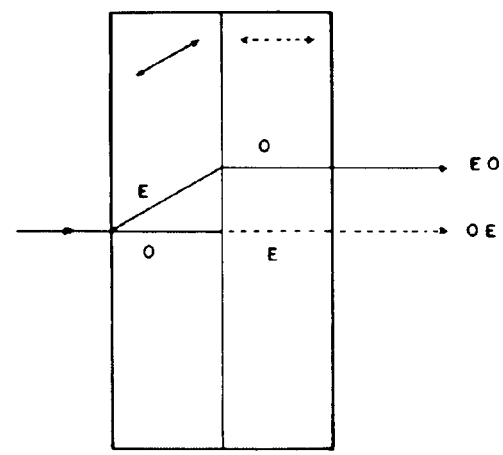
Figure 11C:
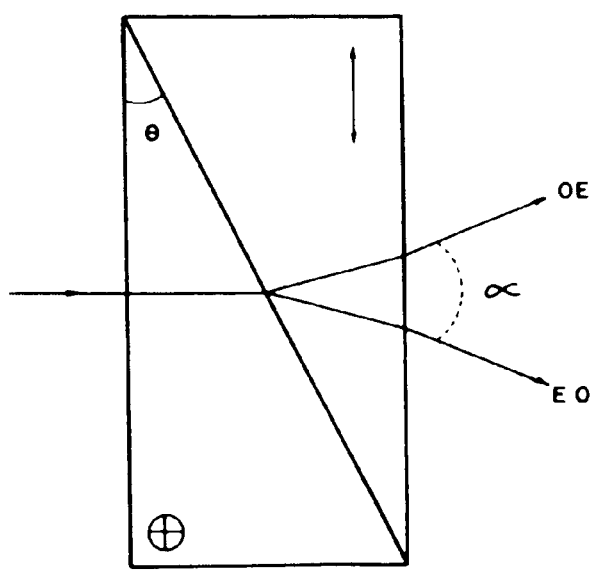

FIGS. 6A and 6B show two examples of cyclic shearing interferometers. A parallel plate with one semi-reflecting surface is used to split the received probe beam into two beams. FIG. 6A uses a rotating transparent plate in one of the two beams to produce the shearing and the variable shearing distance. FIG. 6B uses a movable mirror in the optical path to produce the shearing and the variable shearing distance by moving the mirror away from a position with a zero shear. The phase shifting may be achieved by slightly translating one of the two reflectors, or by tilting the parallel plate with the semi-reflecting surface. FIGS. 7A, 7B, and 7C show examples of Jamin shearing interferometers. FIG. 8 shows a Mach-Zehnder shearing interferometer. FIG. 9 shows a Michelson shearing interferometer. FIGS. 10A and 10B show two examples of parallel plate shearing interferometers capable of producing large shearing distances. FIGS. 11A, 11B, and 11C show prism shearing interferometers having two different prisms to produce the desired shearing. Structures and operations of these shearing interferometers are well known. The shearing distance may be controlled and adjusted by rotating a selected optical element in these interferometers. In general, the phase shifting can be achieved by tilting the specimen surface under measurement. In some of these interferometers, one optical element in the optical path may be translated to produce the desired phase shifting without tilting the specimen surface. In any of these interferometer configurations, the spacing between the gratings can also be altered by causing the refractive index of the medium between the gratings to change in a prescribed manner. Furthermore, the grating itself can be effected by other means such as causing surface acoustic waves to propagate along a surface in the beam path, or by use of electrically-addressable liquid crystal elements, etc. A means of effectuating a diffractive element may be used in a CGS system.

In these non-CGS shearing systems, the uniformity of shearing distance across the field of view is relatively easy to control in comparison with a CGS system which needs to maintain parallel gratings as the separation between two gratings is changed. These systems are also relatively easy to achieve smaller shearing distances by nominally setting the systems at configuration with a zero shearing and by using slight rotations to achieve small shearing distances. In addition, these systems avoid the use of precision holding mechanism for the gratings and the in-line spatial filtering of unwanted diffraction orders in CGS. Due to these and other features, these non-CGS shearing interferometers may be used to optically measure surfaces in certain applications where CGS may be more difficult to implement.

The above non-CGS optical shearing interferometry systems may be configured and operated to achieve small shearing distances than the CGS due to their designs. However, both CGS and these non-CGS systems may be operated to achieve small effective shearing distances less than minimum shearing distances due to limitations of the mechanisms for adjusting the shearing distances. For example, a shearing interferometer may be operated to make two or more measurements at shearing distances with incremental differences. Two of such measurements may be combined to produce an effective shearing distance at the difference between the two close shearing distances. Hence, this use of multiple shearing distances enables highly accurate calculation of the estimated surface topology from the relative data by a geometric calculation without using a standard numerical integration algorithm to compute the actual surface profile. Details of this technique are provided below.

The characterization of high spatial frequencies (or low spatial wavelengths) in a shearing interferometer can be limited by the minimum achievable shearing distance, the minimum spot size of the measurement probe (e.g. the pixel size of an imaging array), or a combination of both. In some shearing interferometers, the shearing distance may be the main limiting factor (shearing distance on the order of a few millimeters, pixel size on the order of 100's of micrometers or less) with the critical spatial wavelength corresponding to approximately twice of the shearing distance. Shorter shearing distances may be implemented, but may result in a less sensitive interferometer. In a reflection-mode shearing interferometers, for example, the slope per fringe=$\lambda/2\omega$, where $\lambda$ is the probe wavelength and $\omega$ is shearing distance.

If the configuration of a given shearing interferometer allows adjustment of the shearing distance, multiple sets of interferograms may be collected from the same specimen at difference shearing distances. In this case, when the data sets are taken in pairs, the effective shearing distance of the two sets of data can be made to be the difference between the shearing distances of the two sets.

First, consider two measurements for a data set with two different shearing distances $\omega 1$ and $\omega 2$, respectively, with the following interferograms:

$$S(x_1+\omega_1, x_2) - S(x_1, x_2) = n_1 \lambda$$

$$S(x_1+\omega_2, x_2) - S(x_1, x_2) = n_2 \lambda$$

where n1 and n2 are represent the fringe orders where constructive interference occurs at n=0, 1, 2, 3, etc. and destructive interference occurs at n=0.5, 1.5, 2.5, etc. The difference of two measured interferograms can be written as $$S(x_1+\omega_1, x_2) - S(x_1+\omega_2, x_2) = (n_1-n_2)\lambda$$

The above equation can be re-written as $$S(x_1+(\omega_1-\omega_2), x_2) - S(x_1, x_2) = (n_1-n_2)\lambda$$

Hence, the combination of the two data sets yields a data set or new interferogram having an effective shearing distance represented by the difference of the two shearing distances of the individual data sets. Using this feature, the spatial frequency response of the system may be optimized by selecting an effective shearing distance equal to the spot size of the probe.

The practical implementation of this methodology may be achieved using 1) the interferometer system designed with two distinct interferometer paths of different shearing distances, 2) the interferometer system with a single interferometer path, whose shearing distance can be adjusted to obtain different interferograms with different shearing distances. Configuration 1 has the advantage that the two data sets can be acquired simultaneously and that the two paths are fixed and hence it is easier to maintain uniform and repeatable shearing distances in each path. Configuration 2 has the advantage that it has fewer components and hence can be more compact and less expensive.

In the CGS interferometer, the shearing distance may be adjusted by changing the grating separation, probe wavelength or grating pitch.

Adjustment of the grating separation in CGS may be achieved using an actuator as described above. As an example, in a system configured with gratings having a pitch of 25 micrometers and a probe wavelength of 632.8 nm, the grating separation would have to be increased by ~39 microns for each micron increase in shearing distance. In order to achieve changes in shearing distance on the order of a few micrometers, a piezo-electric transducer (PZT) system may be appropriate, whereas a precision motor-driven stage system may be more appropriate for changes in the grating separation that result in changes in the shearing distance on the order of 10's or 100's of micrometers. In either case, some additional metrology (e.g. displacement transducers) may be necessary to assure that the change in grating separation (and hence shearing distance) is uniform. Such a system has the advantage that the adjustment of shearing distance is continuous and the disadvantage that it may be difficult to change the grating separation uniformly to maintain uniform shearing distance across the field-of-view.

The use of the probe wavelength to change the shearing distance may be implemented by using either distinct sources that are shuttered or by using a laser in which the wavelength can be tuned (e.g. an Ar-ion laser or a tunable laser such as Ti:sapphire laser). As an example, in a system configured with gratings having a pitch of 25 micrometers and a fixed grating separation, the changing the probe wavelength from 632.8 nm to 514 nm would change the shearing distance by 35.64 micrometers. Implementations of such a system may have the advantage that the change in the shearing distance can be made uniformly. In these implementations, only discrete changes in the shearing distance are possible (based on available source wavelength) and the optical system of the interferometer can be designed to respond identically to the two or more wavelengths (through design or adjustment).

When the pitch of the gratings is used to change the shearing distance in CGS, two pairs of transmissive gratings that have a fixed line pattern on a glass or similar substrate may be used in two independent interferometer paths. The two pairs have two distinct sets of gratings, each having different pitch. Alternately, a line pattern for a grating may be generated electronically or optically in a manner that is adjustable. For example, an acoustic grating may be used to produce the adjustable grating pitch for changing the shearing distance.

The configuration of the shearing interferometer system for a given application depends on the power spectral density (amplitude versus spatial frequency) of the component being tested. Specifically, the slope sensitivity, $\lambda/2\omega$, can be selected to ensure that the amplitude can be characterized with an acceptable signal to noise ratio and the shearing distances can be selected to ensure that the spatial frequency can be characterized (adheres to Nyquist's sampling theorem). In this way, the system can be optimized for a given type of sample. The practical implication of the optimization is that the sample can be characterized with the minimum amount of data, which in turn facilitates efficient computation and analysis as well as data storage.

Some practical limitations may exist in selecting both the slope sensitivity and shearing distances. For the slope sensitivity, the practical limit may be the intensity level resolution of the imaging system and the probe wavelength. As an example of a first order estimate, a CCD array with 10-bit resolution (1024 gray scales) theoretically can resolve $\frac{1}{2048}$th of a fringe (intensity variation from black to white represents $\frac{1}{2}$ a fringe). If the probe wavelength is 632.8 nm the minimum difference in height that can be resolved across the shearing distance is ~0.31 nm (see equation 1). In practice, it may not be possible or feasible to access the full dynamic range of the image sensor and noise sources may limit the signal that can be extracted reliably. Maximizing the dynamic range of the image sensor and/or minimizing the probe wavelength may be used to characterize smaller amplitudes.

The selection of the shearing distances (and hence spatial frequency response) may be subject to the some limitations and trade-offs. First, the in-plane spatial wavelengths cannot be smaller than approximately twice the probe wavelength. Second, for an image array/sensor of fixed size, the field-of-view decreases linearly with the spot/pixel size. Third, the selected shearing distances define a region around the edge of the sample over which interference data is cannot be collected. Thus, the larger the individual shearing distances, the more limited the data collection at the edge of the sample becomes.

The above CGS and other optical shearing interferometry systems may be used to measure slopes and curvatures of various features and components formed on a substrate either directly or indirectly. In the direct measurement, the probe beam can be directly sent to the patterned top surface of these devices to obtain the curvature information. The surface features and components and their surrounding areas on the top surface may be smooth and optically reflective to be accurately measured. For example, some completed integrated circuits have a top passivation layer, usually made of a non-conductive dielectric material, over the circuit elements on the substrate to protect the underlying circuits. The surface of the passivation layer is in general smooth and is sufficiently reflective for this direct measurements.

In some situations, the above direct measurements based on reflection from the patterned surface may be difficult to implement. For example, features and components formed on the front side of a substrate or their surrounding areas may not be optically reflective. In addition, the effectiveness and accuracy of this direct measurement based on reflection from the patterned top surface may be adversely affected if the properties of the features and components and their surrounding areas other than their slopes and curvatures significantly contribute to the wavefront distortion because the wavefront distortion under such circumstance is no longer an indicator of the global slopes and curvatures of the area illuminated by optical probe beam. The features and components on the front side may distort the reflected wavefront due to factors other than the global slopes and curvatures, such as the local height of a feature or component being different from its surrounding areas. In these and other situations, the curvatures of the features or components may be indirectly measured by inference from the curvature measurements of the corresponding locations on the opposite, unpatterned surface on the back side of the substrate. This is possible because the stresses in the non-continuous features and components formed on the substrate can cause the substrate to deform and the thin films formed over the substrate generally conform to the global curvature of the substrate surface.

When the heights of certain features are different from their surroundings, the phase distortion on the wavefront of the reflected probe beam for each feature includes at least the portion contributed from the height difference and the portion contributed from the curvatures. Since the backside surface is not patterned, any optical interferometer, including non-shearing interferometers may be used to process the reflection from the backside surface to obtain the surface curvature information. For example, non-shearing Twyman-Green and Michaelson interferometers may be used to obtain optical measurements on the unpatterned backside surface of a wafer.

Notably, the patterned front or top surface of a wafer may be optically measured with a phase-shifting shearing interferometer described above and the unpatterned backside surface may be optically measured with any interferometer including shearing or a non-shearing interferometer. Both measurements may be processed or correlated to improve the overall measurements of the patterned front surface. The surface information from the unpatterned backside surface may be used to provide the overall global surface slope information of the wafer. The surface information from the patterned front side surface, which may be advantageously obtained from a shearing interferometer, may be used to provide detailed local surface information on the patterned front surface.

Figure 12:
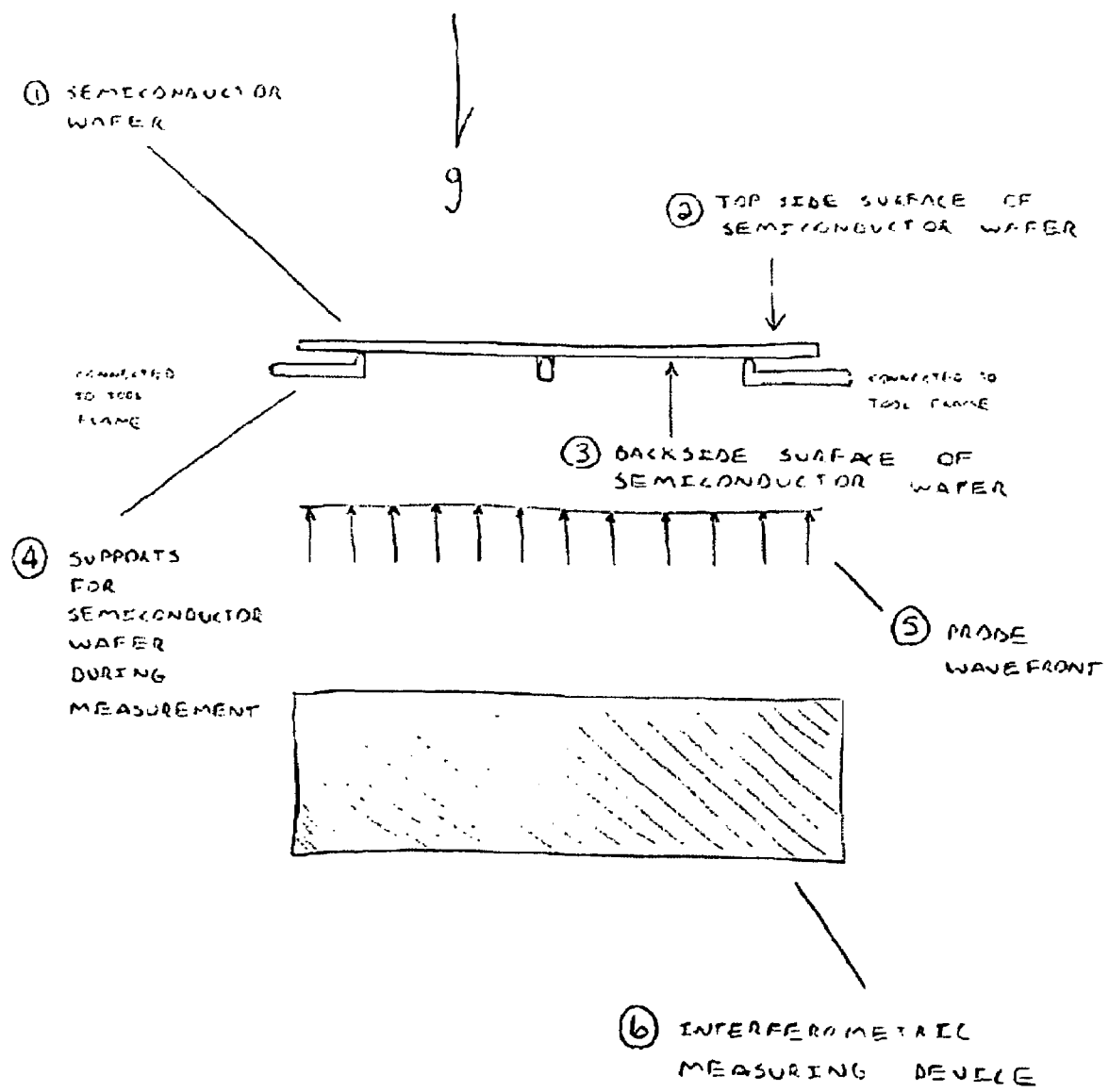
FIG. 12 illustrates an exemplary layout for optically measuring the backside surface of a wafer where wafer supports are in contact with the backside surface.

In implementation, the backside surface of a wafer may be supported by wafer supports in part because the patterned front surface, such as circuits and other micro structures, may be damaged by contact of such support members. FIG. 12 illustrates an exemplary layout for optically measuring the backside surface of a wafer. The wafer supports in contact with the backside surface may affect the optical measurements for being present in the illuminate area and thus partially prevent the reflected beam to obtain the surface information in the areas occupied by the wafer supports. Such effects of the supports are undesirable and should be removed.

Figure 13:
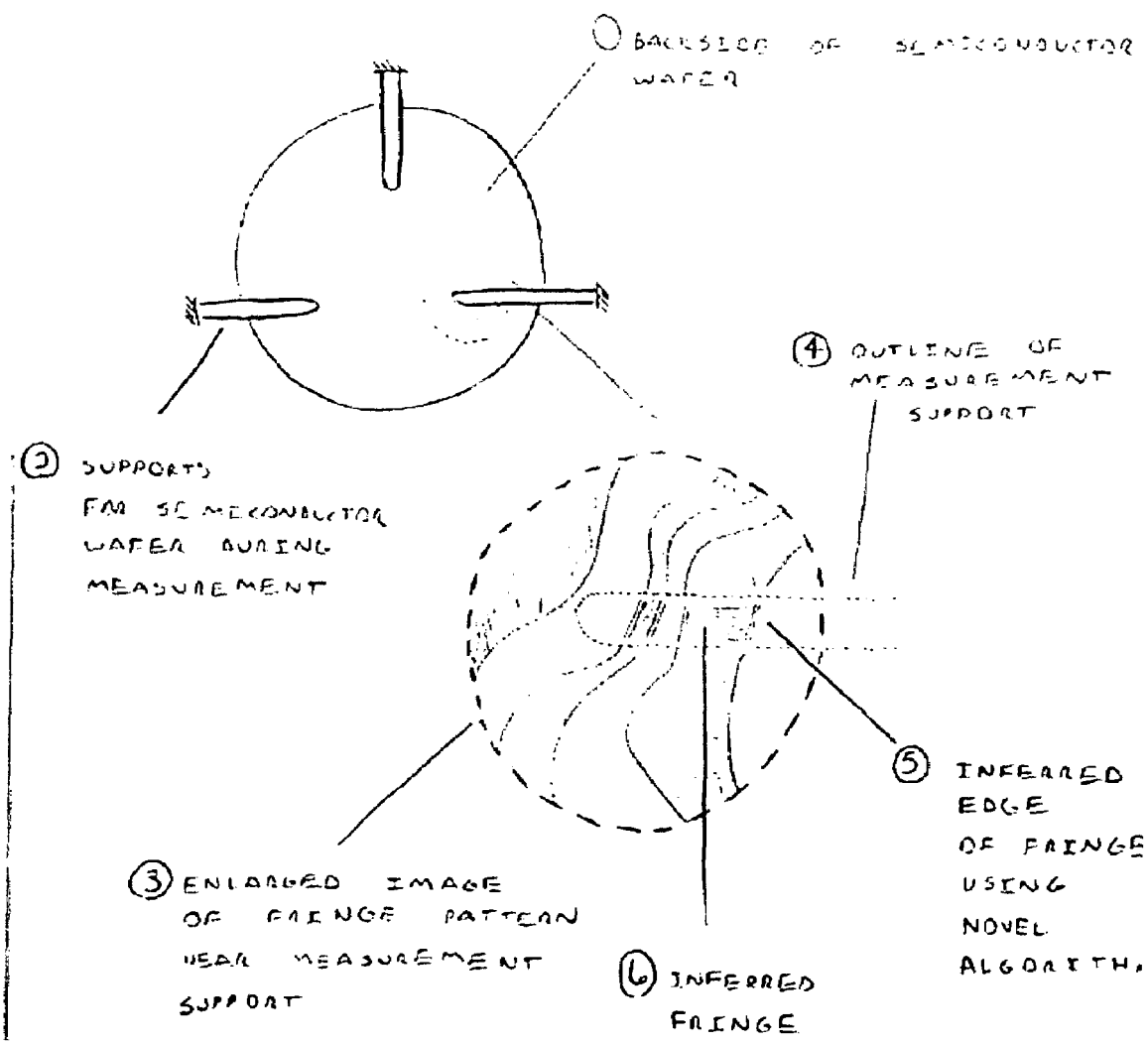
FIG. 13 illustrates an example where the backside of the wafer is supported by three wafer supports that are oriented in a non-symmetric way to enable direct collection of data on the full wafer surface by making multiple measurements of the wafer at different angular orientations.

FIG. 13 illustrates an example where the backside of the wafer is supported by three wafer supports that are oriented in a non-symmetric way to enable direct collection of data on the full wafer surface by making multiple measurements of the wafer at different angular orientations. Not shown is the hardware the places the wafer onto the thin supports in one of any number of angular orientations (placement and rotational devices like these are common in the automation industry). FIG. 13 further illustrates that measurement of the backside of the wafer results in an interference pattern that contains discontinuities because of the presence of the three point supports in the measurement field. In a traditional arrangement, these fringes would prevent the conversion of the fringe pattern to meaningful data. A number of techniques are described here to allow measurements in the areas occupied by the wafer supports.

In one implementation, an interpolation algorithm is used to effectively interpolate the fringe pattern across the discontinuities of the fringes due to presence of the wafer supports. The interpolated fringe edges enable the calculation of an inferred fringe that can be used in a standard interferometric processing algorithm. The algorithms used to generate these inferred fringes may use a linear interpolation, a Spline interpolation, a higher order polynomial interpolation, and a number of algorithms using spatial filtering and one of more of the previous described techniques. The spatial filtering coefficients can be derived by analyzing experimental and theoretical data on wafer deformations caused by semiconductor and MEMs manufacturing processes.

Once the interpolation is completed, the software that drives the device also performs a 'sense check' on the resulting, inferred fringes based on spatial frequency content and consistency with other fringes on the wafers.

In many cases, these algorithms will be sufficient to enable the calculation of the processing of the interferometric fringe data into meaningful information on wafer shape, slopes, curvatures, and stresses. However, in cases where higher levels of measurement resolution are required, the device will make measurements of the backside of the wafer at multiple angular orientations. The device then compares the multiple images for consistency and fills in missing data from one image (i.e., parts of the wafer that were covered by the supports) with data from another image (i.e., an image that was acquired at a different orientation, where a given part of the wafer covered in the former image by the support pins, is no longer covered). The algorithms for performing this calculation are straightforward.

The device may also use transparent, lens quality-support pins that are essentially invisible to the probe wave front. These support arms and pins are machined from machine quality quartz and polished via a complex lapping process.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations are described. However, it is understood that various variations, enhancements, and other implementations may be made.

What is claimed is:

1. A method for characterizing a strain between a film and a substrate on which the film is deposited, comprising:
   obtaining a spatial curvature change distribution across the substrate;
   determining a local contribution to the strain at a selected location from curvature changes at said selected location;
   determining a non-local contribution to the strain at said selected location from curvature changes at all locations across the substrate; and
   combining the local contribution and the non-local contribution to determine the total strain at said selected location.

2. The method as in claim 1, further comprising:
   using an optical process to obtain the spatial curvature change distribution across the substrate.

3. The method as in claim 2, further comprising:
   optically obtaining a full-field curvature map of the substrate in the optical process; and
   processing the full-field curvature map to produce the spatial curvature change distribution.

4. The method as in claim 3, further comprising using an optical shearing interferometer to optically obtain the full-field curvature information of the substrate.

5. The method as in claim 4, wherein the optical shearing interferometer comprises a coherent gradient sensing system with two optical diffraction elements.

6. The method as in claim 1, further comprising using the total strain at said selected location to determine a strain caused by a process or treatment applied to the film and the substrate prior to a time when the spatial curvature change distribution across the substrate is obtained.

7. The method as in claim 6, wherein the process or treatment applied to the film and the substrate produces a non-uniform temperature distribution on the film the substrate.

8. The method as in claim 1, wherein the spatial curvature change distribution across the substrate is obtained under a spatially varying misfit strain between the film and the substrate.

9. The method as in claim 1, wherein the film has a spatially uneven doping that causes a spatially varying misfit strain between the film and the substrate.

10. A device, comprising:
    a module to optically interact with a layered structure and to obtain a full-field curvature map of a surface on the layered structure, the module comprising:
        a radiation source to produce a collimated probe beam onto the surface of the layered structure;
        an optical shearing interferometer device positioned to receive the optical probe beam reflected from the surface and to cause an optical interference between a reflected wavefront of the optical probe beam and another replica of the reflected wavefront that is spatially shifted by a shearing distance, wherein the optical shearing interferometer is operable to adjust a phase shift between the reflected wavefront and the replica of the reflected wavefront to obtain a plurality of phase-shifted interference patterns of different phase shifts;
        an imaging device to capture the interference patterns produced by the optical shearing interferometer; and
        a processing unit that processes the interference patterns captured by the imaging device to extract information on surface slopes across the illuminated area in the surface to produce the full-field curvature map;
    a processor in communication with the module to receive the full-field curvature map, the processor comprising:
        a mechanism to obtain a spatial curvature change distribution across the substrate; and a mechanism to determine a local contribution to the strain at a selected location from curvature changes at said selected location;

a mechanism to determine a non-local contribution to the strain at said selected location from curvature changes at all locations across the substrate; and a mechanism to combine the local contribution and the non-local contribution to determine the total strain at said selected location under a spatially varying misfit strain between the film and the substrate.

11. The device as in claim 10, comprising a mechanism that uses the total strain at said selected location to determine a strain caused by a process or treatment applied to the film and the substrate prior to a time when the spatial curvature change distribution across the substrate is obtained.

12. The device as in claim 11, wherein the process or treatment applied to the film and the substrate produces a non-uniform temperature distribution on the film the substrate.

13. The device as in claim 10, wherein the processor is configured to obtain and combine the local contribution and the non-local contribution to determine the total strain at said selected location when the film has a spatially uneven doping that causes the spatially varying misfit strain between the film and the substrate.

* * * * *